US012696299B2

(12) United States Patent
Hui et al.

(10) Patent No.: US 12,696,299 B2
(45) Date of Patent: Jul. 28, 2026

(54) SIDELINK RADIO RESOURCES ON SHARED SPECTRUM

(71) Applicant: Comcast Cable Communications, LLC, Philadelphia, PA (US)

(72) Inventors: Bing Hui, Herndon, VA (US); Hua Zhou, Vienna, VA (US); Esmael Hejazi Dinan, McLean, VA (US); Hyoungsuk Jeon, Centreville, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 332 days.

(21) Appl. No.: 18/365,604

(22) Filed: Aug. 4, 2023

(65) Prior Publication Data

US 2024/0049262 A1    Feb. 8, 2024

Related U.S. Application Data

(60) Provisional application No. 63/395,464, filed on Aug. 5, 2022.

(51) Int. Cl.
*H04W 72/40* (2023.01)

(52) U.S. Cl.
CPC .................................. *H04W 72/40* (2023.01)

(58) Field of Classification Search
CPC ..... H04W 72/40; H04W 72/25; H04W 72/02; H04W 72/0446; H04W 72/0453; H04W 92/18; H04L 5/0053; H04L 1/1812; H04L 27/26025; H04L 27/2605; H04L 5/0044; H04L 5/0094; H04L 27/2602; H04L 5/0039; H04L 5/0064
See application file for complete search history.

(56) References Cited

U.S. PATENT DOCUMENTS

| | | | |
|---|---|---|---|
| 2019/0342874 A1 | 11/2019 | Davydov et al. | |
| 2021/0243836 A1 | 8/2021 | Wu et al. | |
| 2021/0329671 A1* | 10/2021 | Kim ...................... | H04W 16/14 |
| 2022/0167402 A1 | 5/2022 | Liu et al. | |
| 2023/0028000 A1* | 1/2023 | Si ........................... | H04L 5/0094 |
| 2023/0133612 A1* | 5/2023 | Ganesan ............... | H04L 5/0094 370/329 |
| 2023/0156784 A1* | 5/2023 | Liu ........................ | H04W 72/20 370/252 |
| 2024/0389124 A1* | 11/2024 | Jiang .................... | H04L 5/0044 |

(Continued)

FOREIGN PATENT DOCUMENTS

| | | |
|---|---|---|
| BR | 112022024317 A2 | 12/2022 |
| EP | 4098071 A1 | 12/2022 |

(Continued)

OTHER PUBLICATIONS

R1-2203123 3GPP TSG RAN WG1 #109-e, e-Meeting, May 9-20, 2022, Source: Nokia, Nokia Shanghai Bell, Title: On Physical Channel Design Framework for SL-U.

(Continued)

*Primary Examiner* — Rushil P. Sampat
(74) *Attorney, Agent, or Firm* — Banner & Witcoff, Ltd.

(57) ABSTRACT

A first wireless device may communicate with a second wireless device using sidelink resources. For a sidelink transmission on a shared spectrum, a quantity of subchannels of a sidelink resource pool (RP) may be used for indicating a resource block (RB) interlace.

19 Claims, 43 Drawing Sheets

(56)                 References Cited

U.S. PATENT DOCUMENTS

2025/0185035 A1*   6/2025   Park ..................... H04L 5/0053
2025/0280426 A1*   9/2025   Lee ...................... H04L 1/1896

FOREIGN PATENT DOCUMENTS

| IN | 202247038036 | A | 7/2022 |
| WO | 2021154511 | A1 | 8/2021 |
| WO | 2021/189394 | A1 | 9/2021 |
| WO | 2021203326 | A1 | 10/2021 |
| WO | 2021217549 | A1 | 11/2021 |
| WO | 2021217562 | A1 | 11/2021 |
| WO | 2021223046 | A1 | 11/2021 |
| WO | 2021/237654 | A1 | 12/2021 |
| WO | 2021248300 | A1 | 12/2021 |
| WO | 2021262546 | A2 | 12/2021 |
| WO | 2021262546 | A3 | 2/2022 |
| WO | 2022046351 | A1 | 3/2022 |
| WO | 2022073183 | A1 | 4/2022 |
| WO | 2022073186 | A1 | 4/2022 |
| WO | 2022115836 | A1 | 6/2022 |
| WO | 2022182502 | A1 | 9/2022 |
| WO | 2022267929 | A1 | 12/2022 |

OTHER PUBLICATIONS

R1-2203147 3GPP TSG-RAN WG1 Meeting #109-e, e-Meeting, May 9-20, 2022, Source: Huawei, HiSilicon, Title: Physical channel design for sidelink operation over unlicensed spectrum.

R1-2203332 3GPP TSG RAN WG1 #109-e, e-Meeting, May 9-20, 2022, Source: Spreadtrum Communications, Title: Discussion on physical channel design of sidelink on unlicensed spectrum.

R1-2203366 3GPP TSG RAN WG1 #109-e, e-Meeting, May 9-20, 2022, Source: ZTE, Sanechips, Title: Discussion on physical layer structures and procedures for SL-U.

R1-2203462 3GPP TSG RAN WG1 #109-e, e-Meeting, May 9-20, 2022, Source: Catt, Gohigh, Title: Discussion on physical channel design framework for sidelink on unlicensed spectrum.

R1-2203562 3GPP TSG RAN WG1 #109-e, e-Meeting, May 9-20, 2022, Source: vivo, Title: Physical channel design framework for sidelink on unlicensed spectrum.

R1-2203646 3GPP TSG RAN WG1 #109-e, e-Meeting, May 9-20, 2022, Source: InterDigital, Inc., Title: SL U physical layer design framework.

R1-2203694 3GPP TSG RAN WG1 #109-e, e-Meeting, May 9-20, 2022, Source: NEC, Title: Discussion on physical channel design framework.

R1-2203704 3GPP TSG RAN WG1 #109-e, e-Meeting, May 9-20, 2022, Source: Lenovo, Title: Physical layer design framework for sidelink on FR1 unlicensed spectrum.

R1-2203714 3GPP TSG RAN WG1 #109-e, e-Meeting, May 9-20, 2022, Source: LG Electronics, Title: Discussion on physical channel design framework for sidelink on unlicensed spectrum.

R1-2203735 3GPP TSG RAN WG1 #109-e, e-Meeting, May 9-20, 2022, Source: Sony, Title: Discussion on physical channel design framework for SL-unlicensed.

R1-2203819 3GPP TSG RAN WG1 #109-e, e-Meeting, May 9-20, 2022, Source: Xiaomi, Title: Physical channel design for sidelink-unlicensed.

R1-2203907 3GPP TSG RAN WG1 #109-e, e-Meeting, May 9-20, 2022, Source: Samsung, Title: On physical channel design framework for sidelink on FR1 unlicensed spectrum.

R1-2203983 3GPP TSG RAN WG1 #109-e, e-Meeting, May 9-20, 2022, Source: OPPO, Title: Physical channel designs of NR sidelink in unlicensed channel.

R1-2204085 3GPP TSG RAN WG1 #109-e, e-Meeting, May 9-20, 2022, Source: CableLabs, Title: Discussion on resources on sidelink operation in unlicensed spectrum.

R1-2204098 3GPP TSG RAN WG1 #109-e, e-Meeting, May 9-20, 2022, Source: Futurewei, Title: Discussion of physical channel designs for sidelink transmission in unlicensed spectrum.

R1-2204121 3GPP TSG RAN WG1 #109-e, e-Meeting, May 9-20, 2022, Source: Hyundai Motors, Title: Discussion on physical channel design framework for sidelink on unlicensed spectrum.

R1-2204248 3GPP TSG RAN WG1 #109-e, e-Meeting, May 9-20, 2022, Source: Apple, Title: On Physical Channel Design Framework for Sidelink on FR1 Unlicensed Spectrum.

R1-2204307 3GPP TSG RAN WG1 #109-e, e-Meeting, May 9-20, 2022, Source: CMCC, Title: Discussion on physical channel design framework for sidelink on unlicensed spectrum.

R1-2204383 3GPP TSG RAN WG1 #109-e, e-Meeting, May 9-20, 2022, Source: NTT Docomo, Inc., Title: Discussions on channel design framework in SL-U.

R1-2204428 3GPP TSG RAN WG1 #108-e, e-Meeting, February 21- Mar. 3, 2022, Source: Sharp, Title: Discussion on physical channel design framework for NR sidelink evolution on unlicensed spectrum.

R1-2204553 3GPP TSG RAN WG1 #109-e, e-Meeting, May 9-20, 2022, Source: Wilus Inc., Title: Discussion on PHY channel design framework for SL on unlicensed spectrum.

R1-2204581 3GPP TSG RAN WG1 #109-e, e-Meeting, May 9-20, 2022, Source: Transsion Holdings, Title: Discussion of physical channel design for sidelink in unlicensed spectrum.

R1-2204608 3GPP TSG RAN WG1 #109-e, e-Meeting, May 9-20, 2022, Source: Fraunhofer HHI, Fraunhofer IIS, Title: NR Sidelink Unlicensed Physical Channel Design.

R1-2204731 3GPP TSG RAN WG1 #109-e, e-Meeting, May 9-20, 2022, Source: MediaTek Inc., Title: Discussion on physical channel design framework.

R1- 2204742 3GPP TSG RAN WG1 #109-e, e-Meeting, May 9-20, 2022, Source: Ericsson, Title: PHY channel design framework for SL-U.

R1-2204803 3GPP TSG RAN WG1 #109-e, e-Meeting, May 9-20, 2022, Source: Intel Corporation, Title: On the Enhancements to the Physical Channel Design for SL Operating in Unlicensed Spectrum.

R1-2205034 3GPP TSG RAN WG1 #109-e, e-Meeting, May 9-20, 2022, Source: Qualcomm Incorporated, Title: Physical Channel Design for Sidelink on Unlicensed Spectrum.

R1-2205241 3GPP TSG RAN WG1 #109-e, e-Meeting, May 9-20, 2022, Source: Moderator (Huawei), Title: FL summary#4 for AI 9.4.1.2 SL-U physical channel design framework.

Nov. 13, 2023—European Search Report—EP App. No. 23189828.9.

R1-2203750 3GPP TSG RAN WG1 #109-e, e-Meeting, May 9-20, 2022, Source: Panasonic, Title: Physical channel design for sidelink on unlicensed spectrum.

* cited by examiner

Figure 3:
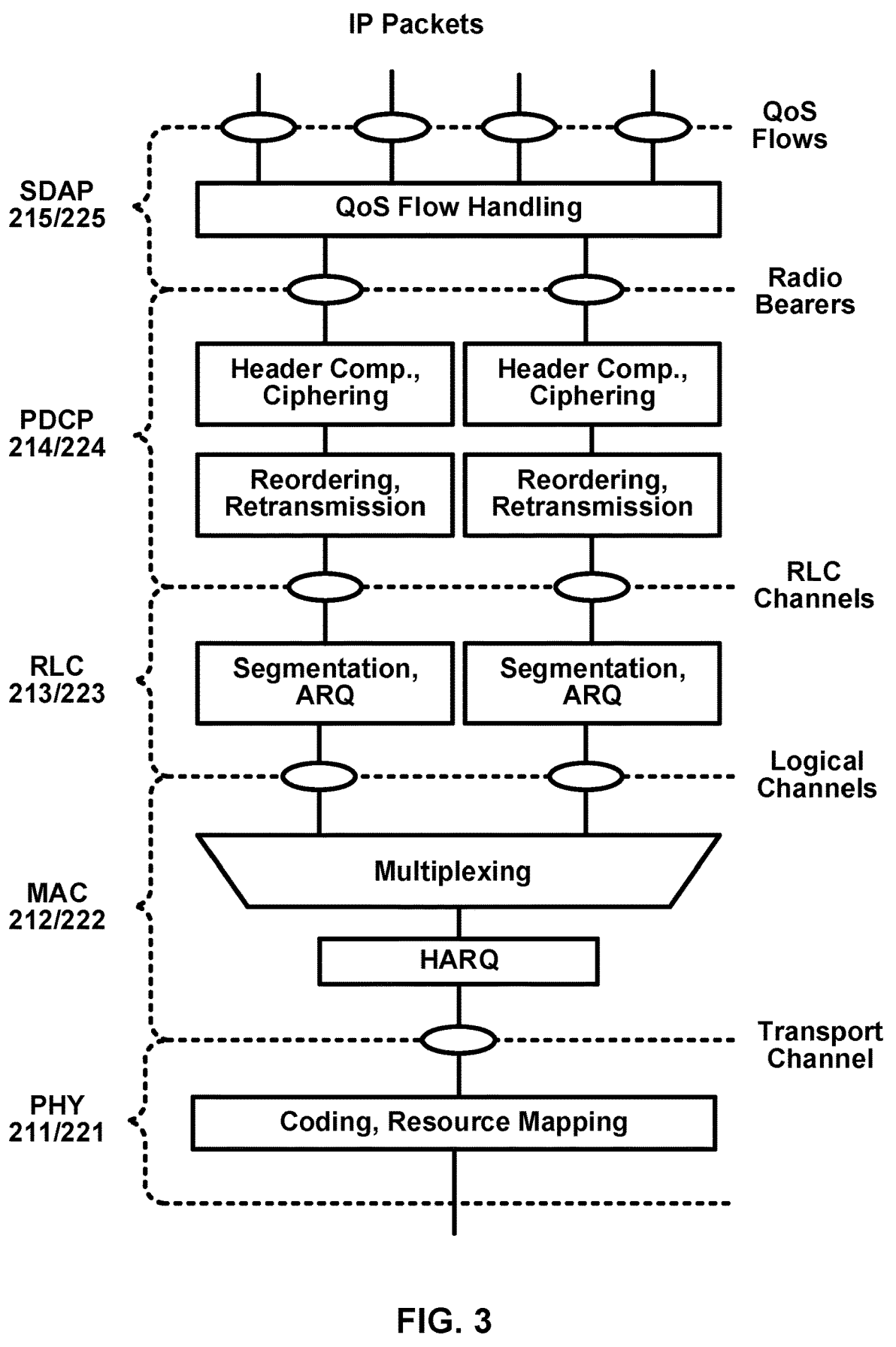

IP Packets

QoS Flows

SDAP 215/225

QoS Flow Handling

Radio Bearers

PDCP 214/224

Header Comp., Ciphering

Header Comp., Ciphering

Reordering, Retransmission

Reordering, Retransmission

RLC Channels

RLC 213/223

Segmentation, ARQ

Segmentation, ARQ

Logical Channels

MAC 212/222

Multiplexing

HARQ

Transport Channel

PHY 211/221

Coding, Resource Mapping

Uplink

FIG. 5A

Downlink

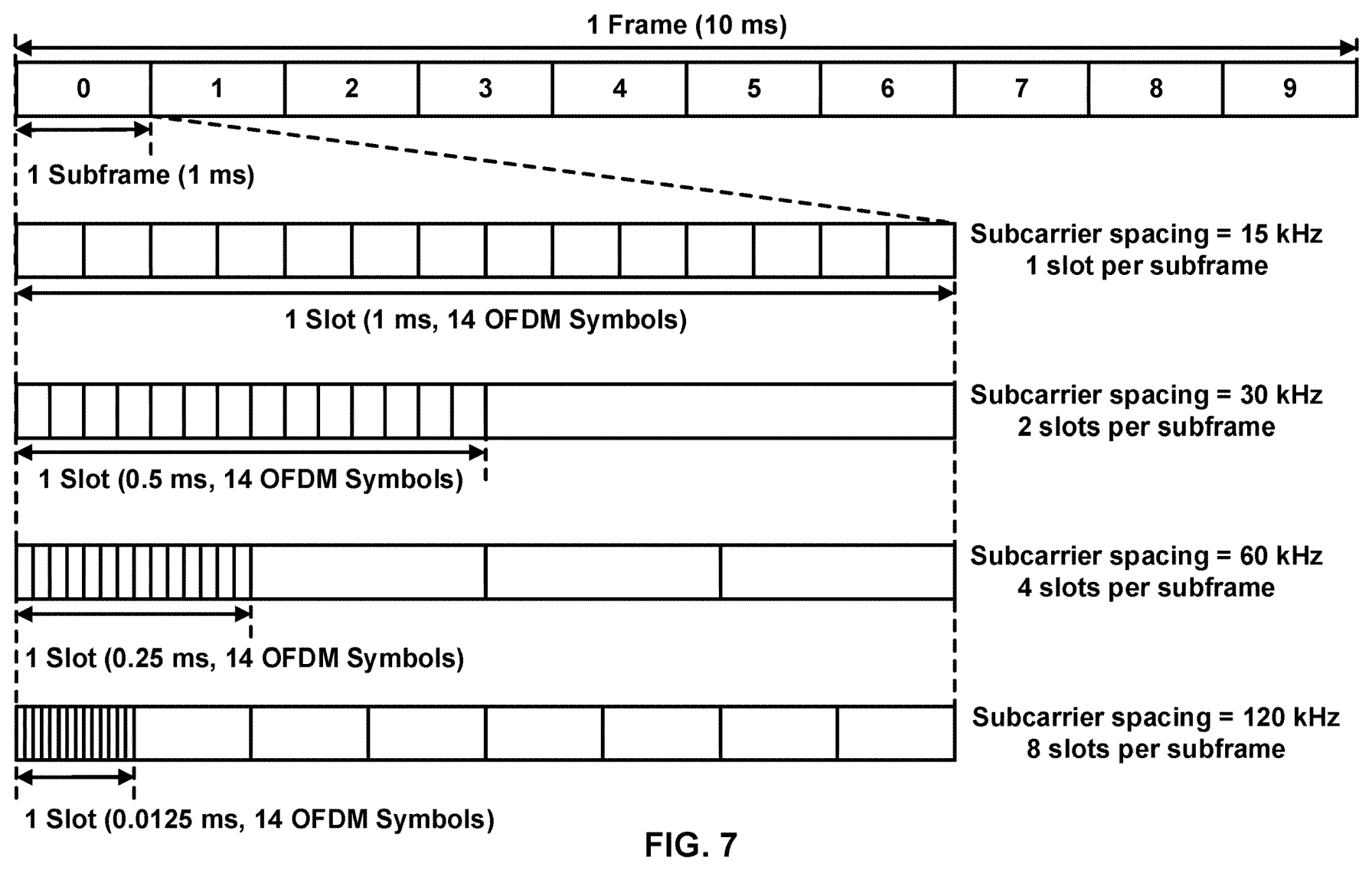

1 Frame (10 ms)

| 0 | 1 | 2 | 3 | 4 | 5 | 6 | 7 | 8 | 9 |

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Frequency

Time

```
SL-ResourcePool::=           SEQUENCE {
    ...
    sl-UE-SelectedConfigRP           SL-UE-SelectedConfigRP
    ...
    sl-PreemptionEnable              ENUMERATED {enabled, pl1, pl2, pl3, pl4,
pl5, pl6, pl7, pl8}
    ...
    sl-TxPercentageList              SL-TxPercentageList
    ...
} sl-UE-SelectedConfigRP ::=    SEQUENCE {
    ...
    sl-ThresPSSCH-RSRP-List          SL-ThresPSSCH-RSRP-List
    sl-MultiReserveResource          ENUMERATED {enabled}
    sl-MaxNumPerReserve              ENUMERATED {n2, n3}
    sl-SensingWindow                 ENUMERATED {ms100, ms1100}
    sl-SelectionWindowList           SL-SelectionWindowList
    sl-ResourceReservePeriodList     SEQUENCE (SIZE (1..16)) OF SL-
ResourceReservePeriod
    sl-RS-ForSensing                 ENUMERATED {pscch, pssch},
    ...
}
```

FIG. 21

```
SL-ResourceReservePeriod ::=        CHOICE {
    sl-ResourceReservePeriod1           ENUMERATED {ms0, ms100, ms200,
ms300, ms400, ms500, ms600, ms700, ms800, ms900, ms1000},
    sl-ResourceReservePeriod2           INTEGER (1..99)
}

SL-SelectionWindowList ::=          SEQUENCE (SIZE (8)) OF SL-
SelectionWindowConfig SL-SelectionWindowConfig ::=        SEQUENCE {
    sl-Priority                         INTEGER (1..8),
    sl-SelectionWindow                  ENUMERATED {n1, n5, n10, n20}
}

SL-TxPercentageList ::=             SEQUENCE (SIZE (8)) OF SL-
TxPercentageConfig SL-TxPercentageConfig ::=           SEQUENCE {
    sl-Priority                         INTEGER (1..8),
    sl-TxPercentage                     ENUMERATED {p20, p35, p50}
}
```

FIG. 22

```
SL-ResourcePool ::= SEQUENCE {
  ...
  sl-SubchannelSize        ENUMERATED {n10, n12, ...}
  sl-StartRB-Subchannel    INTEGER (0..xx)
  sl-NumSubchannel         INTEGER (1..yy)
  sl-NumRBInterlace        INTEGER (1..zz)
  ...
}
```

```
SL-ResourcePool ::= SEQUENCE {
  ...
  sl-NumSubchannel     INTEGER (1..yy)
  sl-CoeffRBInterlace  ENUMERATED {coefficient1, coefficient2, ...}
  ...
}
```

Receive a message indicating a quantity of RB interlaces
of a sidelink RP
3910

Select RB(s) for sidelink transmission(s) in the sidelink RP
based on the message
3920

Transmit the sidelink transmission(s)
based on the selected RBs
3930

Receive a message indicating an association between a
1st quantity of subchannels of a sidelink RP and a
quantity of RB interlaces of the sidelink RP
4010

Select RB(s) for sidelink transmission(s) in the sidelink RP
based on the message and a 2nd quantity of subchannels
of the sidelink transmission(s)
4020

Transmit the sidelink transmission(s)
based on the selected RBs
4030

SIDELINK RADIO RESOURCES ON SHARED SPECTRUM

CROSS-REFERENCE TO RELATED APPLICATIONS

This application claims the benefit of U.S. Provisional Application No. 63/395,464, filed on Aug. 5, 2022. The above-referenced application is hereby incorporated by reference in its entirety.

BACKGROUND

A base station and a wireless device communicate via uplink and/or downlink communication. A wireless device communicates with another device (e.g., other wireless devices) via sidelink communications. Frequency domain granularity of resource allocation for an uplink transmission is a resource block (RB).

SUMMARY

The following summary presents a simplified summary of certain features. The summary is not an extensive overview and is not intended to identify key or critical elements.

A base station and/or wireless device may communicate with one or more (other) wireless devices, for example, by using sidelink resources for sidelink transmissions. Sidelink transmissions on a shared spectrum may cause a mismatch between radio resources of the sidelink transmissions and a set of RB interlaces. Transmission resources of a transmission may be mapped to an RB interlace. A sidelink transmission (e.g., via a sidelink RP) may use an RB interlace that is based on a quantity of subchannels indicated in a message from a base station to a wireless device. For example, a wireless device may select at least one RB for a sidelink transmission. The selection may be based on the message from the base station indicating the RB interlace. The sidelink transmission may be transmitted by the first wireless device to a second wireless device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 3 shows example of protocol layers.

FIG. 5A shows an example mapping for downlink channels.

FIG. 5B shows an example mapping for uplink channels.

FIG. 7 shows an example configuration of a frame.

FIG. 21 shows an example of configuration information for sidelink communication.

FIG. 22 shows an example of configuration information for sidelink communication.

DETAILED DESCRIPTION

Figures 1A, 1B:
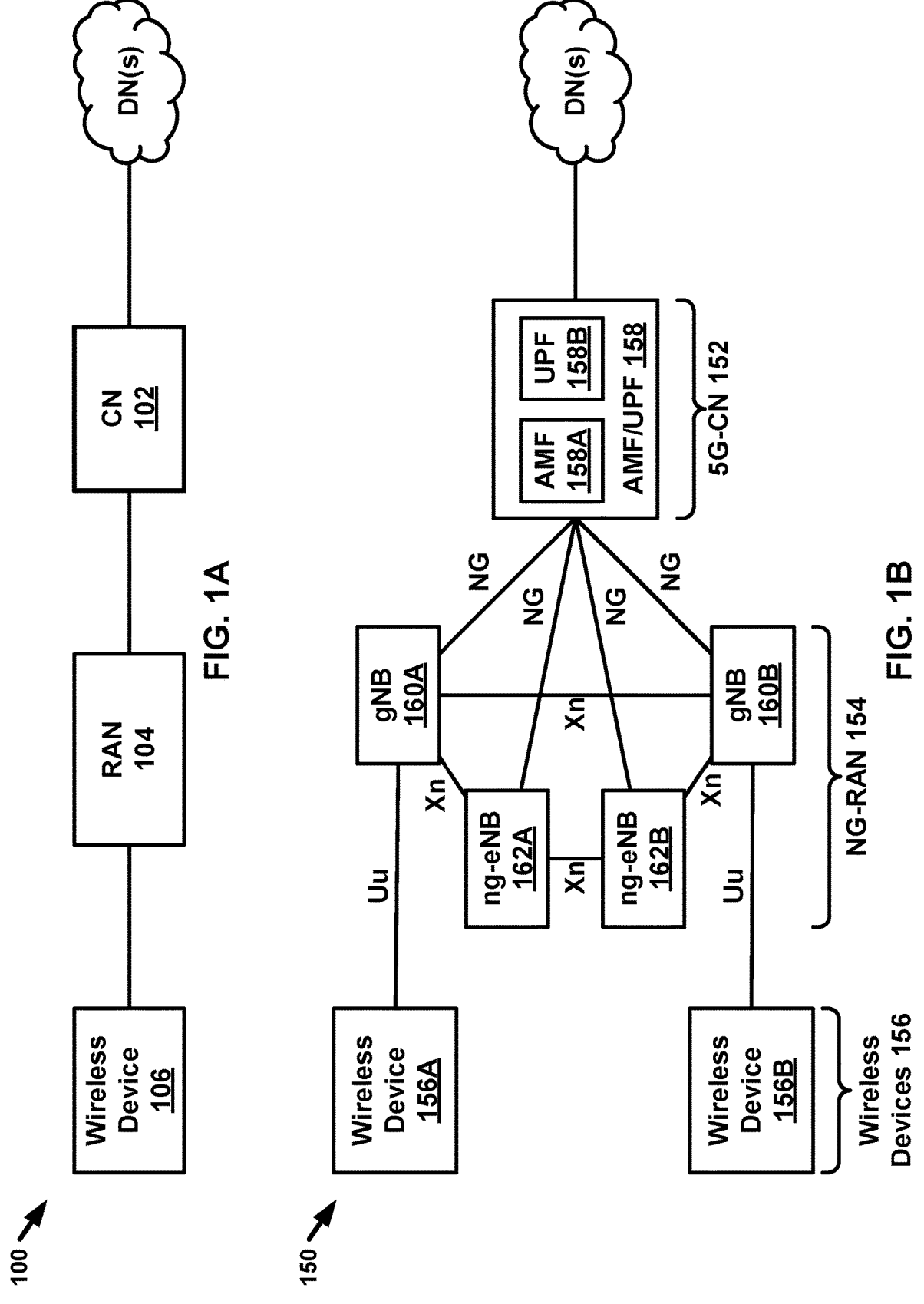
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hot-spots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
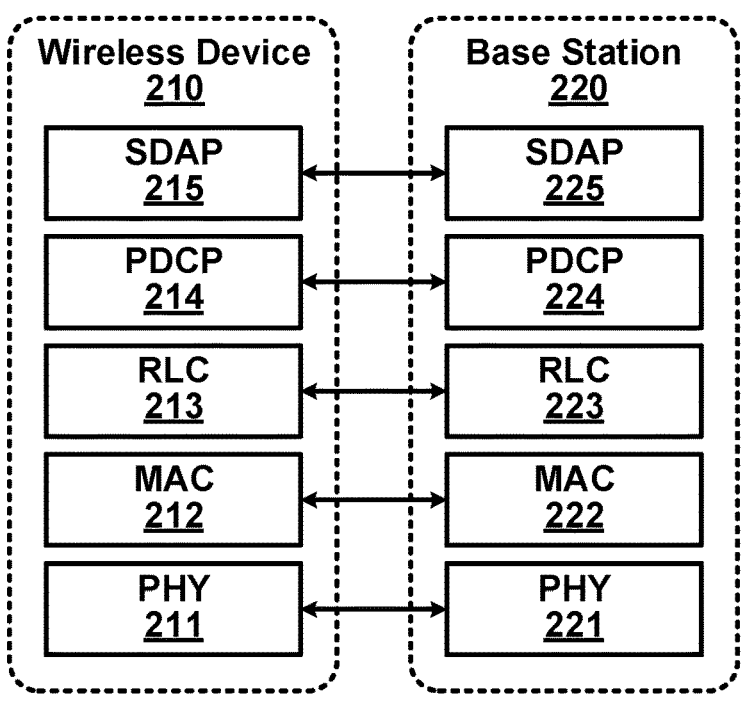
FIG. 2A shows an example user plane.
Figure 2B:
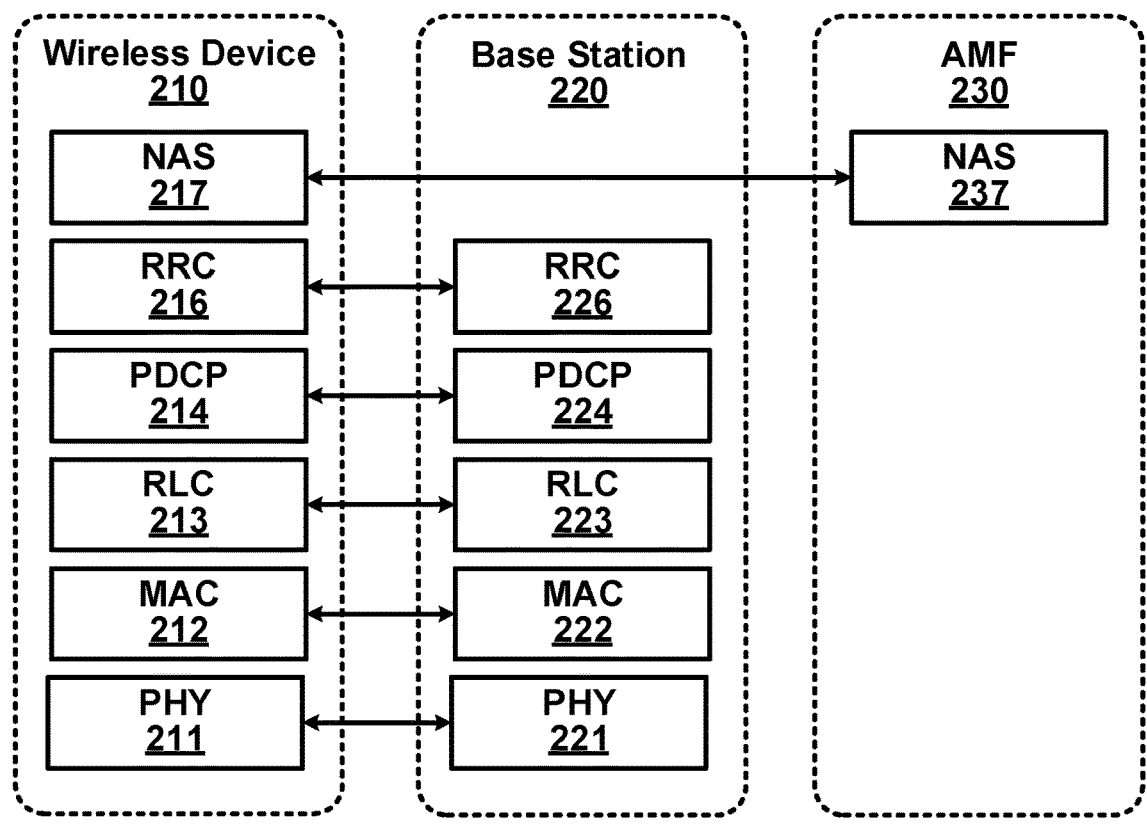
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TB s) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
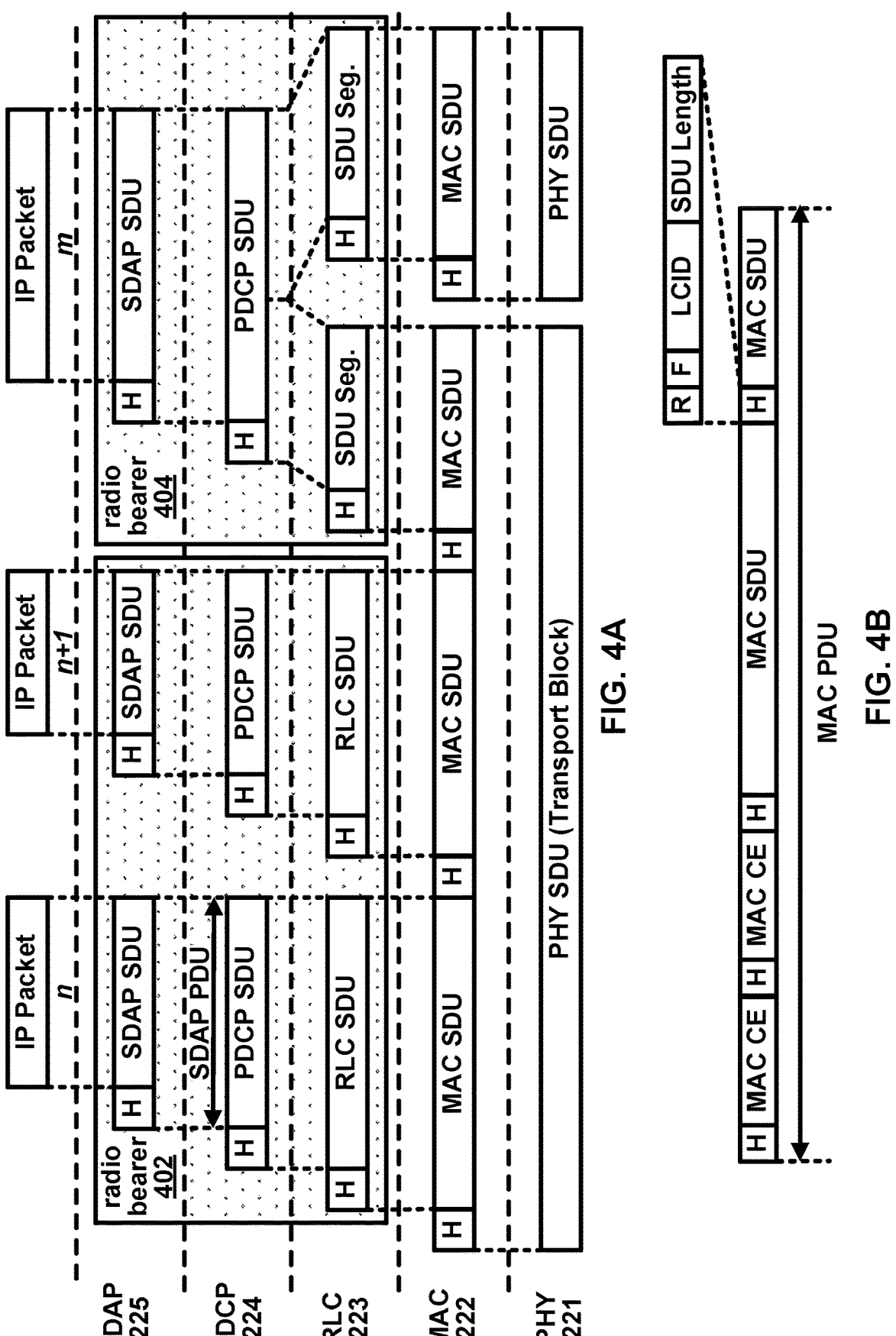
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration) . The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
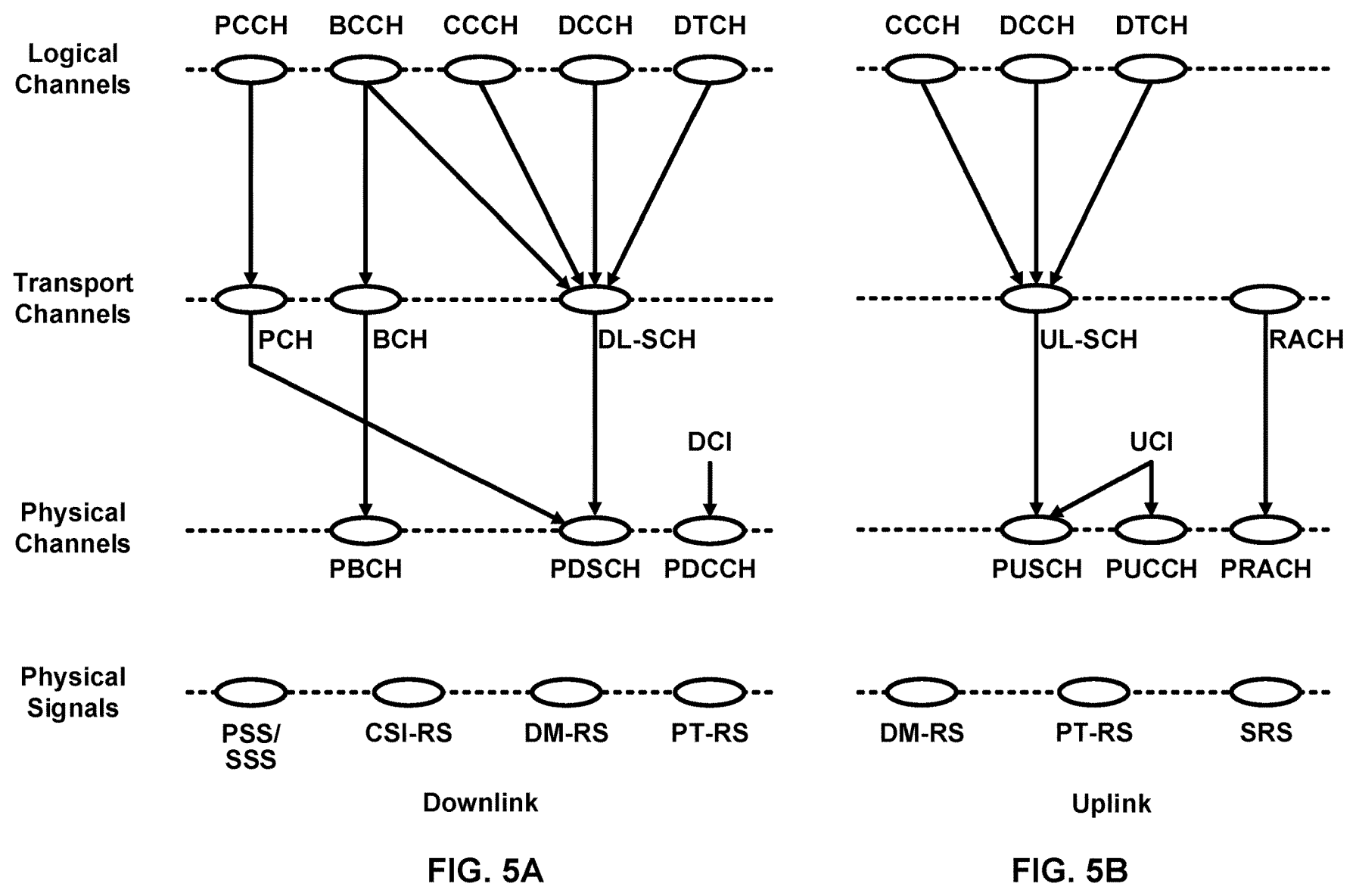

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIB s). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIB s from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities:

broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
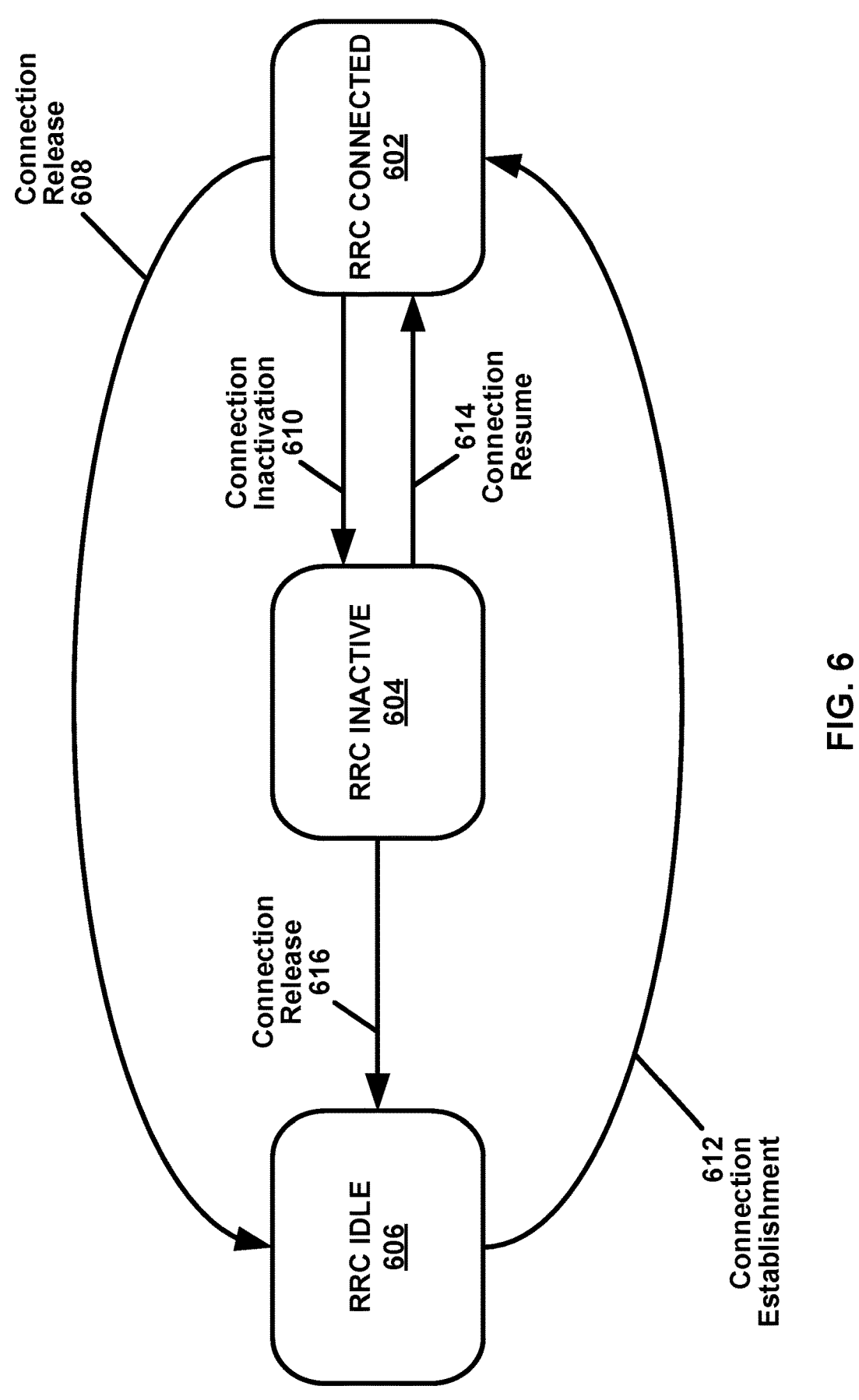
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_I-NACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNB s 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
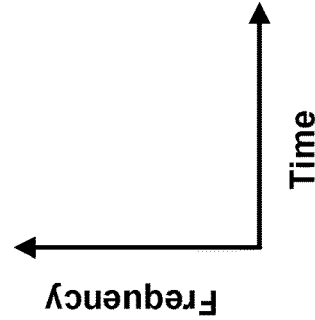
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
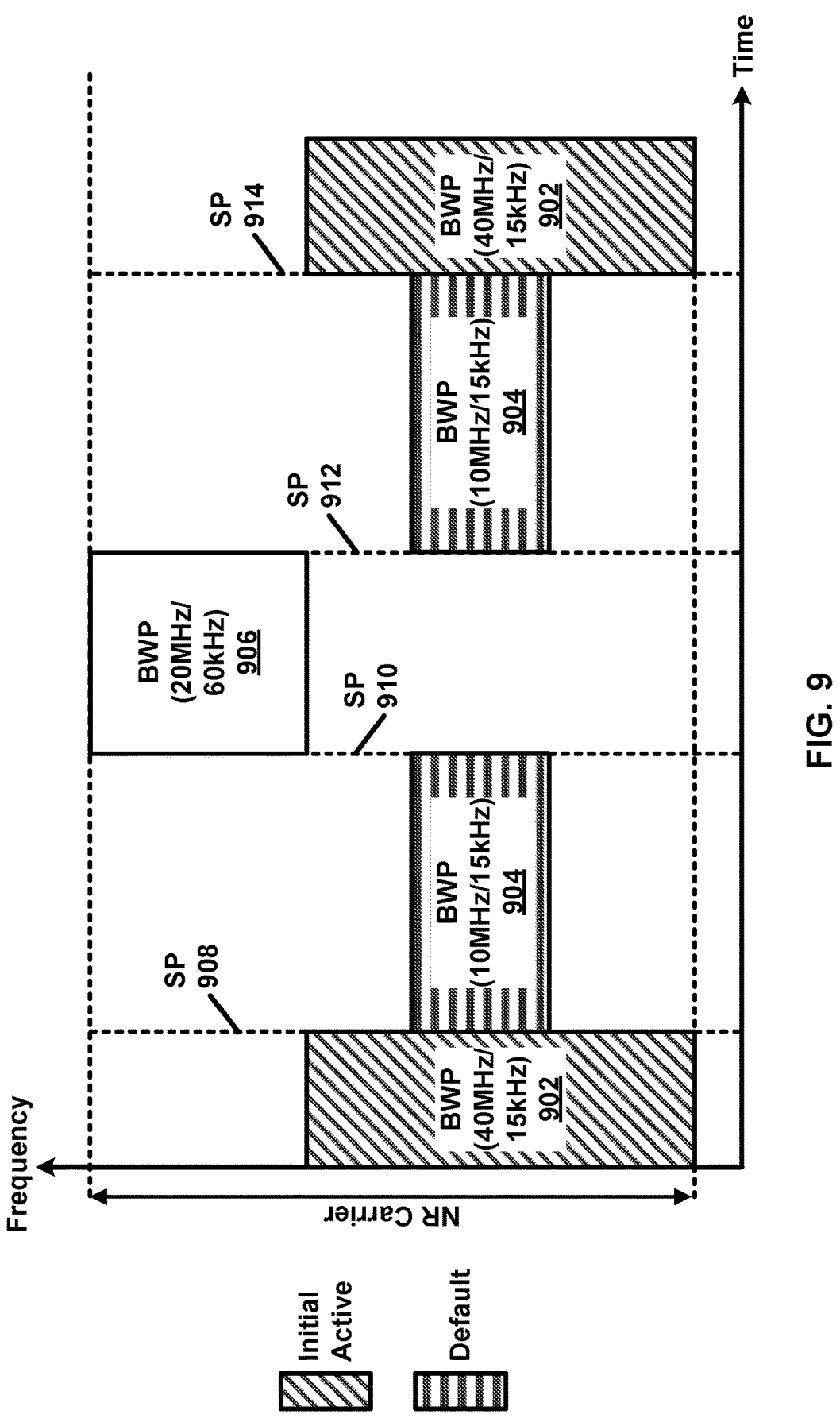
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
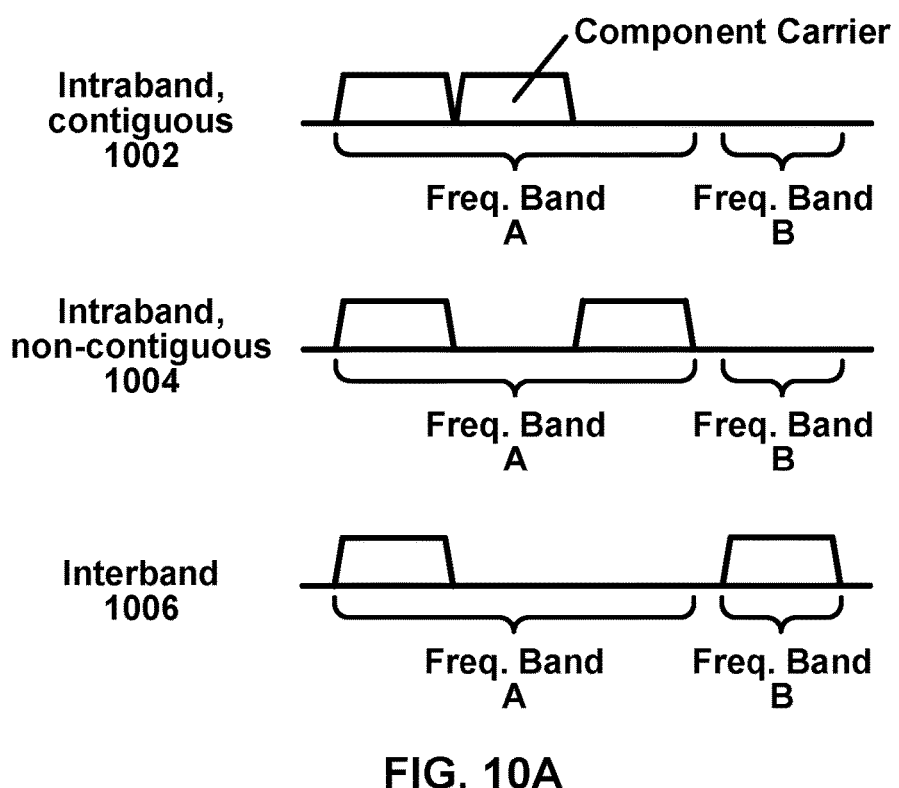
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
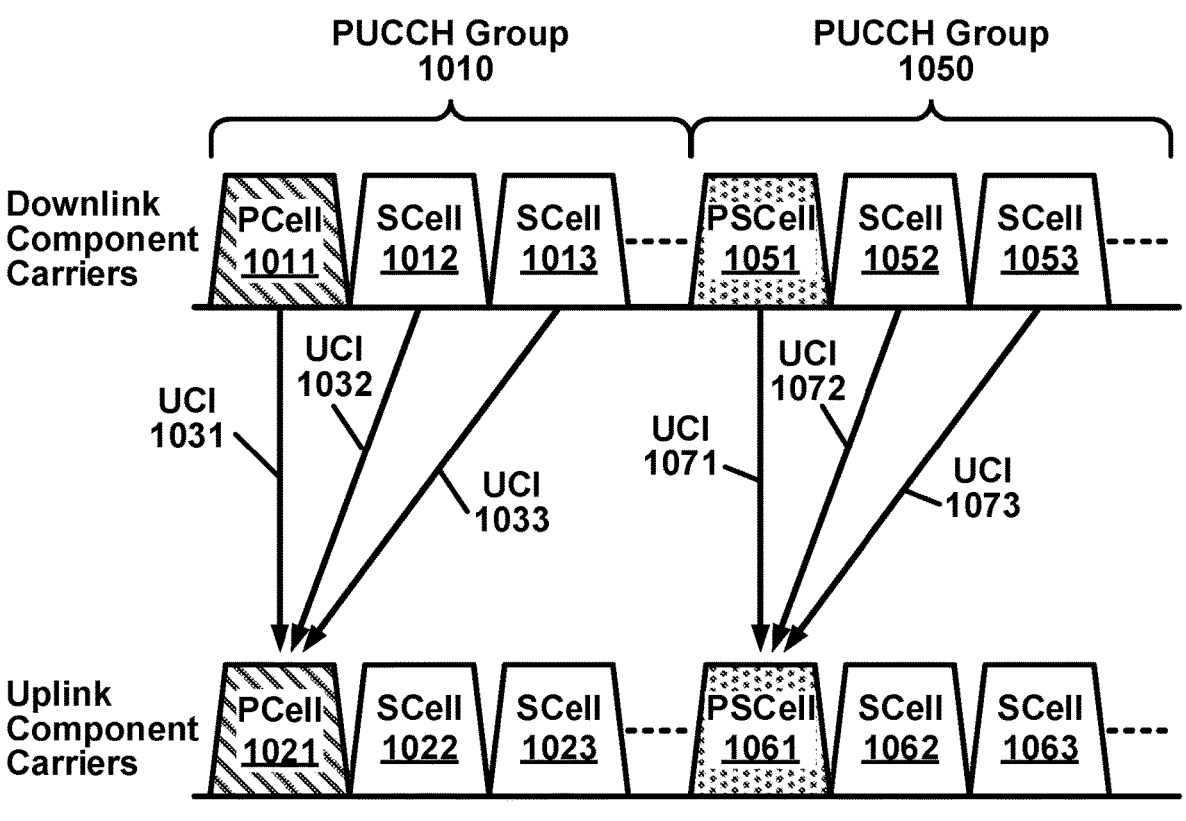
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
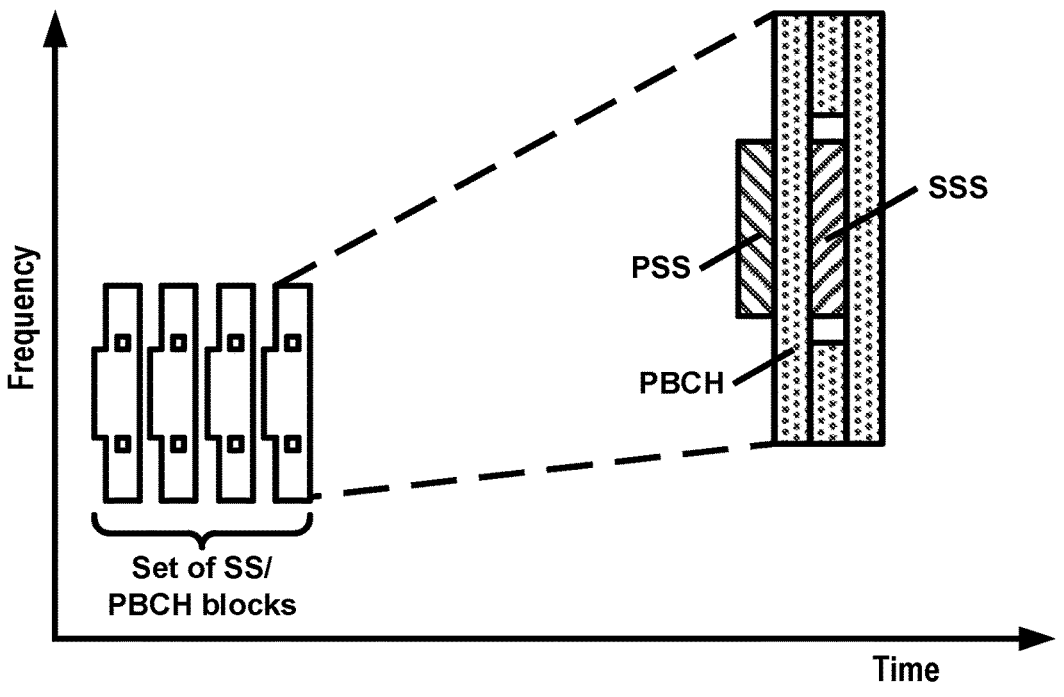
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g., the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
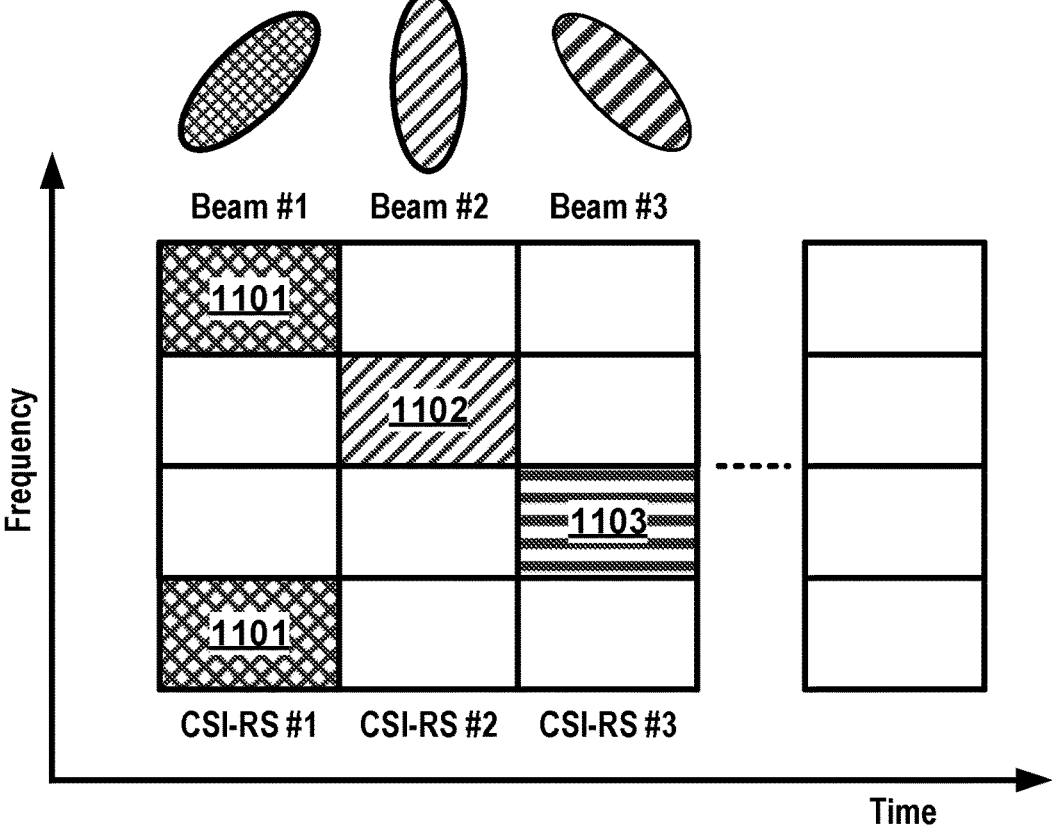
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-con-figZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figures 12A, 12B:
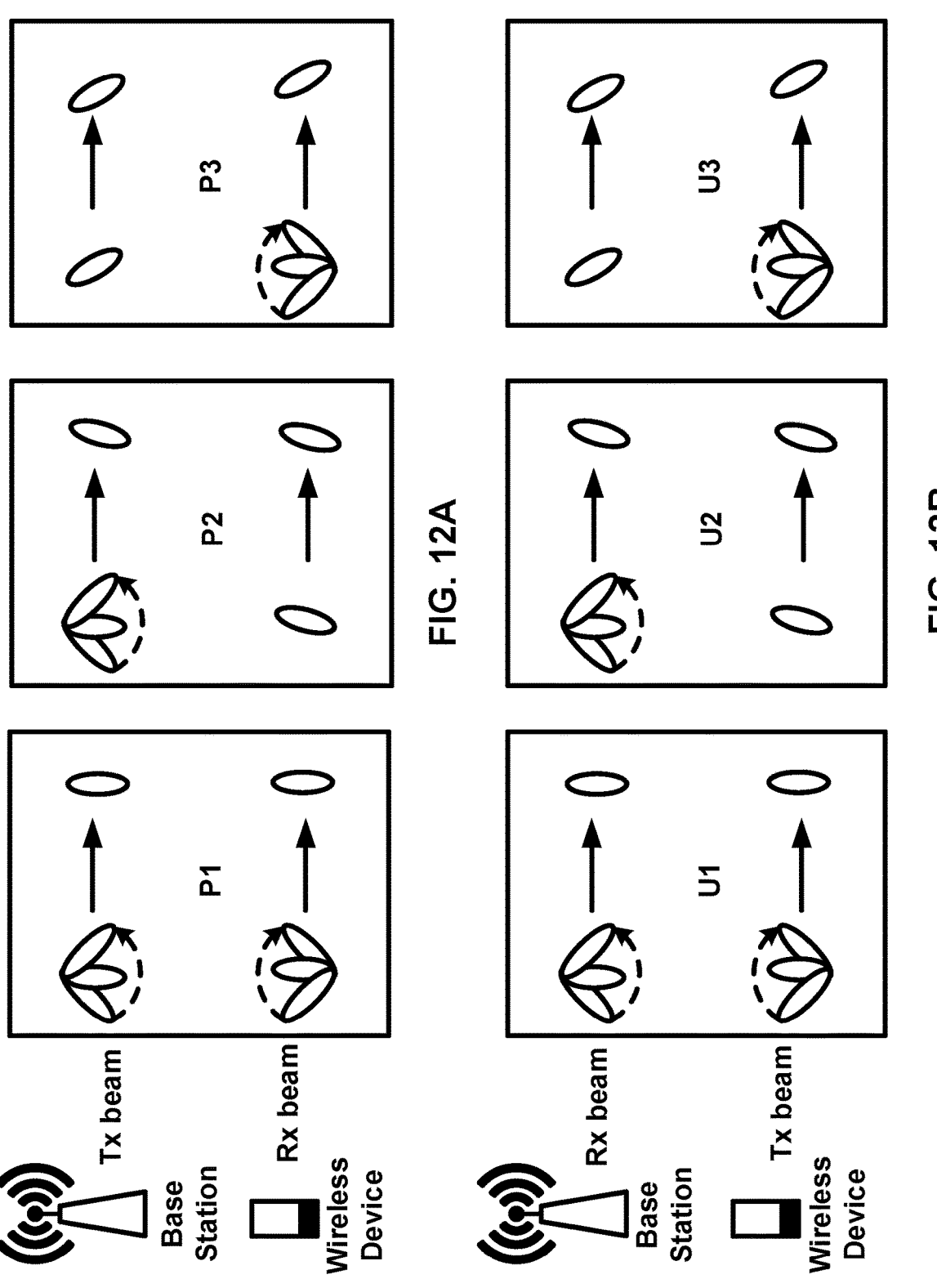
FIG. 12A shows examples of downlink beam management procedures.
FIG. 12B shows examples of uplink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
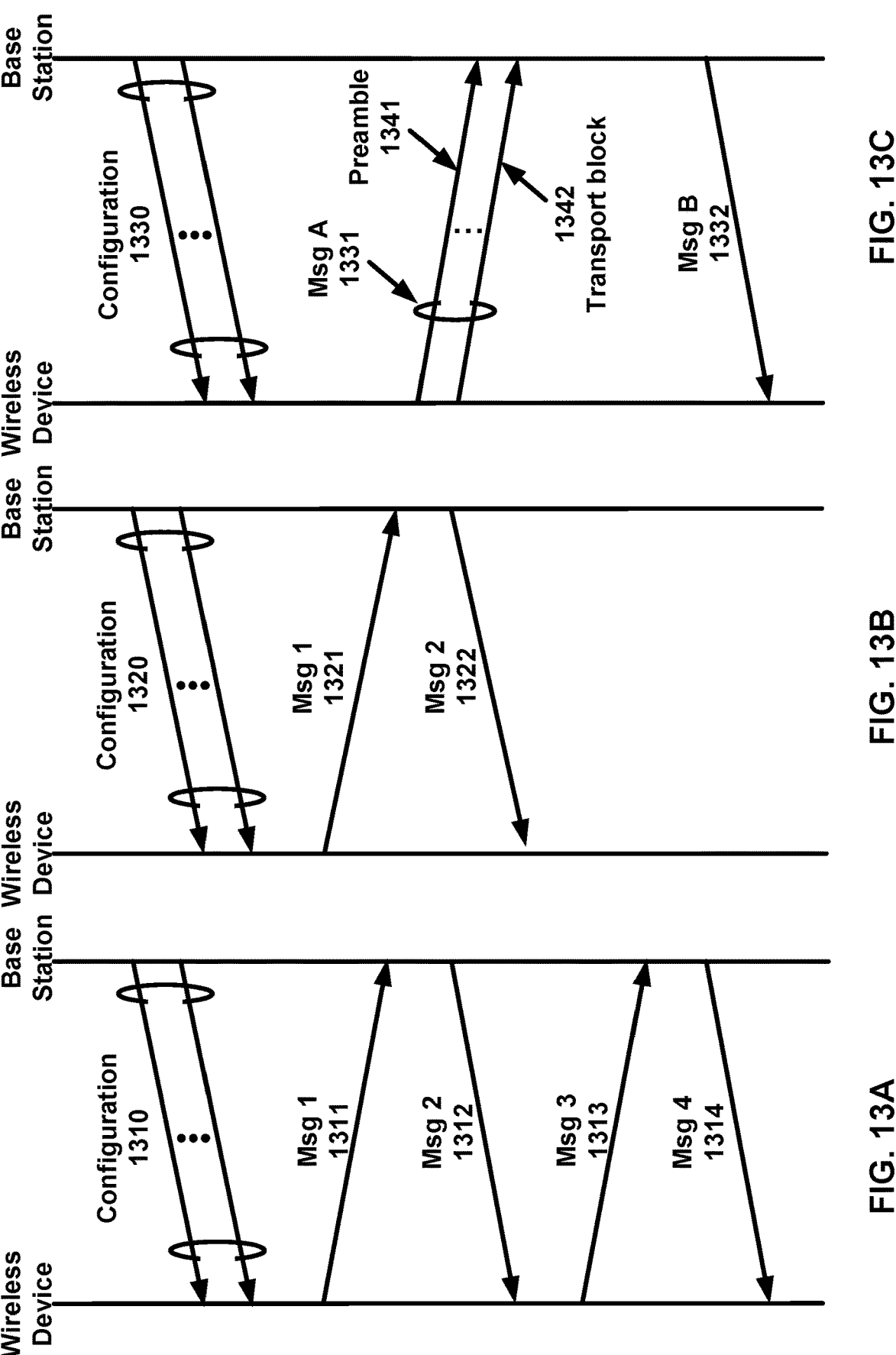
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/ number of preamble transmissions and/or retransmissions, for example, using a counter parameter (e.g., PREAMBLE-_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTrans-Max) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), fid may be an index of the PRACH occasion in the frequency domain (e.g., $0 \leq fid < 8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/ transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/ transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/ transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/ transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/ initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/ transmitted by the wireless device and/or the identifier of the wireless device in second message (e.g., Msg B 1332)

corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
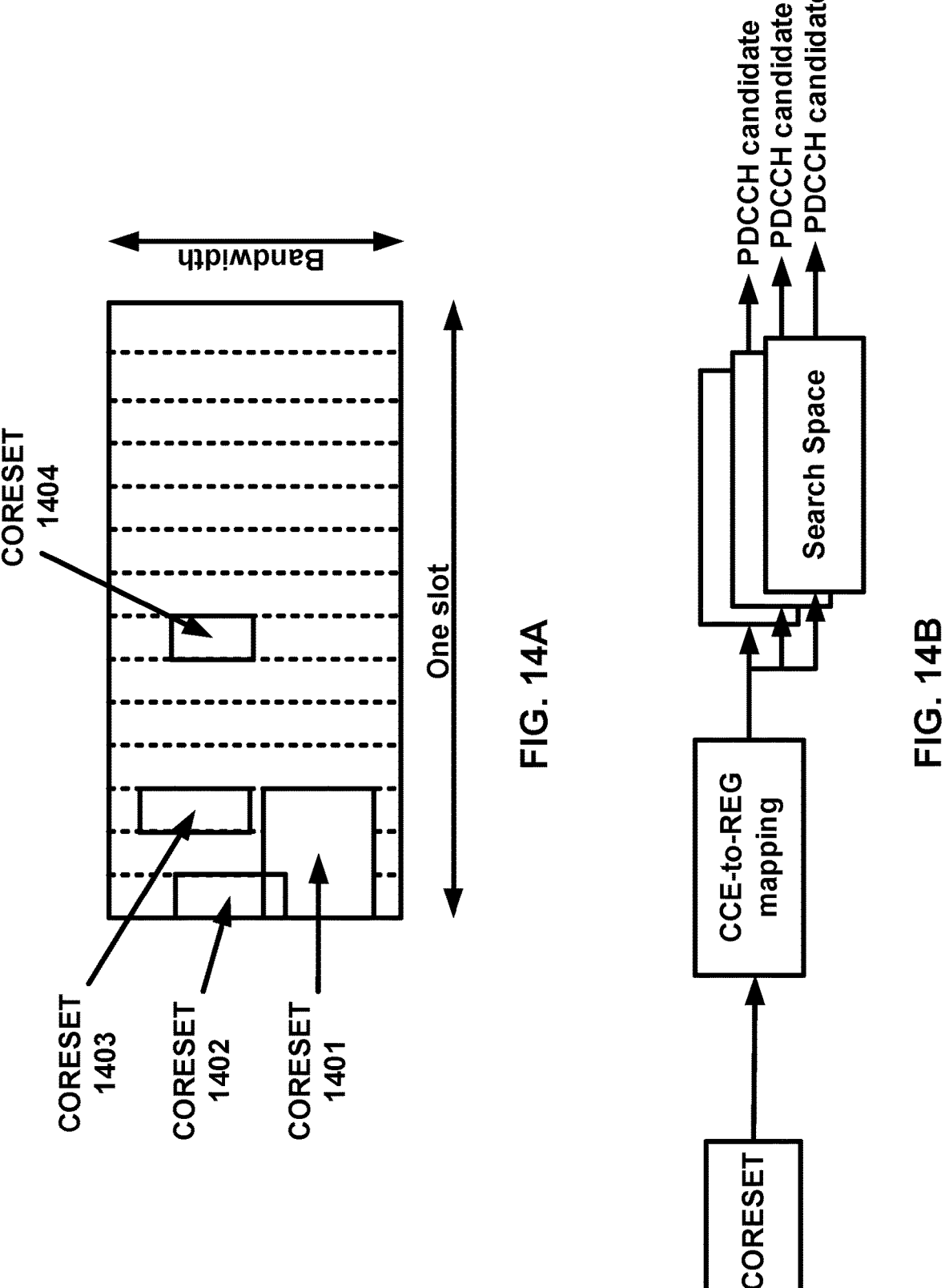
FIG. 14A shows an example of control resource set (CORESET) configurations.
FIG. 14B shows an example of a control channel element to resource element group (CCE-to-REG) mapping.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
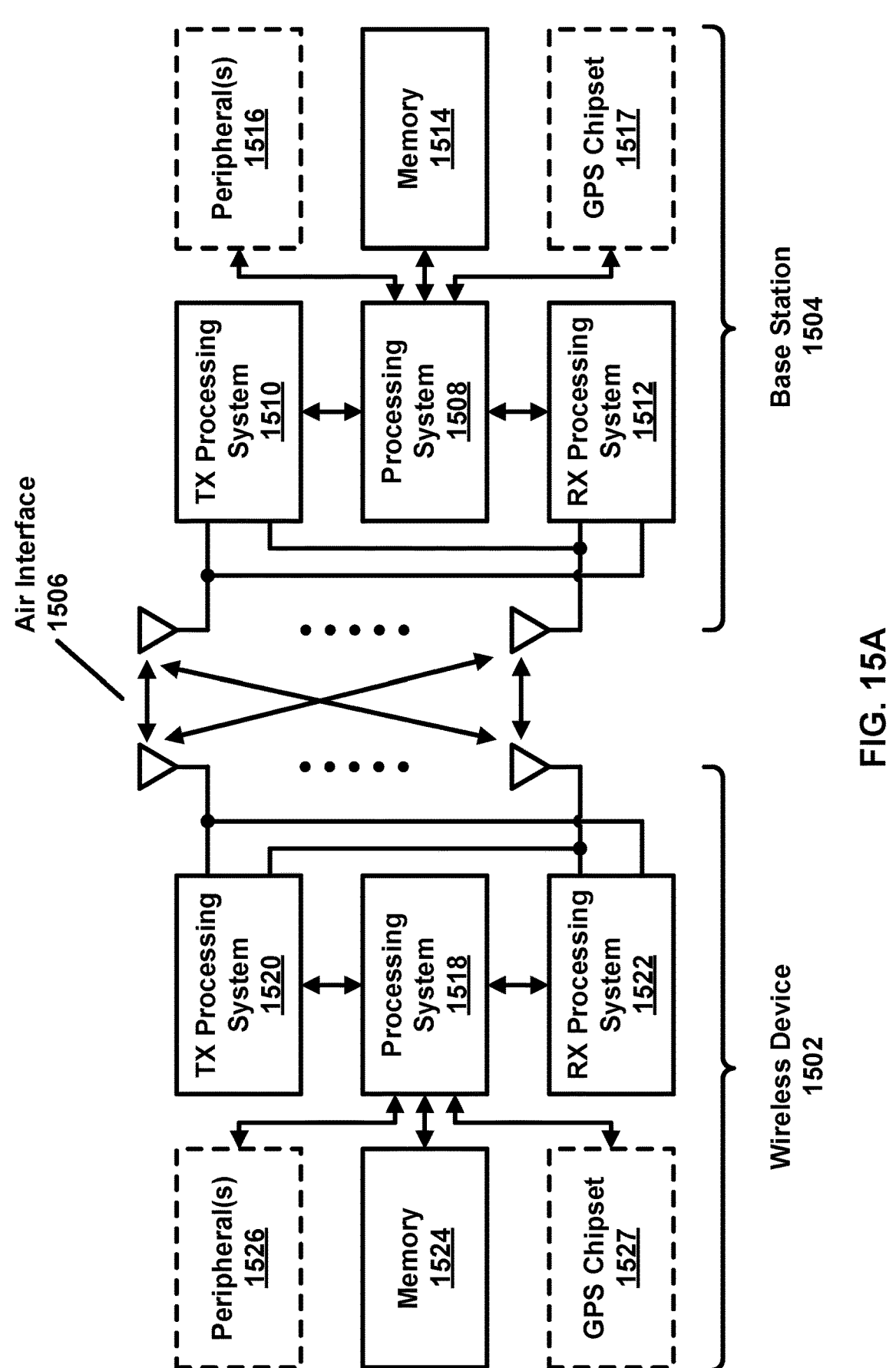
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
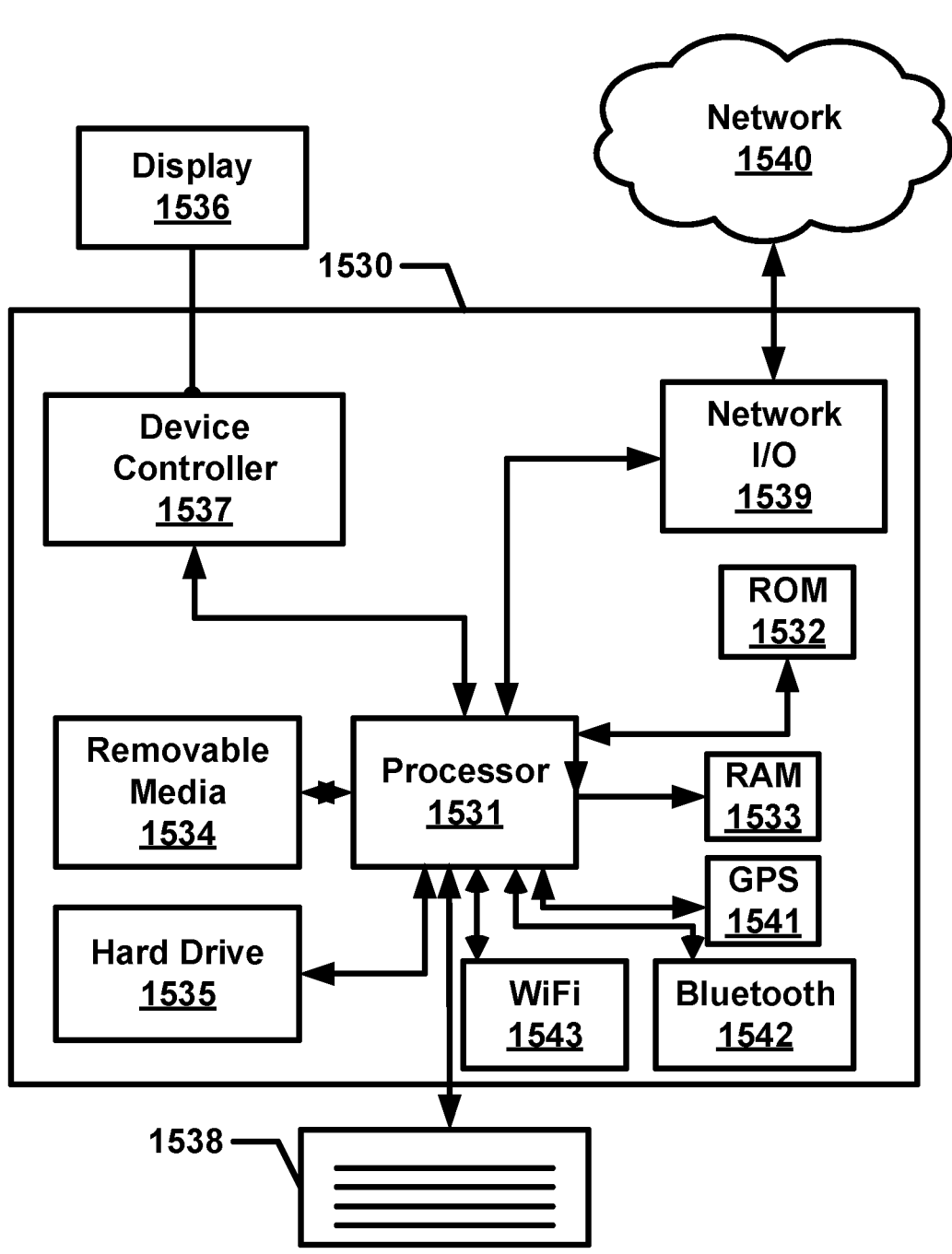
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, 1502, 3210, 3220, 3310, 3320, and/or 3330, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figures 16A, 16B, 16C, 16D:
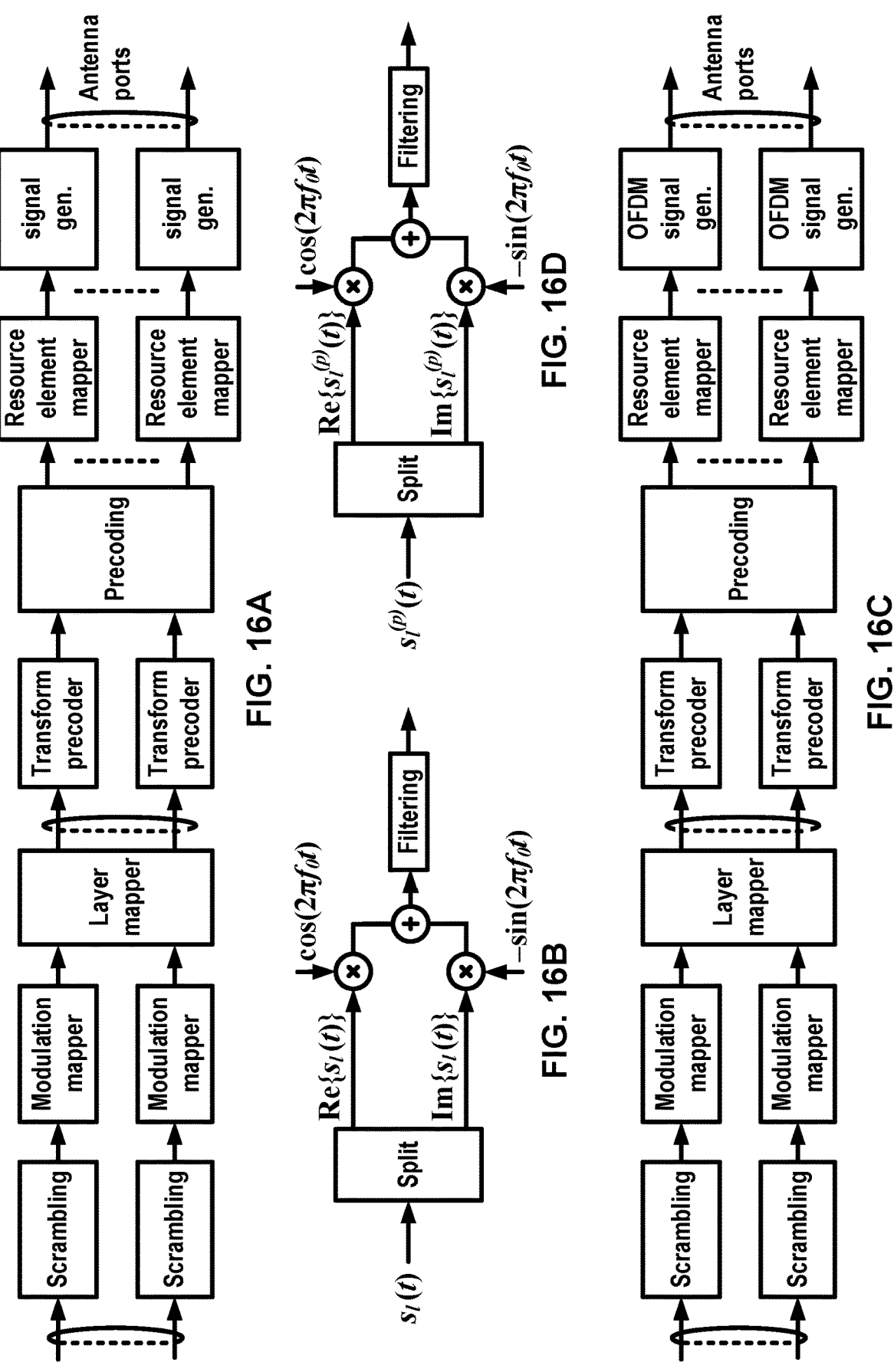
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise:

scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Figure 17:
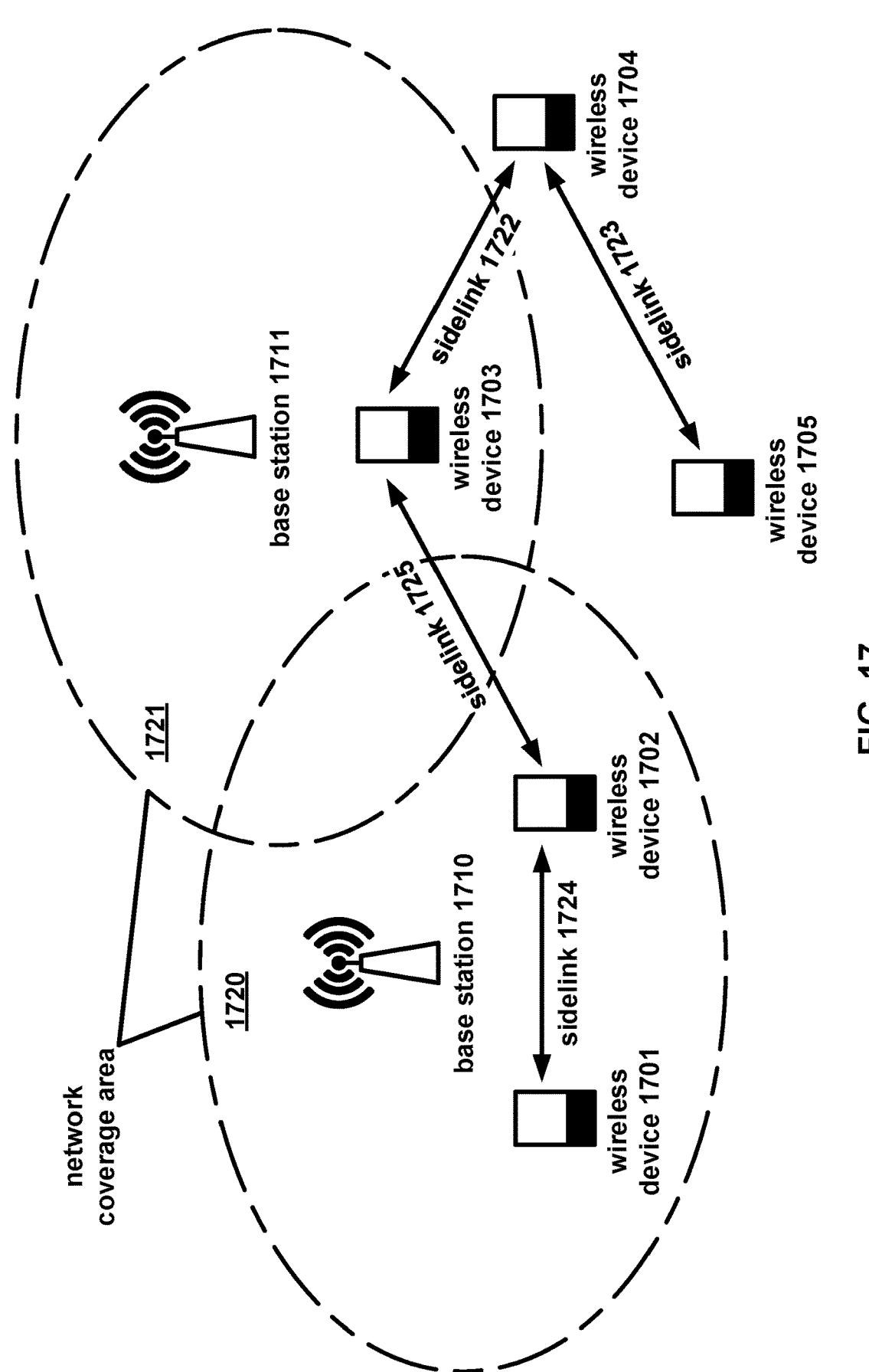
FIG. 17 shows an example of wireless communications.

FIG. 17 shows an example of wireless communications. There may be a direct communication between wireless devices, for example, in wireless communication (e.g., sidelink communications, device-to-device (D2D) communications, vehicle-to-everything (V2X) communications, etc.). The direct communication may be performed via a communications link, such as a sidelink (SL) or any other link. The wireless devices may exchange communications, such as sidelink communications, via an interface such as a sidelink interface (e.g., a PC5 interface). The direct communications, such as sidelink communications, may differ from uplink communications (e.g., in which a wireless device may communicate to a base station) and/or downlink communications (e.g., in which a base station may communicate to a wireless device). Reference made herein to sidelink, SL, and/or to sidelink communications may comprise any link and/or any link communications, including, for example, any direct link and/or any direct link communications between any user devices (e.g., wireless devices, user devices, user equipments, etc.). Although sidelink is used as an example, one skilled in the art will appreciate that any communications can use these concepts. A wireless device and a base station may exchange uplink and/or downlink communications via an interface, such as a user plane interface (e.g., a Uu interface).

A first wireless device (e.g., a wireless device 1701) and a second wireless device (e.g., a wireless device 1702) may be in a first coverage area (e.g., a coverage area 1720) of a first base station (e.g., a base station 1710). The first wireless device and the second wireless device may communicate with the first base station, for example, via a Uu interface. The coverage area may comprise any quantity of wireless devices that may communicate with the base station. A third wireless device (e.g., a wireless device 1703) may be in a second coverage area (e.g., a coverage area 1721) of a second base station (e.g., a base station 1711). The second coverage area may comprise any quantity of wireless devices that may communicate with the second base station. The first base station and the second base station may share a network and/or may jointly establish/provide a network coverage area (e.g., 1720 and 1721). A fourth wireless device (e.g., a wireless device 1704) and a fifth wireless device (e.g., a wireless device 1705) may be outside of the network coverage area (e.g., 1720 and 1721). Any quantity of wireless devices that may be outside of the network coverage area (e.g., 1720 and 1721).

Wireless communications may comprise in-coverage D2D communication. In-coverage D2D communication may be performed, for example, if two or more wireless devices share a network coverage area. The first wireless device and the second wireless device may be in the first coverage area of the first base station. The first wireless device and the second wireless device may perform a direct communication (e.g., an in-coverage intra-cell direct communication via a sidelink 1724). The second wireless device and the third wireless device may be in the coverage areas of different base stations (e.g., 1710 and 1711) and/or may share the same network coverage area (e.g., 1720 and/or 1721). The second wireless device and the third wireless device may perform a direct communication (e.g., an in-coverage inter-cell direct communication via a sidelink 1725). Partial-coverage direct communications (e.g., partial-coverage D2D communications, partial-coverage V2X communications, partial-coverage sidelink communications, etc.) may be performed. Partial-coverage direct communications may be performed, for example, if one wireless device is within the network coverage area and the other wireless device is outside the network coverage area. The third wireless device and the fourth wireless device may perform a partial-coverage direct communication (e.g., via a sidelink 1722). Out-of-coverage direct communications may be performed. Out-of-coverage direct communications may be performed, for example, if both wireless devices are outside of a network coverage area. The fourth wireless device and the fifth wireless device may perform an out-of-coverage direct communication (e.g., via a sidelink 1723).

Wireless communications, such as sidelink communications, may be configured using physical channels. Wireless communications, such as sidelink communications, may be configured using physical channels, for example, a physical sidelink broadcast channel (PSBCH), a physical sidelink feedback channel (PSFCH), a physical sidelink discovery channel (PSDCH), a physical sidelink control channel (PSCCH), and/or a physical sidelink shared channel (PSSCH). PSBCH may be used by a first wireless device to send broadcast information to a second wireless device. A PSBCH may be similar in some respects to a PBCH. The broadcast information may comprise a slot format indication, resource pool information, a sidelink system frame number, and/or any other suitable broadcast information. A PSFCH may be used by a first wireless device to send feedback information to a second wireless device. The feedback information may comprise HARQ feedback information. A PSDCH may be used by a first wireless device to send discovery information to a second wireless device. The discovery information may be used by a wireless device to signal its presence and/or the availability of services to other wireless devices in the area. A PSCCH may be used by a first wireless device to send sidelink control information (SCI) to a second wireless device. A PSCCH may be similar in some respects to PDCCH and/or PUCCH. The control information may comprise time/frequency resource allocation information (e.g., RB size, a number of retransmissions, etc.), demodulation related information (e.g., DM-RS, MCS, redundancy version (RV), etc.), identifying information for a sending (e.g., transmitting) wireless device and/or a receiving wireless device, a process identifier (e.g., HARQ, etc.), and/or any other suitable control information. The PSCCH may be used to allocate, prioritize, and/or reserve sidelink resources for sidelink transmissions. PSSCH may be used by a first wireless device to send and/or relay data and/or network information to a second wireless device. PSSCH may be similar in some respects to PDSCH and/or PUSCH. A sidelink channel may be associated with one or more demodulation reference signals. For example, each of the sidelink channels may be associated with one or more demodulation reference signals. Sidelink operations may utilize sidelink synchronization signals to establish a timing of sidelink operations. Wireless devices configured for sidelink operations may send sidelink synchronization signals, for example, with the PSBCH. The sidelink synchronization signals may include primary sidelink synchronization signals (PSSS) and/or secondary sidelink synchronization signals (SSSS).

A wireless device may be configured with wireless resources (e.g., sidelink resources). A wireless device may be configured (e.g., pre-configured) for a sidelink. A wireless device may be configured (e.g., pre-configured) with sidelink resource information. A network may broadcast system information relating to a resource pool for a sidelink. A network may configure a particular wireless device with a dedicated sidelink configuration. The configuration may identify/indicate sidelink resources to be used for sidelink operation (e.g., configure a sidelink band combination).

A wireless device may operate in one or more (e.g., different) modes. The wireless device may operate in an assisted mode (e.g., mode 1) and/or an autonomous mode (e.g., mode 2). Mode selection may be based on a coverage status of the wireless device, a radio resource control status of the wireless device, information and/or instructions from the network, and/or any other suitable factors. The wireless device may select to operate in autonomous mode. The wireless device may select to operate in autonomous mode, for example, if the wireless device is idle or inactive, or if the wireless device is outside of network coverage. The wireless device may select to operate (or be instructed by a base station to operate) in an assisted mode. The wireless device may select to operate (or be instructed by a base station to operate) in an assisted mode, for example, if the wireless device is in a connected mode (e.g., connected to a base station). The network (e.g., a base station) may instruct a connected wireless device to operate in a particular mode.

The wireless device may request scheduling from the network. The wireless device may request scheduling from the network, for example, in an assisted mode. The wireless device may send a scheduling request to the network and the network may allocate sidelink resources to the wireless device. Assisted mode may be referred to as network-assisted mode, gNB-assisted mode, or a base station-assisted mode. The wireless device may select sidelink resources. The wireless device may select sidelink resources, for example, in an autonomous mode. The wireless device may select sidelink resources, for example, based on measurements within one or more resource pools (e.g., pre-configured resource pools, network-assigned resource pools), sidelink resource selections made by other wireless devices, and/or sidelink resource usage of other wireless devices.

A wireless device may use a sensing window. A wireless device may use a selection window. A wireless device may use a sensing window and/or a selection window, for example, to determine/select sidelink resources. The wireless device may receive/determine SCI sent (e.g., transmitted) by other wireless devices using a sidelink resource pool. The wireless device may receive/determine SCI sent (e.g., transmitted) by other wireless devices using the sidelink resource pool, for example, in the sensing window. The SCIs may identify/determine resources that may be used and/or reserved for sidelink transmissions. The wireless device may determine/select resources within the selection window (e.g., resources that are different from the resources identified in the SCIs). The wireless device may determine/select resources within the selection window, for example, based on the resources identified in the SCIs. The wireless device may send (e.g., transmit) using the selected sidelink resources.

Figure 18:
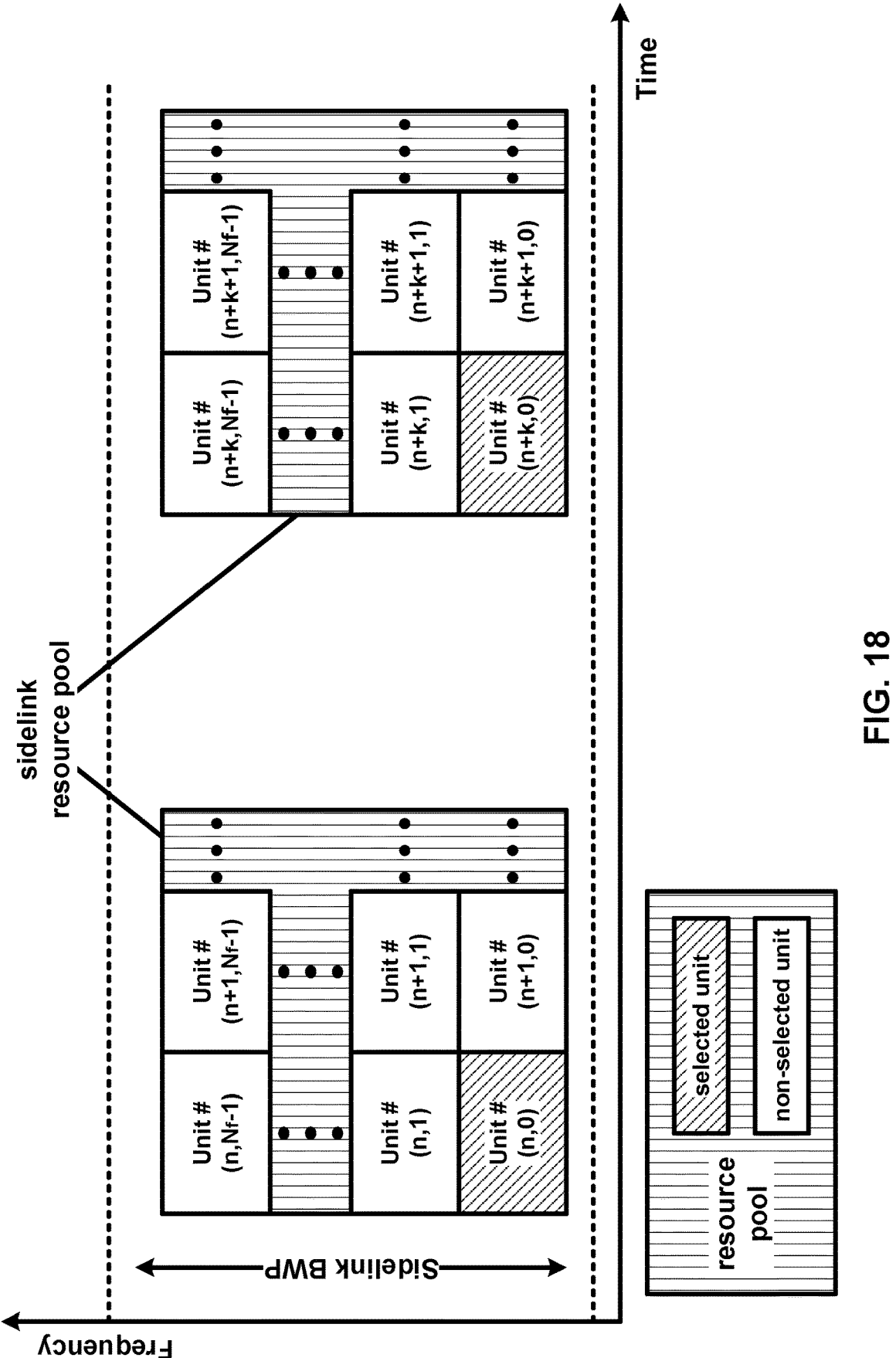
FIG. 18 shows an example of a resource pool for communication link (e.g., a sidelink).

FIG. 18 shows an example of a resource pool for sidelink operations. A wireless device may operate using one or more sidelink cells. A sidelink cell may include one or more resource pools. A resource pool (e.g., each resource pool) may be configured to operate in accordance with a particular mode (e.g., assisted mode, autonomous mode, and/or any other mode). The resource pool may be divided into one or more resource units (e.g., one or more resources). Each resource unit may comprise one or more resource blocks. Each resource unit may comprise one or more resource blocks, for example, in the frequency domain. Each resource unit may comprise one or more resource blocks, for example, which may be referred to as a sub-channel. Each resource unit may comprise one or more slots, one or more subframes, and/or one or more OFDM symbols. Each resource unit may comprise one or more slots, one or more subframes, and/or one or more OFDM symbols, for example, in the time domain. The resource pool may be continuous or non-continuous in the frequency domain and/or the time domain (e.g., comprising contiguous resource units or non-contiguous resource units). The resource pool may be divided into repeating resource pool portions. The resource pool may be shared among one or more wireless devices. Each wireless device may attempt to send (e.g., transmit) using different resource units, for example, to avoid collisions.

A resource pool (e.g., a sidelink resource pool) may be arranged in any suitable manner. The resource pool may be non-contiguous in the time domain and/or confined to a single sidelink BWP, for example, as shown in FIG. 18. Frequency resources may be divided into Nf resource units per unit of time, for example, as shown in FIG. 18. Frequency resources may be numbered from zero to Nf−1, for example, as shown in FIG. 18. The example resource pool may comprise a plurality of portions (e.g., non-contiguous portions) that may repeat every k units of time. Time resources may be numbered as n, n+1 . . . n+k, n+k+1 . . . , etc., for example, as shown in FIG. 18.

A wireless device may determine/select for transmission one or more resource units from a resource pool. The wireless device may select resource unit (n,0) for sidelink transmission. The wireless device may determine/select periodic resource units in later portions of the resource pool, for example, resource unit (n+k,0), resource unit (n+2k,0), resource unit (n+3k,0), etc. The wireless device may determine/select periodic resource units, for example, based on a determination that a transmission using resource unit (n,0) will not (or is not likely) to collide with a sidelink transmission of a wireless device that shares the sidelink resource pool. The determination may be based on behavior of other wireless devices that share the resource pool. The wireless device may select resource unit (n,0), resource (n+k,0), etc., for example, if no sidelink transmissions are detected in resource unit (n−k,0). The wireless device may avoid selection of resource unit (n,1), resource (n+k,1), etc., for example, if a sidelink transmission from another wireless device is detected in resource unit (n−k,1).

Different sidelink physical channels may use different resource pools. PSCCH may use a first resource pool and PSSCH may use a second resource pool. Different resource priorities may be associated with different resource pools. Data associated with a first QoS, service, priority, and/or other characteristic may use a first resource pool and data associated with a second QoS, service, priority, and/or other characteristic may use a second resource pool. A network (e.g., a base station) may configure a priority level for each resource pool, a service to be supported for each resource pool, etc. A network (e.g., a base station) may configure a first resource pool for use by unicast wireless devices (e.g., UEs), a second resource pool for use by groupcast wireless devices (e.g., UEs), etc. A network (e.g., a base station) may configure a first resource pool for transmission of sidelink data, a second resource pool for transmission of discovery messages, etc.

A direct communication between wireless devices may include vehicle-to-everything (V2X) communications. In vehicle-to-everything (V2X) communications via a Uu interface and/or a PC5 interface, the V2X communications may be vehicle-to-vehicle (V2V) communications. The wireless device in the V2V communications may be a vehicle. The V2X communications may be vehicle-to-pedestrian (V2P) communications. A wireless device in the V2P communications may be a pedestrian equipped with a mobile phone (e.g., a handset). The V2X communications may be vehicle-to-infrastructure (V2I) communications. The infrastructure in the V2I communications may be a base station, an access point, a node, and/or a road side unit. A wireless device in the V2X communications may be a sending (e.g., transmitting) wireless device performing one or more sidelink transmissions with a receiving wireless device. The wireless device in the V2X communications may be a receiving wireless device that receives one or more sidelink transmissions from a sending (e.g., transmitting) wireless device.

Figure 19:
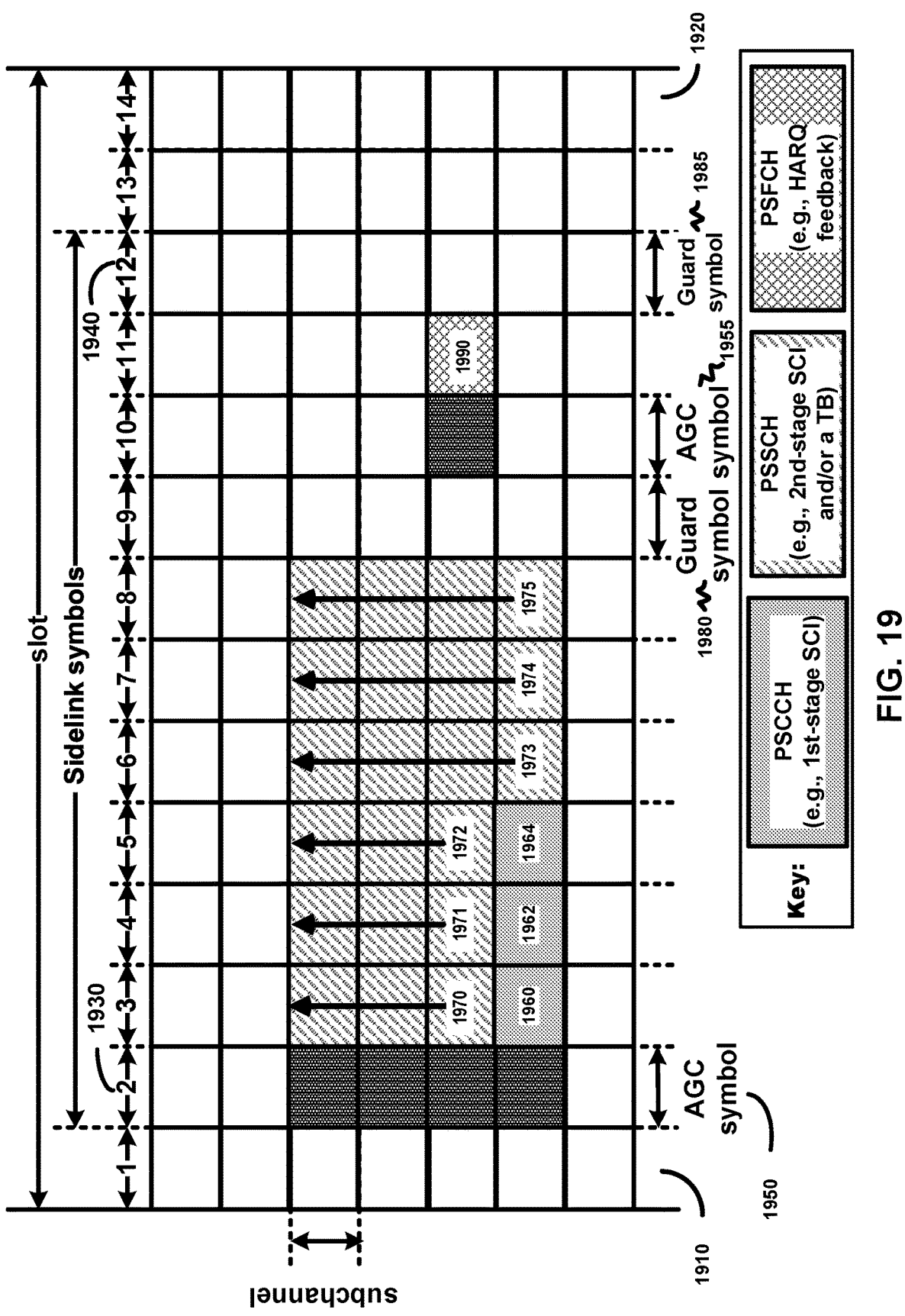
FIG. 19 shows an example of sidelink symbols in a slot.

FIG. 19 shows an example of sidelink symbols in a slot. A sidelink transmission may be sent (e.g., transmitted) in a slot in the time domain. A wireless device may send (e.g., transmit) data via sidelink. The wireless device may segment the data into one or more transport blocks (TBs). The one or more TBs may comprise different pieces of the data. A TB of the one or more TBs may be a data packet of the data. The wireless device may send (e.g., transmit) the TB (e.g., the data packet) of the one or more TBs via one or more sidelink transmissions (e.g., via PSCCH and/or PSSCH in one or more slots). A sidelink transmission (e.g., occupying a slot) may comprise SCI. The sidelink transmission may further comprise a TB. The SCI may comprise a 1$^{st}$-stage SCI and/or a 2$^{nd}$-stage SCI. A PSCCH of the sidelink transmission may comprise the 1$^{st}$-stage SCI for scheduling a PSSCH (e.g., the TB). The PSSCH of the sidelink transmission may comprise the 2$^{nd}$-stage SCI. The PSSCH of the sidelink transmission may further comprise the TB. Sidelink symbols in a slot may or may not start from the first symbol of the slot 1910. The sidelink symbols in the slot may or may not end at the last symbol of the slot 1920. Sidelink symbols in a slot may start from the second symbol of the slot 1930. The sidelink symbols in the slot may end at the twelfth symbol of the slot 1940. A first sidelink transmission may comprise a first automatic gain control (AGC) symbol 1950 (e.g., the second symbol in the slot 1930), a PSCCH 1960-1964 (e.g., in the third, fourth and the fifth symbols in a subchannel in the slot), a PSSCH 1970-1975 (e.g., from the third symbol to the eighth symbol in the slot), and/or a first guard symbol 1980 (e.g., the ninth symbol in the slot). A second sidelink transmission may comprise a second AGC symbol 1955 (e.g., the tenth symbol in the slot), a PSFCH 1990 (e.g., the eleventh symbol in the slot), and/or a second guard symbol 1985 for the second sidelink transmission (e.g., the twelfth symbol in the slot). One or more HARQ feedbacks (e.g., a positive acknowledgement or ACK and/or a negative acknowledgement or NACK) may be sent (e.g., transmitted) via the PSFCH 1990. The PSCCH 1960-1964, the PSSCH 1970-1975, and the PSFCH 1990 may have a different number of subchannels (e.g., a different number of frequency resources) in the frequency domain.

A 1$^{st}$-stage SCI may be SCI format 1-A. The SCI format 1-A may comprise a plurality of fields used for scheduling of a first TB on a PSSCH and a 2$^{nd}$-stage SCI on the PSSCH. The following information may be sent (e.g., transmitted) by means of the SCI format 1-A:

A priority of the sidelink transmission. The priority may be a physical layer (e.g., a layer 1) priority of the sidelink transmission. The priority may be determined, for example, based on logical channel priorities of the sidelink transmission;

Frequency resource assignment of a PSSCH;

Time resource assignment of a PSSCH;

Resource reservation period/interval for a second TB;

Demodulation reference signal (DMRS) pattern;

A format of the 2$^{nd}$-stage SCI;

Beta_offset indicator;

Number of DMRS port;

Modulation and coding scheme of a PSSCH;

Additional MCS table indicator;

PSFCH overhead indication; and/or

Reserved bits.

A 2nd-stage SCI may be SCI format 2-A. The SCI format 2-A may be used for decoding of a PSSCH. The SCI format 2-A may be used with a HARQ operation when the HARQ-ACK information includes an ACK and/or a NACK. The SCI format 2-A may be used when there is no feedback of HARQ-ACK information. The SCI format 2-A may comprise a plurality of fields indicating the following information:

HARQ process number;

New data indicator;

Redundancy version;

Source ID of a transmitter (e.g., a sending (transmitting) wireless device) of a sidelink transmission;

Destination ID of a receiver (e.g., a receiving wireless device) of the sidelink transmission;

HARQ feedback enabled/disabled indicator;

Cast type indicator indicating that the sidelink transmission is a broadcast, a groupcast, and/or a unicast; and/or CSI request.

A 2nd-stage SCI may be SCI format 2-B. The SCI format 2-B may be used for decoding a PSSCH. The SCI format 2-B may be used with HARQ operation when HARQ-ACK information includes only NACK. The SCI format 2-B may be used when there is no feedback of HARQ-ACK information. The SCI format 2-B may comprise a plurality of fields indicating the following information:

HARQ process number;

New data indicator;

Redundancy version;

Source ID of a transmitter (e.g., a sending (transmitting) wireless device) of a sidelink transmission;

Destination ID of a receiver (e.g., a receiving wireless device) of the sidelink transmission;

HARQ feedback enabled/disabled indicator;

Zone ID indicating a zone where a transmitter (e.g., a sending (transmitting) wireless device) of the sidelink transmission is geographically located; and/or Communication range requirement indicating a communication range of the sidelink transmission.

Figure 20:
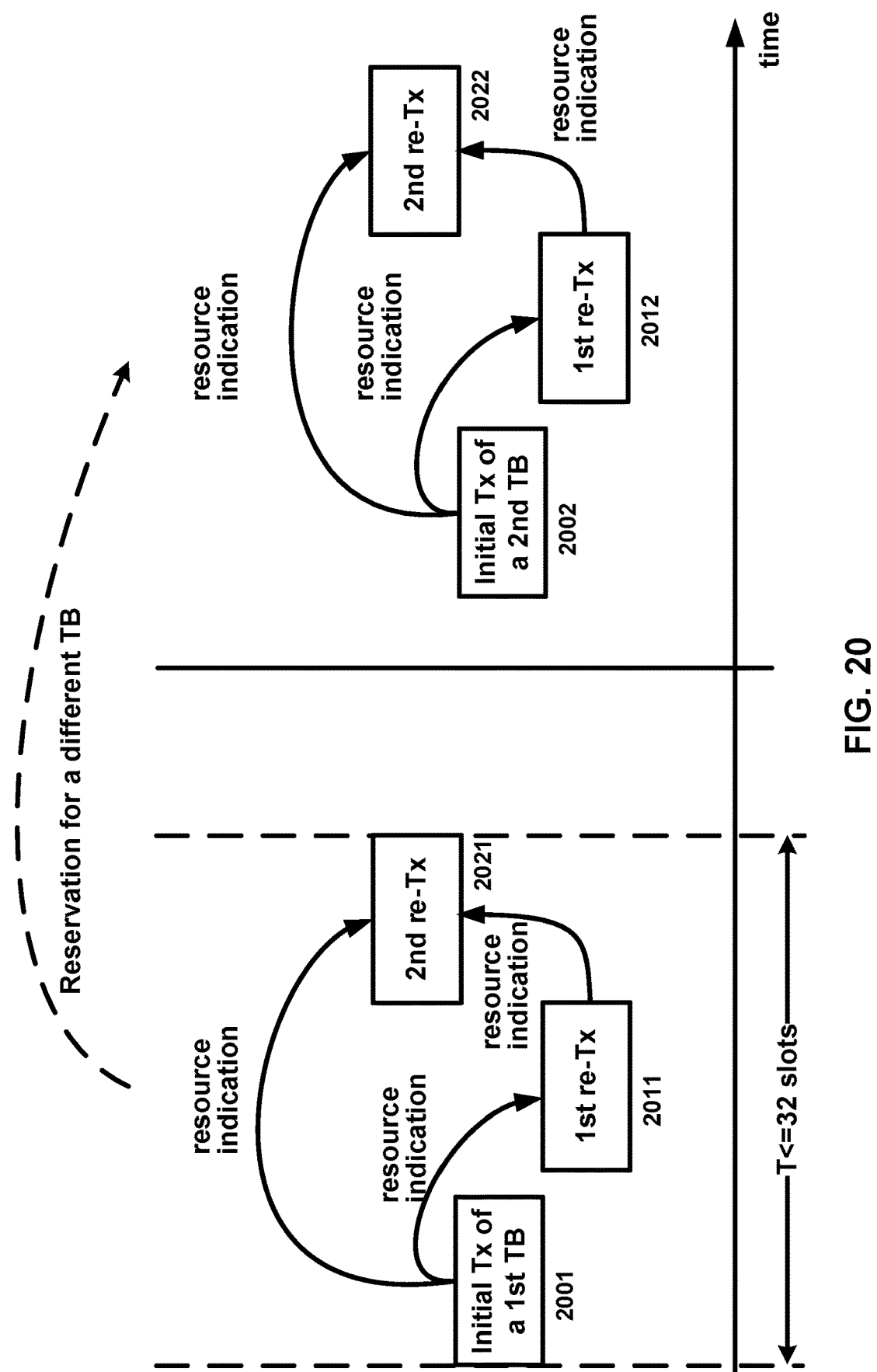
FIG. 20 shows an example of a resource indication for a transport block (TB) and a resource reservation for a TB.

FIG. 20 shows an example of resource indication for a first TB (e.g., a first data packet) and resource reservation for a second TB (e.g., a second data packet). SCI of an initial transmission (e.g., a first transmission, initial Tx of 1st TB) 2001 and/or a retransmission (e.g., 1st re-Tx, 2nd re-Tx) 2011 and 2021 of the first TB (e.g., 1st TB) may comprise one or more first parameters (e.g., Frequency resource assignment and Time resource assignment) indicating one or more first time and/or frequency (T/F) resources for transmission (e.g., initial Tx) 2001 and/or retransmission (e.g., 1st re-Tx, 2nd re-Tx) 2011 and 2021, respectively, of the first TB (e.g., 1st TB). The SCI may further comprise one or more second parameters (e.g., Resource reservation period) indicating a reservation period (interval, etc.) of one or more second T/F resources for initial transmission (e.g., initial Tx of 2nd TB) 2002 and/or retransmission (e.g., 1st re-Tx, 2nd re-Tx) 2012 and 2022 of the second TB (e.g., 2nd TB).

A wireless device may determine/select one or more first T/F resources for transmission and/or retransmission of a first TB. A wireless device may determine/select one or more first T/F resources for (initial) transmission and/or retransmission of the first TB, for example, based on triggering a resource selection procedure (e.g., as described above in FIG. 19). The wireless device may select three resources for sending (e.g., transmitting) the first TB, for example, such as shown in FIG. 20. The wireless device may send (e.g., transmit) an initial transmission (e.g., an initial Tx of a first TB in FIG. 20) of the first TB via a first resource 2001 of the three resources. The wireless device may send (e.g., transmit) a first retransmission (e.g., a 1st re-Tx in FIG. 20) of the first TB via a second resource 2011 of the three resources. The wireless device may send (e.g., transmit) a second retransmission (e.g., a 2nd re-Tx in FIG. 20) of the first TB via a third resource 2021 of the three resources. A time duration between a starting time of the initial transmission of the first TB (e.g., via the first resource 2011) and the second retransmission of the first TB (e.g., via the third resource 2021) may be smaller than or equal to 32 sidelink slots (e.g., T≤32 slots in FIG. 20) or any other quantity of sidelink slots or any other duration. A first SCI may associate with the initial transmission of the first TB. The first SCI may indicate a first T/F resource indication for the initial transmission of the first TB, the first retransmission of the first TB, and the second retransmission of the first TB. The first SCI may indicate a reservation period/interval of resource reservation for a second TB, for example, via a fourth resource 2002. A second SCI may associate with the first retransmission of the first TB. The second SCI may indicate a second T/F resource indication for the first retransmission of the first TB (e.g., via the second resource 2011) and the second retransmission of the first TB (e.g., via a fifth resource 2012). The second SCI may indicate the reservation period/interval of resource reservation for the second TB. A third SCI may associate with the second retransmission of the first TB. The third SCI may indicate a third T/F resource indication for the second retransmission of the first TB (e.g., via a sixth resource 2022). The third SCI may indicate the reservation period/interval of resource reservation for the second TB.

FIG. 21 and FIG. 22 show examples of configuration information for sidelink communication. A base station may send (e.g., transmit) one or more radio resource control (RRC) messages to a wireless device for delivering the configuration information for the sidelink communication. Specifically, FIG. 21 shows an example of configuration information for sidelink communication that may comprise a field of SL-UE-SelectedConfigRP. A parameter sl-ThresPSSCH-RSRP-List in the field may indicate a list of 64 thresholds. A wireless device may receive first sidelink control information (SCI) indicating a first priority. The wireless device may have second SCI to be sent (e.g., transmitted). The second SCI may indicate a second priority. The wireless device may select a threshold from the list based on the first priority in the first SCI and the second priority in the second SCI. The wireless device may exclude resources from candidate resource sets based on the threshold (e.g., as described herein in FIG. 26). A parameter sl-MaxNumPerReserve in the field may indicate a maximum number of reserved PSCCH and/or PSSCH resources indicated in SCI. A parameter sl-MultiReserveResource in the field may indicate that a reservation of a sidelink resource for an initial transmission of a TB by SCI associated with a different TB may be allowed, for example, based on or in response to a sensing and resource selection procedure. A parameter sl-ResourceReservePeriodList may indicate a set of possible resource reservation periods (intervals, etc.) (e.g., SL-ResourceReservePeriod) allowed in a resource pool. Up to 16 values may be configured per resource pool. A parameter sl-RS-ForSensing may indicate, for example, if DMRS of PSCCH and/or PSSCH are used for a layer 1 (e.g., physical layer) RSRP measurement in sensing operation. A parameter sl-Sensing Window may indicate the start of a sensing window. A parameter sl-SelectionWindowList may indicate the end of a selection window in a resource selection procedure for a TB with respect to a priority indicated in SCI. Value n1 may correspond to $1*2\mu$, value n5 corresponds to $5*2\mu$, and so on, where $\mu$=0, 1, 2, 3 for subcarrier spacing (SCS) of 15, 30, 60, and 120 kHz respectively. A parameter SL-SelectionWindowConfig (e.g., as described in FIG. 22) may indicate a mapping between a sidelink priority (e.g., sl-Priority) and the end of the selection window (e.g., sl-Selection Window).

Configuration information may further comprise a parameter sl-PreemptionEnable indicating a sidelink pre-emption status (e.g., disabled or enabled) in a resource pool. A priority level p_preemption may be configured, for example, if the sidelink pre-emption is enabled. The sidelink pre-emption may be applicable to all priority levels, for example, if the sidelink pre-emption is enabled, but the p_preemption is not configured.

As described in FIG. 22, configuration information may comprise a parameter sl-TxPercentageList indicating a portion of candidate single-slot PSSCH resources over total resources. A value of p20 may correspond to 20%. A parameter SL-TxPercentageConfig may indicate a mapping between a sidelink priority (e.g., sl-Priority) and a portion of candidate single-slot PSSCH resources over total resources (e.g., sl-TxPercentage).

Figure 23:
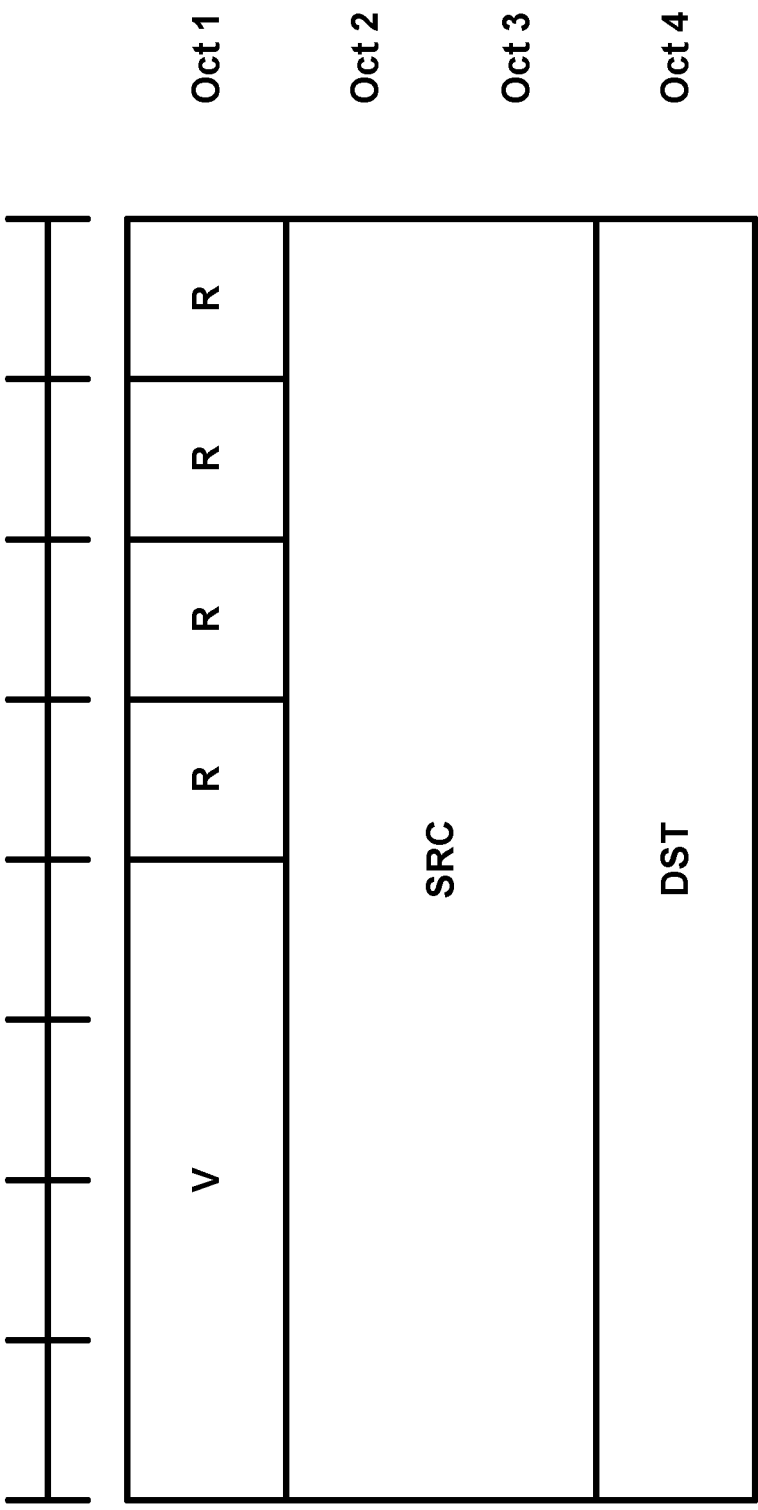
FIG. 23 shows an example format of a MAC subheader for a sidelink shared channel (SL-SCH).

FIG. 23 shows an example format of a MAC subheader for a sidelink shared channel (SL-SCH). The MAC subheader for SL-SCH may comprise seven header fields a version number (V) 2310, reserved bits (R) 2320-2326, a source ID (SRC) 2330, and a destination ID (DST) 2340. The MAC subheader is octet aligned. The V field 2310 may be a MAC protocol data units (PDU) format version number field indicating which version of the SL-SCH subheader may be used. The SRC field 2330 may carry 16 bits of a Source Layer-2 identifier (ID) field set to a first identifier provided by upper layers. The DST field 2340 may carry 8 bits of the Destination Layer-2 ID set to a second identifier provided by upper layers. The second identifier may be a unicast identifier, for example, if the V field 2310 is set to "1." The second identifier may be a groupcast identifier, for example, if the V field 2310 is set to "2." The second identifier may be a broadcast identifier, for example, if the V field 2310 is set to "3."

Figure 24:
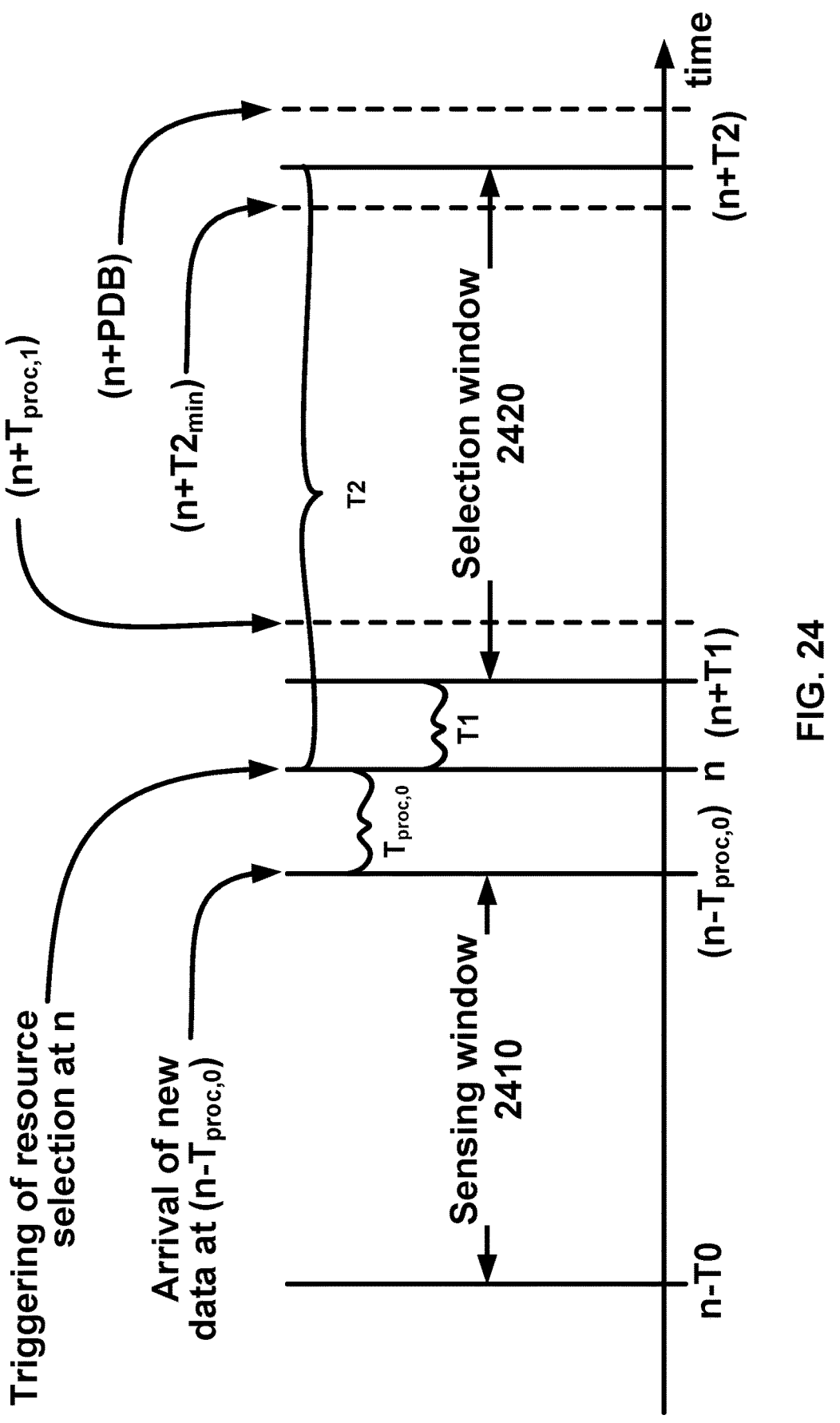
FIG. 24 shows an example timing of a resource selection procedure.

FIG. 24 shows an example timing of a resource selection procedure. A wireless device may perform a resource selection procedure to select resources for one or more sidelink transmissions. A sensing window 2410 of the resource selection procedure may start at a time (n–T0) (e.g., a sl-Sensing Window parameter as described herein in FIG. 21). The sensing window 2410 may end at a time (n–T$_{proc,0}$) New data of the one or more sidelink transmissions may arrive at the wireless device at time (n–T$_{proc,0}$) The time period T$_{proc,0}$ may be a processing delay of the wireless device in determining to trigger a resource selection procedure. The wireless device may determine to trigger the resource selection procedure at a time n to select the resources for the new data that arrived at the time (n–T$_{proc,0}$) The wireless device may complete the resource selection procedure at a time (n+T1). The wireless device may determine the parameter T1 based on a capability of the wireless device. The capability of the wireless device may be a processing delay of a processor of the wireless device. A selection window 2420 of the resource selection procedure may start at time (n+T1). The selection window may end at time (n+T2). The wireless device may determine the parameter T2 based on a parameter T2 min (e.g., sl-Selection Window). The wireless device may determine the parameter T2 so that T2 min≤T2≤PDB, for example, if the PDB (packet delay budget) is the maximum allowable delay (e.g., a delay budget) for successfully sending (e.g., transmitting) new data via the one or more sidelink transmissions. The wireless device may determine the parameter T2 min, for example, based on or in response to a corresponding value for a priority of the one or more sidelink transmissions (e.g., based on a parameter SL-SelectionWindowConfig indicating a mapping between a sidelink priority sl-Priority and the end of the selection window sl-Selection Window). A wireless device may set the parameter T2=PDB, for example, if the parameter T2 min>PDB.

Figure 25:
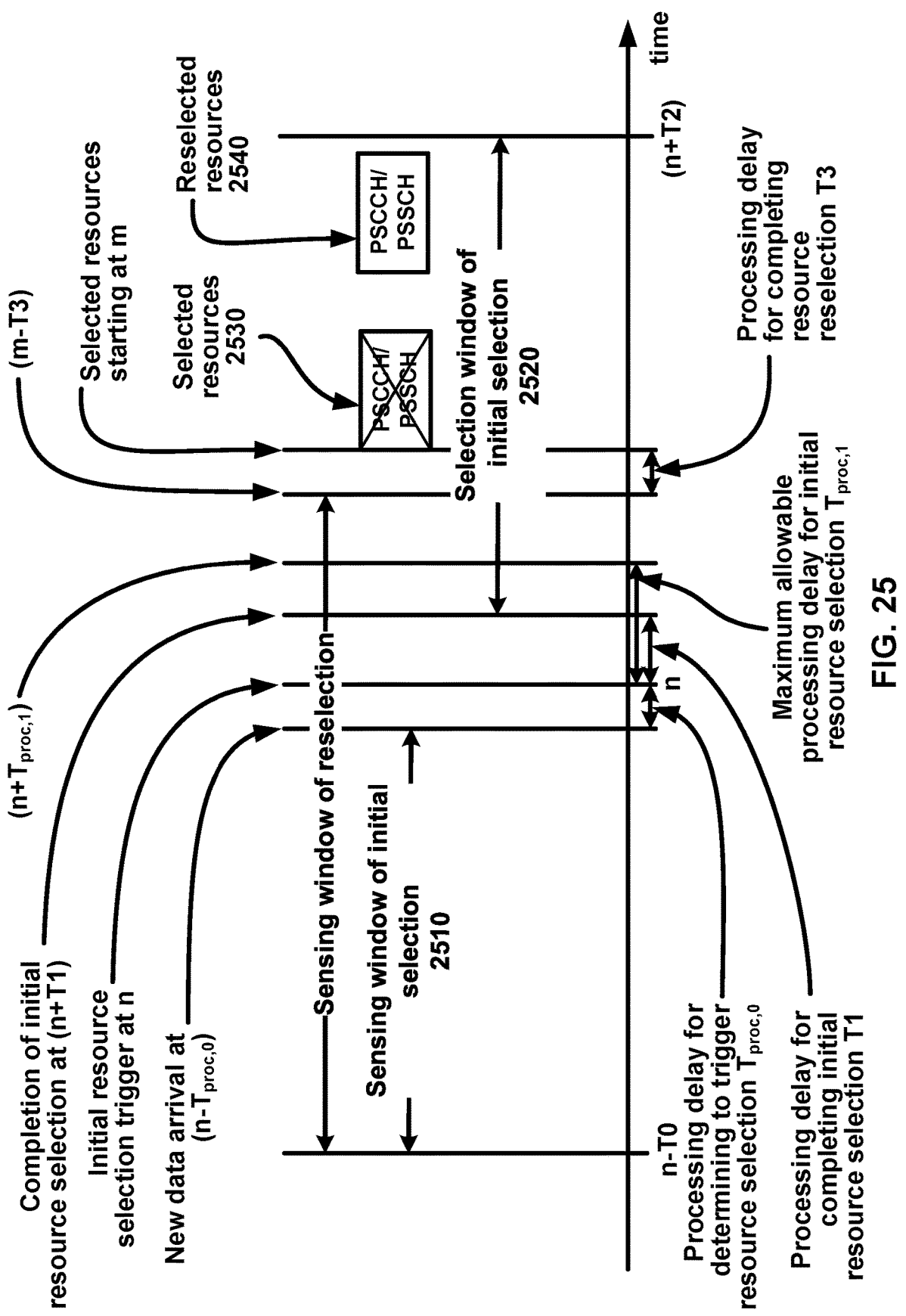
FIG. 25 shows an example timing of a resource selection procedure.

FIG. 25 shows an example timing of a resource selection procedure. A wireless device may perform the resource selection procedure for selecting resources for one or more sidelink transmissions. A sensing window of initial selection 2511 may start at a time (n–T0). The sensing window of initial selection 2510 may end at a time (n–Td). New data of the one or more sidelink transmissions may arrive at the wireless device at the time (n–T$_{proc,0}$). The time period T$_{proc,0}$ may be a processing delay for the wireless device to determine to trigger the initial selection of the resources. The wireless device may determine to trigger the initial selection at a time n to select the resources for the new data arrived at the time (n–T$_{proc,0}$). The wireless device may complete the initial resource selection procedure at a time (n+T1), where T1 is the processing delay for completing a resource selection procedure. The time (n+T$_{proc,1}$) may be the maximum allowable processing latency (e.g., T$_{proc,1}$, where $0<T1≤T_{proc,1}$) for completing the resource selection procedure that was triggered at the time n. A selection window of initial selection 2520 may start at a time (n+T1). The selection window of initial selection 2520 may end at a time (n+T2). The parameter T2 may be configured, preconfigured, and/or determined by the wireless device.

A wireless device may determine first resources (e.g., selected resources) 2530 for one or more sidelink transmissions based on the completion of an initial resource selection procedure at a time (n+T1). The wireless device may select the first resources (e.g., selected resources) 2530 from candidate resources in a selection window of initial selection 2520, for example, based on or in response to measurements in the sensing window for initial selection 2510. The wireless device may determine a resource collision between the first resources (e.g., selected resources) 2530 and other resources reserved by another wireless device. The wireless device may determine to drop first resources (e.g., selected resources) 2530 to avoid interference. The wireless device may trigger a resource reselection procedure (e.g., a second resource selection procedure) at or before a time (m–T3). The time period T3 may be a processing delay for the wireless device to complete the resource reselection procedure (e.g., a second resource selection procedure). The wireless device may determine second resources (e.g., reselected resource) 2540 via the resource reselection procedure (e.g., a second resource selection procedure). The start time of the first resources (e.g., selected resources) 2530 may be the time m (e.g., the first resources may be in slot m).

At least one of time parameters T0, T$_{proc,0}$, T$_{proc,1}$, T2, and/or PDB may be configured by a base station for a wireless device. The at least one of the time parameters T0, T$_{proc,0}$, T$_{proc,1}$, T2, and PDB may be preconfigured for a wireless device. The at least one of the time parameters T0, T$_{proc,0}$, T$_{proc,1}$, T2, and PDB may be stored in a memory of the wireless device. The memory may be a Subscriber Identity Module (SIM) card. The times n, m, T0, T1, T$_{proc,0}$, T$_{proc,1}$, T2, T2 min, T3, and PDB, as described herein in FIGS. 24 and 25, may be in terms of slots and/or slot index (e.g., as described herein in FIG. 19).

Figure 26:
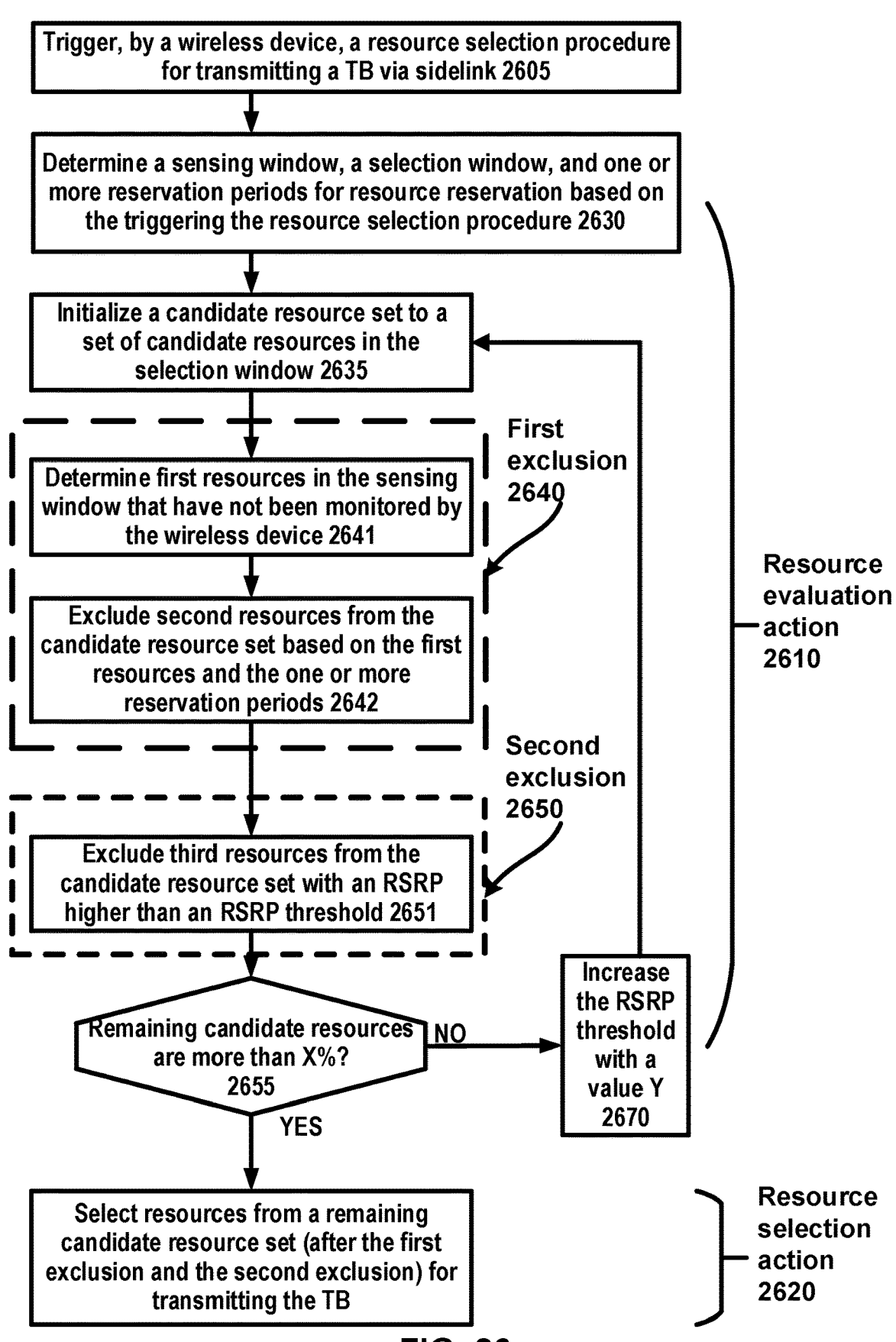
FIG. 26 shows an example flowchart of a resource selection procedure by a wireless device for sending (e.g., transmitting) a TB via sidelink.
Figure 27:
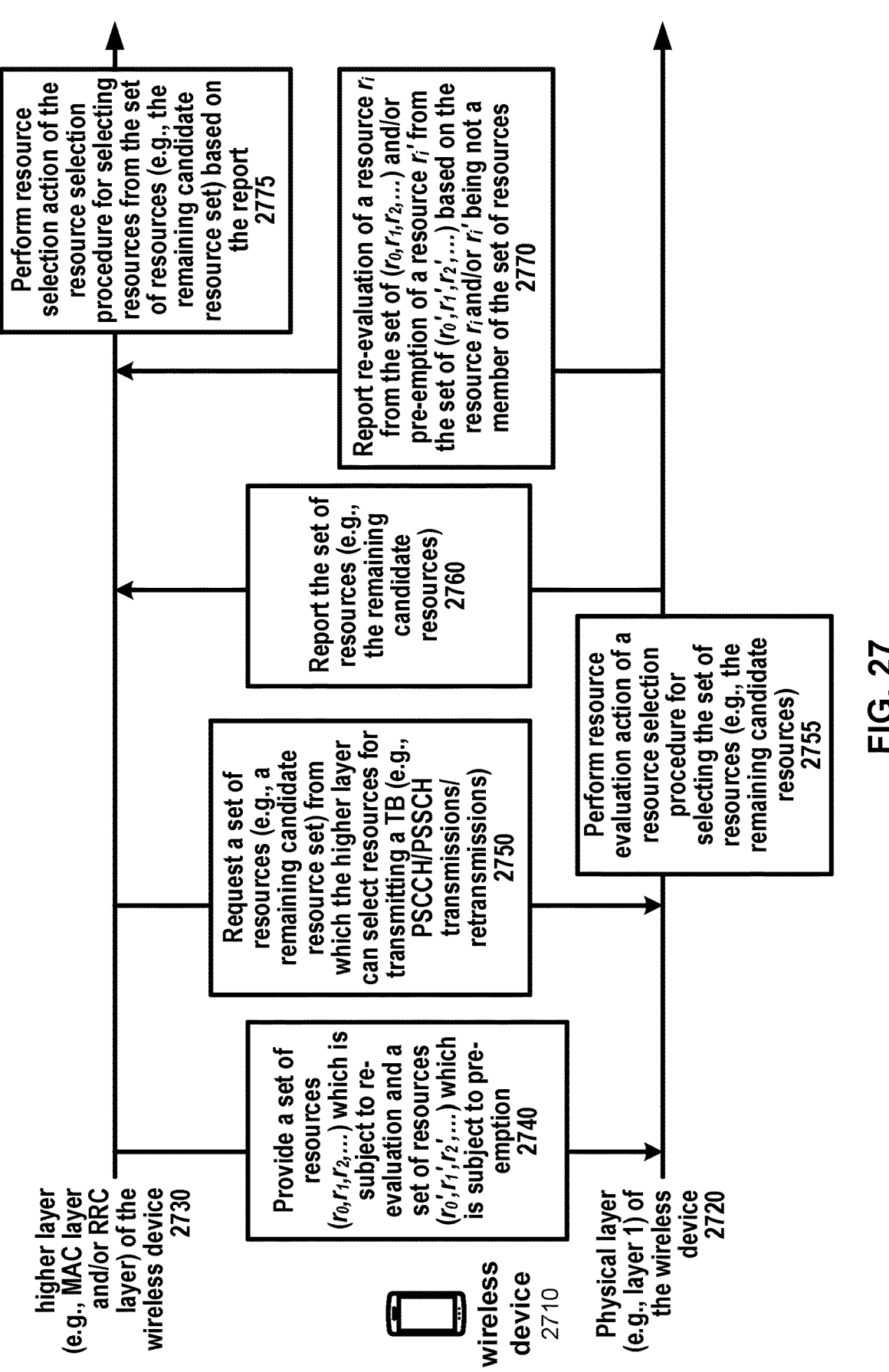
FIG. 27 shows an example diagram of the resource selection procedure among layers of the wireless device.

FIG. 26 shows an example flowchart of a resource selection procedure by a wireless device for sending (e.g., transmitting) a TB (e.g., a data packet) via sidelink. FIG. 27 shows an example diagram of the resource selection procedure among layers of the wireless device.

Referring to FIGS. 26 and 27, a wireless device 2710 may send (e.g., transmit) one or more sidelink transmissions (e.g., a first transmission of the TB and one or more retransmissions of the TB) for sending (e.g., transmitting) the TB. A sidelink transmission of the one or more sidelink transmission may comprise a PSCCH, a PSSCH, and/or a PSFCH (e.g., as described herein in FIG. 19). As described in FIG. 26, the wireless device 2710 may trigger a resource selection procedure for sending (e.g., transmitting) the TB. The resource selection procedure may comprise two actions. The first action of the two actions may be a resource evaluation action 2610. As described in FIG. 27, the physical layer (e.g., layer 1) of the wireless device 2720 may perform the resource evaluation action 2755. The physical layer of the wireless device 2720 may determine a subset of resources based on the first action and report the subset of resources to a higher layer (e.g., a MAC layer and/or a RRC layer) of the wireless device 2730. As described in FIG. 26, the second action of the two actions may be a resource selection action 2620. The higher layer (e.g., the MAC layer and/or the RRC layer) of the wireless device 2730 may perform the resource selection action 2620 based on the reported subset of resources from the physical layer (e.g., layer 1) of the wireless device 2720.

A wireless device/higher layer (e.g., a MAC layer and/or a RRC layer) of a wireless device 2730 may trigger a resource selection procedure (e.g., at step 2605) for requesting the wireless device 2710 to determine a subset of resources. The wireless device/higher layer (e.g., the MAC layer and/or the RRC layer) of the wireless device 2730 may select resources from the subset of resources for a PSSCH and/or a PSCCH transmission. The wireless device/higher layer (e.g., the MAC layer and/or the RRC layer) of the wireless device 2730 may provide the following parameters for the PSSCH and/or the PSCCH transmission to trigger the resource selection procedure (e.g., in slot n):

a resource pool, from which the wireless device may determine the subset of resources;

layer 1 priority, $prio_{TX}$ (e.g., sl-Priority as described herein in FIGS. 21 and 22), of the PSSCH and/or the PSCCH transmission;

remaining packet delay budget (PDB) of the PSSCH and/or the PSCCH transmission;

a number of sub-channels, $L_{subCH}$, for the PSSCH and/or the PSCCH transmission in a slot; and/or a resource reservation period (interval, etc.), $P_{rsvp\_TX}$, in units of millisecond (ms).

A wireless device/higher layer (e.g., a MAC layer and/or a RRC layer) of the wireless device 2730 may provide sets of resources (e.g., a set ($r_0$, $r_1$, $r_2$, . . . ), which may be subject to a re-evaluation, and/or a set $$(r_0', r_1', r_2', \dots ),$$

which may be subject to a pre-emption) 2740, for example, if the wireless device/higher layer (e.g., the MAC layer and/or the RRC layer) of the wireless device 2730 requests the wireless 2710 device to determine a subset of resources from which the higher layer will select the resources for PSSCH and/or PSCCH transmissions for re-evaluation and/or pre-emption 2750.

A base station (e.g., network) may send (e.g., transmit) a message comprising one or more parameters to a wireless device for performing a resource selection procedure. The message may be an RRC/SIB message, a MAC CE, and/or DCI. A second wireless device may send (e.g., transmit) a message comprising one or more parameters to the wireless device for performing the resource selection procedure. The message may be an RRC message, a MAC CE, and/or SCI. The one or more parameters may indicate the following information.

sl-SelectionWindowList (e.g., sl-Selection Window as described herein in FIGS. 21 and 22): an internal parameter T2 min (e.g., T2 min as described herein in FIG. 24) may be set to a corresponding value from the parameter sl-SelectionWindowList for a given value of $prio_{TX}$ (e.g., based on SL-SelectionWindowConfig as described herein in FIGS. 21 and 22).

sl-ThresPSSCH-RSRP-List (e.g., sl-ThresPSSCH-RSRP-List as described herein in FIGS. 21 and 22): a parameter may indicate an RSRP threshold for each combination ($p_i$, $p_j$), where $p_i$ is a value of a priority field in a received SCI format 1-A and $p_j$ is a priority of a sidelink transmission (e.g., the PSSCH and/or the PSCCH transmission) of the wireless device. In a resource selection procedure, $p_j$ may be defined as $p_j = prio_{TX}$.

sl-RS-ForSensing (e.g., sl-RS-ForSensing as described herein in FIGS. 21 and 22): a parameter may indicate whether DMRS of a PSCCH and/or a PSSCH is used for layer 1 (e.g., physical layer) RSRP measurement in sensing operation by the wireless device.

sl-ResourceReservePeriodList (e.g., sl-ResourceReservePeriodList as described herein in FIGS. 21 and 22)

sl-SensingWindow (e.g., sl-SensingWindow as described herein in FIGS. 21 and 22): an internal parameter $T_0$ may be defined as a number of slots corresponding to t0_SensingWindow ms.

sl-TxPercentageList (e.g., based on SL-TxPercentageConfig as described herein in FIGS. 21 and 22): an internal parameter X (e.g., sl-TxPercentage as described herein in FIGS. 21 and 22) for a given $prio_{TX}$ (e.g., sl-Priority as described herein in FIGS. 21 and 22) may be defined as sl-xPercentage($prio_{TX}$) converted from percentage to ratio.

sl-PreemptionEnable (e.g., p_preemption as described herein in FIGS. 21 and 22): an internal parameter $prio_{pre}$ may be set to a higher layer provided parameter sl-PreemptionEnable.

A resource reservation period (interval, etc.), $P_{rsvp\_TX}$ may be converted from units of ms to units of logical slots, resulting in $$P_{rsvp\_TX}',$$

for example, if the resource reservation period (interval, etc.) is provided.

A notation:

$$(t_0^{SL}, t_1^{SL}, t_2^{SL}, \dots )$$

may denote a set of slots of a sidelink resource pool.

For a resource evaluation action 2610 described in FIG. 26, a wireless device may determine a sensing window 2630

(e.g., a sensing window as described herein in FIGS. 24 and 25 based on sl-Sensing Window), for example, based on or in response to a triggering of a resource selection procedure. The wireless device may determine a selection window 2630 (e.g., a selection window as described herein in FIGS. 24 and 25 based on sl-SelectionWindowList), for example, based on or in response to the triggering of the resource selection procedure. The wireless device may determine one or more reservation periods (intervals, etc.) 2630 (e.g., parameter sl-ResourceReservePeriodList) for resource reservation. A candidate single-slot resource for transmission $R_{x,y}$ may be defined as a set of $L_{subCH}$ contiguous sub-channels with sub-channel x+j in slot $$t_y^{SL}$$

where j=0, . . . , $L_{subCH}$−1. The wireless device may assume that a set of $L_{subCH}$ contiguous sub-channels in the resource pool within a time interval [n+T₁, n+T₂] correspond to one candidate single-slot resource (e.g., as described herein in FIGS. 24 and 25). A total number of candidate single-slot resources may be denoted by $M_{total}$. A sensing window may be defined as a number of slots in a time duration of [n−T₀, n−T_{proc,0}] (e.g., as described herein in FIGS. 24 and 25). The wireless device may monitor a first subset of the slots, of a sidelink resource pool, within the sensing window. The wireless device may not monitor a second subset of the slots different than the first subset of the slots due to half duplex. The wireless device may perform the following actions based on PSCCH decoded and RSRP measured in the first subset of the slots. An internal parameter $Th(p_i, p_j)$ may be set to the corresponding value of the RSRP threshold indicated by the i-th field in sl-ThresPSSCH-RSRP-List, where i=$p_i$+($p_j$−1)*8.

For a resource evaluation action 2610, as described in FIG. 26, a wireless device 2710 (e.g., as described herein in FIG. 27) may initialize a candidate resource set 2635 (e.g., a set $S_A$) to be a set of candidate resources. The candidate resource set may be a union of candidate resources within a selection window. A candidate resource may be a candidate single-subframe resource. A candidate resource may be a candidate single-slot resource. the set $S_A$ may be initialized to a set of all candidate single-slot resources.

For a resource evaluation action 2610 (e.g., as described herein in FIG. 26), a wireless device 2710 (e.g., as described herein in FIG. 27) may perform a first exclusion 2640 for excluding second resources from the candidate resource set based on first resources and one or more reservation periods (intervals) 2642. The wireless device 2710 may not monitor the first resources within a sensing window. The one or more reservation periods (intervals, etc.) may be configured and/or associated with a resource pool of the second resources. The wireless device 2710 may determine the second resources within a selection window which may be reserved by a transmission sent (e.g., transmitted) via the first resources based on the one or more reservation periods (intervals, etc.). The wireless device 2710 may exclude a candidate single-slot resource $R_{x,y}$ from the set $S_A$ based on following conditions:

the wireless device has not monitored slot $$t_m^{SL}$$

in the sensing window.

for any periodicity value allowed by the parameter sl-ResourceReservePeriodList and a hypothetical SCI format 1-A received in the slot $$t_m^{SL}$$

with "Resource reservation period" field set to that periodicity value and indicating all subchannels of the resource pool in this slot, condition c of a second exclusion would be met.

For a resource evaluation action 2610 (e.g., as described herein in FIG. 26), a wireless device may perform a second exclusion 2650 for excluding third resources from the candidate resource set. SCI may indicate a resource reservation of the third resources. The SCI may further indicate a priority value (e.g., indicated by a higher layer parameter sl-Priority). The wireless device may exclude the third resources from the candidate resource set based on a reference signal received power (RSRP) of the third resources satisfying (e.g., above, higher than, greater than, etc.) an RSRP threshold 2651 (e.g., indicated by a higher layer parameter sl-ThresPSSCH-RSRP-List). The RSRP threshold may be related to the priority value based on a mapping list of RSRP thresholds to priority values configured and/or pre-configured for the wireless device. A base station may send (e.g., transmit) a message to a wireless device to configure a mapping list. The message may be a radio resource control (RRC) message. The mapping list may be pre-configured for the wireless device. The mapping list may be stored in memory of the wireless device. A priority indicated by a priority value may be a layer 1 priority (e.g., a physical layer priority). The priority value (e.g., the layer 1 priority) may be associated with a respective priority level. A higher (larger, bigger, etc.) priority value may indicate a higher priority of a sidelink transmission, and/or a lower (smaller, etc.) priority value may indicate a lower priority of the sidelink transmission. A higher (larger, bigger, etc.) priority value may indicate a lower priority of the sidelink transmission, and/or A lower (smaller, etc.) priority value may indicate a higher priority of the sidelink transmission. A wireless device may exclude a candidate single-slot resource $R_{x,y}$ from a set $S_A$ based on following conditions:
a) the wireless device receives SCI format 1-A in slot $$t_m^{SL},$$

and "Resource reservation period" field, if present, and "Priority" field in the received SCI format 1-A indicate the values $P_{rsvp\_RX}$ and $prio_{RX}$;
b) the RSRP measurement performed, for the received SCI format 1-A, is higher than $Th(prio_{RX}, prio_{TX})$;
c) the SCI format received in slot $$t_m^{SL}$$

or the same SCI format which, if and only if the "Resource reservation period" field is present in the received SCI format 1-A, is assumed to be received in slot(s)

$$t^{SL}_{m+q \times P'_{rsvp\_RX}}$$

determines the set or resource blocks and slots which overlaps with $$R_{x,y+j \times P'_{rsvp\_TX}}$$

for q=1, 2, . . . , Q and j=0, 1, . . . , $C_{resel}$−1. Here, $P_{rsvp\_RX}'$ is $P_{rsvp\_RX}$ converted to units of logical slots, $$Q = \left\lceil \frac{T_{scal}}{P_{rsvp\_RX}} \right\rceil$$

where $$t^{SL}_{n'} = n$$

if slot n belongs to the set $$(t^{SL}_0, t^{SL}_1, \ldots , t^{SL}_{T_{max}}),$$

otherwise slot $$t^{SL}_{n'}$$

is the first slot after slot n belonging to the set $$(t^{SL}_0, t^{SL}_1, \ldots , t^{SL}_{T_{max}});$$

otherwise Q=1. $T_{scal}$ is set to selection window size T2 converted to units of ms.

As described in FIGS. 26 and 27, in a resource evaluation action 2610, a wireless device 2710 may determine whether remaining candidate resources in a candidate resource set are sufficient for selecting resources for one or more sidelink transmissions of the TB, for example, after performing the first exclusion, the second exclusion, and/or based on or in response to a condition. The condition may be the total amount of the remaining candidate resources in the candidate resource set satisfying (e.g., above, higher than, greater than, more than, higher than or equal to, greater than or equal to, more than or equal to, larger than or equal to, etc.) X percent (e.g., as indicated by a higher layer parameter sl-TxPercentageList) of the candidate resources in the candidate resource set before performing the first exclusion and/or the second exclusion 2655. The wireless device 2710 may increase the RSRP threshold used to exclude the third resources with a value Y and iteratively re-perform the initialization, the first exclusion, and/or the second exclusion 2670, for example, until the condition is met (e.g., the number of remaining candidate single-slot resources in the set $S_A$ satisfies is $X \cdot M_{total}$) The wireless device 2710 may report the set $S_A$ (e.g., the remaining candidate resources of the candidate resource set) 2760 to the higher layer (e.g., MAC layer and/or RRC layer) of the wireless device 2730. The wireless device 2710 may report the set $S_A$ (e.g., the remaining candidate resources of the candidate resource set when the condition is met) 2760 to the higher layer (e.g., MAC layer and/or RRC layer) of the wireless device 2730, for example, based on or in response to the number of remaining candidate single-slot resources in the set $S_A$ being equal to or satisfying (e.g., above, higher than, greater than, more, etc.) $X \cdot M_{total}$.

As described in FIGS. 26 and 27, in a resource selection action 2620 the higher layer (e.g., MAC layer and/or RRC layer) of a wireless device 2710 may select fourth resources from the remaining candidate resources of the candidate resource set 2775 (e.g., a set $S_A$ reported by the physical layer (e.g., layer 1) of the wireless device 2720) for the one or more sidelink transmissions of the TB. The wireless device 2710 may randomly select the fourth resources from the remaining candidate resources of the candidate resource set.

As described in FIG. 27, a wireless device 2710 may report a re-evaluation of a resource $r_i$ 2770 to a higher layer (e.g., MAC layer and/or RRC layer) of the wireless device 2730, for example, if the resource $r_i$ from a set ($r_0$, $r_1$, $r_2$, . . . ) is not a member of $S_A$ (e.g., the remaining candidate resources of the candidate resource set when the condition is met).

A wireless device 2710 may report a pre-emption of a resource $$r'_i$$

2770 to a higher layers (e.g., MAC layer and/or RRC layer) of the wireless device 2730, for example, if the resource $$r'_i$$

from the set $$(r'_0, r'_1, r'_2, \ldots )$$

meets the conditions below:

$$r'_i$$

is not a member of $S_A$, and $$r'_i$$

meets the conditions for the second exclusion, with $Th(prio_{RX}, prio_{TX})$ set to a final threshold for reaching $X \cdot M_{total}$, and the associated priority $prio_{RX}$, satisfies one of the following conditions:

sl-PreemptionEnable is provided and is equal to 'enabled' and $prio_{TX} > prio_{RX}$ sl-PreemptionEnable is provided and is not equal to 'enabled', and $prio_{RX} < prio_{pre}$ and $prio_{TX} > prio_{RX}$ A higher layer (e.g., MAC layer and/or RRC layer) of a wireless device 2730 may remove a resource $r_i$ from a set ($r_0$, $r_1$, $r_2$, . . . ), for example, if the resource $r_i$ is indicated for re-evaluation by the wireless device 2710 (e.g., the physical layer of the wireless device 2720). The higher layer of the wireless device 2730 may remove a resource $$r_i'$$

from a set $$(r_0', r_1', r_2', \ldots)$$

for example, if the resource $$r_i'$$

indicated for pre-emption by the wireless device 2710 (e.g., the physical layer of the wireless device 2720). The higher layer of the wireless device 2730 may randomly select new time and frequency resources from the remaining candidate resources of the candidate resource set (e.g., the set $S_A$ reported by the physical layer) for the removed resources $r_i$ and/or $$r_i'.$$

The higher layer of the wireless device 2730 may replace the removed resources $r_i$ and/or $$r_i'$$

by the new time and frequency resources. The wireless device 2710 may remove the resources $r_i$ and/or $r_i'$ from the set ($r_0$, $r_1$, $r_2$, . . . ) and/or the set $$(r_0', r_1', r_2', \ldots)$$

and add the new time and frequency resources to the set ($r_0$, $r_1$, $r_2$, . . . ) and/or the set $$(r_0', r_1', r_2', \ldots)$$

based on the removing of the resources $r_i$ and/or $$r_i'.$$

Sidelink pre-emption may happen between a first wireless device and a second wireless device. The first wireless device may select first resources for a first sidelink transmission. The first sidelink transmission may have a first priority. The second wireless device may select second resources for a second sidelink transmission. The second sidelink transmission may have a second priority. The first resources may partially or fully overlap with the second resources. The first wireless device may determine a resource collision between the first resources and the second resources, for example, based on or in response to the first resources and the second resources being partially or fully overlapped. The resource collision may imply a partial and/or a full overlap between the first resources and the second resources in time, frequency, code, power, and/or spatial domain. The first resources may comprise one or more first sidelink resource units in a sidelink resource pool (e.g., as described herein in FIG. 18). The second resources may comprise one or more second sidelink resource units in the sidelink resource pool. A partial resource collision between the first resources and the second resources may indicate that the at least one sidelink resource unit of the one or more first sidelink resource units belongs to the one or more second sidelink resource units. A full resource collision between the first resources and the second resources may indicate that the one or more first sidelink resource units may be the same as, or a subset of, the one or more second sidelink resource units. A higher (bigger, larger, greater, etc.) priority value may indicate a lower (smaller, less, etc.) priority of a sidelink transmission. A lower (smaller, less, etc.) priority value may indicate a higher (bigger, larger, greater, etc.) priority of the sidelink transmission. The first wireless device may determine the sidelink pre-emption based on the resource collision and the second priority being higher than (greater than, bigger, etc.) the first priority. The first wireless device may determine the sidelink pre-emption, for example, based on or in response to the resource collision and a value of the second priority not satisfying (e.g., being smaller than, less than, lower than, etc.) a value of the first priority. A first wireless device may determine a sidelink pre-emption, for example, based on or in response to a resource collision, a value of the second priority not satisfying (e.g., being smaller than, lower than, less than, etc.) a priority threshold, and/or the value of the second priority being less (smaller, lower, etc.) than a value of the first priority.

A first wireless device may trigger a first resource selection procedure for selecting first resources (e.g., selected resources 2530 after a resource selection with collision as described herein in FIG. 25) for a first sidelink transmission. A second wireless device may send (e.g., transmit) SCI indicating resource reservation of the first resource for a second sidelink transmission. The first wireless device may determine a resource collision of the first resources between the first sidelink transmission and the second sidelink transmission. The first wireless device may trigger a resource re-evaluation (e.g., a resource evaluation action of a second resource selection procedure) at or before time (m−T3) (e.g., as described herein in FIG. 25) based on the resource collision. The first wireless device may trigger a resource reselection (e.g., a resource selection action of the second resource selection procedure) for selecting second resources (e.g., reselected resources 2540 after resource reselection as described herein in FIG. 25) based on the resource re-evaluation. The start time of the second resources may be time m (e.g., as described herein in FIG. 25).

Figure 28:
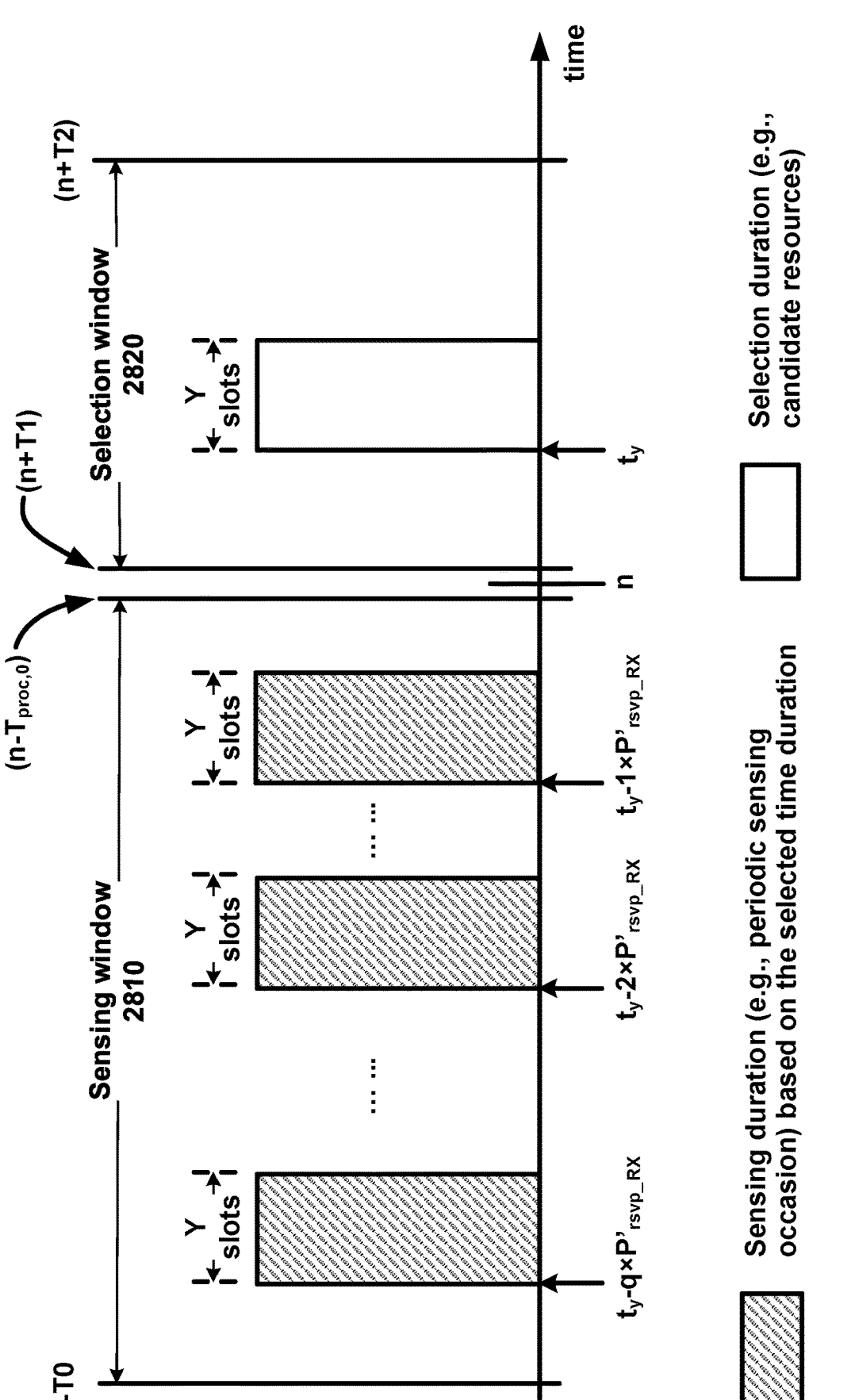
FIG. 28 shows an example of a resource selection procedure (e.g., periodic partial sensing) by a wireless device for sending (e.g., transmitting) a TB (e.g., a data packet) via sidelink.

FIG. 28 shows an example of a resource selection procedure (e.g., periodic partial sensing) by a wireless device for sending (e.g., transmitting) a TB (e.g., a data packet) via sidelink. As described herein in FIG. 24, a wireless device may perform the resource selection procedure (e.g., periodic partial sensing) for selecting resources for one or more sidelink transmissions in a sidelink resource pool. A sensing window 2810 of the resource selection procedure may start at time (n−T0). The sensing window 2810 may end at time (n−T$_{proc,0}$) n may be a reference time (e.g., time instance or slot n) for selecting the resources for the one or more sidelink transmissions (e.g., performing the resource selection procedure for sending the TB). n may be a reference time where the wireless device starts to select the resources. n may be a reference time by which the wireless device may complete the selection of the resources. T$_{proc,0}$ may be the time required to complete the sensing procedure. The wireless device may determine to trigger the resource selection procedure at time n to select the resources for the new data that arrived at the time (n−T$_{proc,0}$) (e.g., during a time slot (n−T$_{proc,0}$)) and/or during a time slot comprising the time (n−T$_{proc,0}$)) The wireless device may complete the resource selection procedure at time (n+T1) (e.g., during a time slot (n+T1) and/or during a time slot comprising the time (n+T1)). A selection window 2820 of the resource selection procedure may start at time (n+T1) and may end at time (n+T2) 2835.

A wireless device may select a selection duration comprising Y slots in the selection window as candidate slots for the resource selection procedure. The number of Y slots may be configured by a base station, a RSU, a second wireless device, and/or pre-configured by the wireless device. The base station, the RSU, and/or the second wireless device may send a message comprising a parameter (field), to the wireless device, to indicate the number of Y slots. The parameter (field) may be a portion (part, percentage, fraction, etc.) of resources in the selection window 2820. The message may be an RRC/SIB, a MAC CE, DCI and/or SCI. The selection duration may start at a time indicated by a slot t$_y$.

A base station, a RSU, and/or a second wireless device may send a message to a wireless device configuring one or more reservation intervals (periods) (e.g., sl-ThresPSSCH-RSRP-List as described herein in FIGS. 21 and 22) of the sidelink resource pool. The wireless device (e.g., the wireless device 2710 as described herein in FIG. 27) may determine one or more sensing durations (e.g., periodic sensing occasions) in a sensing window 2510, for example, based on or in response to a time t$_y$, Y slots, and/or reservation intervals (periods)

$$(\text{e.g., } P'_{rsvp\_RX})$$

in SCI. The wireless device may receive the SCI in the one or more sensing durations. Configured and/or pre-configured one or more reservation intervals (periods) (e.g., sl-ThresPSSCH-RSRP-List as described herein in FIGS. 21 and 22) of the sidelink resource pool may comprise the reservation intervals (periods)

$$(\text{e.g., } P'_{rsvp\_RX}).$$

The one or more sensing durations in the sensing window 2810 may be $$t_y - q \times P'_{rsvp\_RX},$$

where q is a positive integer. The second wireless device may select resources from the selection duration based on the sensing in the one or more sensing durations (e.g., as described herein in FIGS. 26 and 27). The wireless device may perform resource re-evaluation and/or pre-emption (as described herein in FIGS. 26 and 27) based on a resource selection procedure (e.g., periodic partial sensing).

Figure 29:
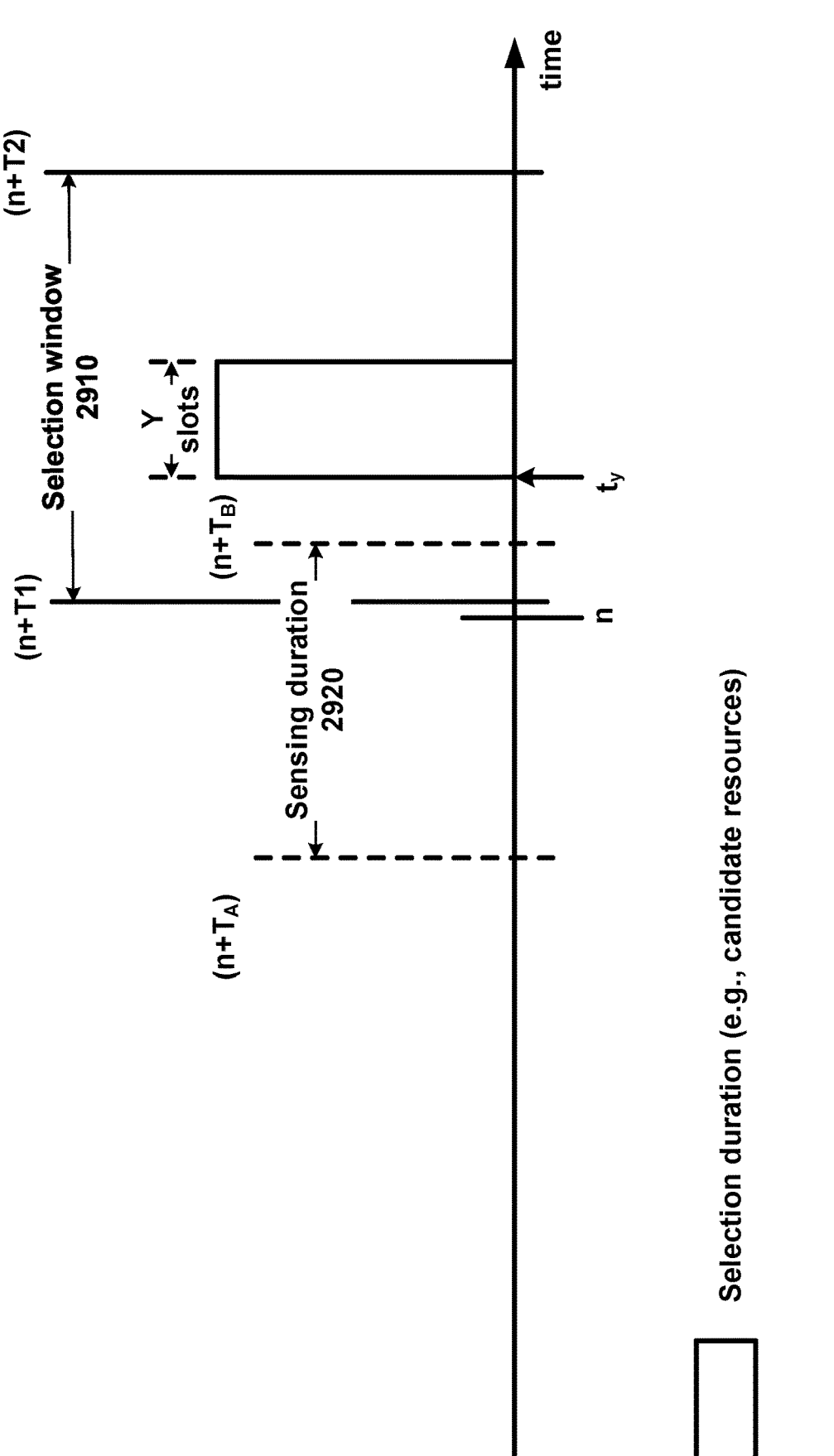
FIG. 29 shows an example of a resource selection procedure (e.g., continuous partial sensing) by a wireless device for sending (e.g., transmitting) a TB (e.g., a data packet) via sidelink.

FIG. 29 shows an example of a resource selection procedure (e.g., continuous partial sensing) by a wireless device for sending (e.g., transmitting) a TB (e.g., a data packet) via sidelink. An initial sidelink transmission may comprise SCI indicating resource indication of one or more resources for re-transmission(s) of the sidelink transmission (e.g., as described herein in FIG. 20). The initial sidelink transmission and the re-transmission(s) of a TB may be in a time duration of 32 slots. A wireless device may select a selection duration comprising Y slots in the selection window 2910 as candidate slots for a resource selection procedure (e.g., as described herein in FIG. 28). The number of Y slots may be configured by a base station, a RSU, a second wireless device, and/or may be pre-configured by the wireless device. The base station, the RSU, and/or the second wireless device may send a message comprising a parameter (field), to the wireless device, indicating the number of Y slots. The parameter (field) may be a portion (part, percentage, fraction, etc.) of resources in the selection window 2910. The message may be an RRC/SIB, a MAC CE, DCI and/or SCI. The selection duration may start from a time indicated by a slot t$_y$. The wireless device may determine a sensing duration 2920 of [n+T$_A$, n+T$_B$], based on the time n and/or the time t$_y$, the Y slots, and/or a reservation indication (e.g., Time resource assignment of a PSSCH) for retransmissions of a TB in SCI. The wireless device may receive the SCI in the sensing duration 2925 (e.g., contiguous partial sensing duration). The wireless device may exclude one or more resources from the Y candidate slots based on the reservation indication in the SCI and/or a RSRP measurement based on SCI. The value of T$_A$ and T$_B$ may be zero, a positive number, or a negative number. T$_A$ may be larger than (e.g., greater than, bigger than, etc.) or equal to −32. T$_B$ may be larger than (e.g., greater than, bigger than, etc.) or equal to T$_A$.

Figure 30:
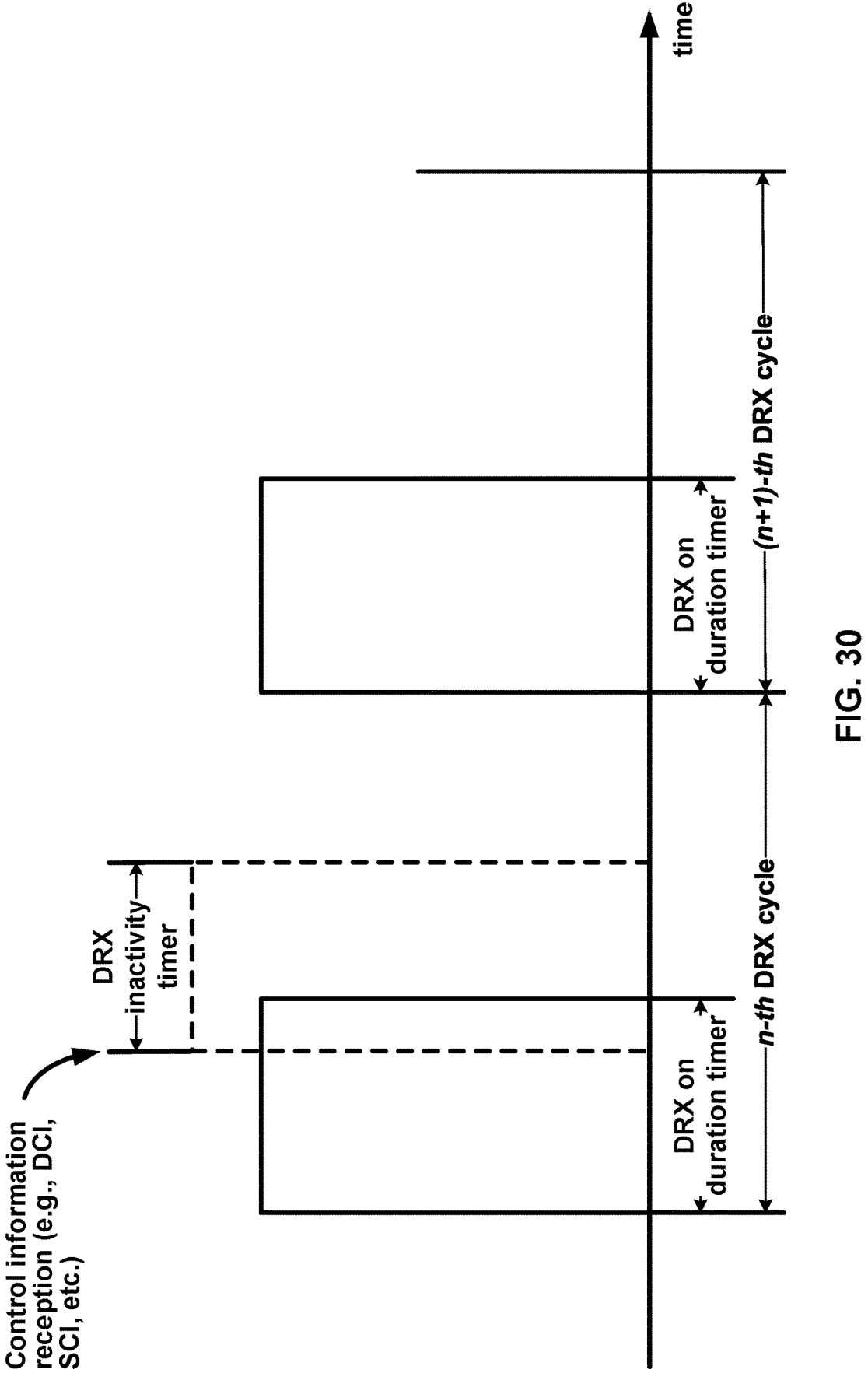
FIG. 30 shows an example of a discontinuous reception (DRX) operation at a wireless device.

FIG. 30 shows an example of a DRX operation at a wireless device.

Figure 31:
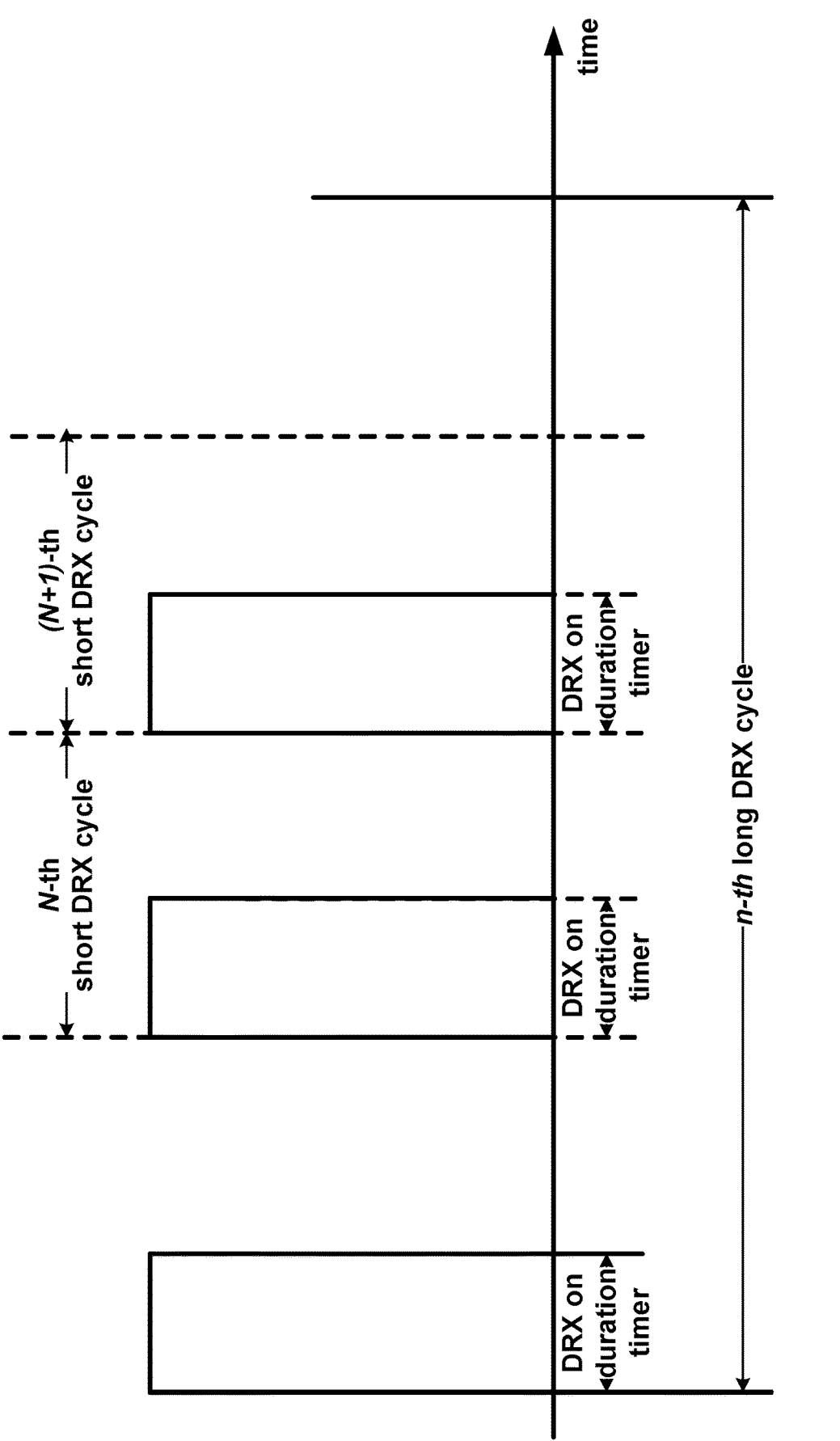
FIG. 31 shows an example of a DRX operation.

FIG. 31 shows an example of a DRX operation at a wireless device.

A base station and/or a first wireless device may send (e.g., transmit) a message to a second wireless device comprising (e.g., indicating) configuration parameters for a DRX operation of the second wireless device. The message may comprise an RRC/SIB, a MAC CE, DCI and/or SCI. The message (e.g., as described herein in FIG. 31) may configure a DRX cycle in time domain (e.g., a DRX long cycle and/or a DRX short cycle). The message may configure an on duration of the DRX cycle. An off duration of the DRX cycle may be a time duration other than the on duration of the DRX cycle. The DRX operation may be a Uu link (e.g., a downlink and/or uplink) DRX operation by the second wireless device. The DRX operation may be a sidelink DRX operation by the second wireless device.

For a downlink DRX operation, a wireless device (e.g., MAC entity of a wireless device) may be configured by RRC with a downlink DRX functionality that may control PDCCH monitoring activity by a wireless device (e.g., a MAC entity of a wireless device) of C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. The wireless device (e.g., a MAC entity of a wireless device) may monitor PDCCH discontinuously based on the downlink DRX operation, for example, if the wireless device is in RRC_CONNECTED mode and the downlink DRX is configured for activated Serving Cells with the wireless device.

A RRC may control the downlink DRX operation by configuring the following parameters:

drx-onDurationTimer: a duration at the beginning of a DRX cycle (e.g., DRX on duration of a DRX cycle as described herein in FIG. 30);

drx-SlotOffset: a delay before starting the drx-onDurationTimer;

drx-InactivityTimer: a duration after a PDCCH occasion in which a PDCCH indicates a new UL or DL transmission for the wireless device (e.g., a MAC entity of the wireless device);

drx-RetransmissionTimerDL (per DL HARQ process except for the broadcast process): a maximum duration until a DL retransmission is received;

drx-RetransmissionTimerUL (per UL HARQ process): a maximum duration until a grant for UL retransmission is received;

drx-LongCycleStartOffset: a Long DRX cycle and drx-StartOffset which defines a subframe where the Long and a Short DRX cycle starts;

drx-ShortCycle (optional): a Short DRX cycle;

drx-ShortCycleTimer (optional): a duration that the wireless device shall follow the Short DRX cycle;

drx-HARQ-RTT-TimerDL (per DL HARQ process except for the broadcast process): a minimum duration before a DL assignment for HARQ retransmission is expected by the wireless device (e.g., a MAC entity of the wireless device);

drx-HARQ-RTT-TimerUL (per UL HARQ process): a minimum duration before a UL HARQ retransmission grant is expected by the wireless device (e.g., the MAC entity of the wireless device);

ps-Wakeup (optional): a configuration to start associated drx-onDurationTimer in case DCP is monitored but not detected;

ps-TransmitOtherPeriodicCSI (optional): a configuration to report periodic CSI that is not L1-RSRP on PUCCH during the time duration indicated by drx-onDurationTimer in case DCP is configured but associated drx-onDurationTimer is not started;

ps-TransmitPeriodicL1-RSRP (optional): a configuration to send (e.g., transmit) periodic CSI that is L1-RSRP on PUCCH during the time duration indicated by drx-onDurationTimer in case DCP is configured but associated drx-onDurationTimer is not started.

Serving Cells of a wireless device (e.g., a MAC entity of a wireless device) may be configured by RRC in two DRX groups with separate DRX parameters. The RRC may configure a primary DRX group but may not configure a secondary DRX group. The Serving Cells may belong to the primary DRX group. The RRC may configure 2 DRX groups comprising a primary DRX group and a secondary DRX group. Each Serving Cell of the Serving Cells may be assigned (e.g., uniquely) to either of the 2 DRX groups. First DRX parameters may be separately configured for each DRX group of the 2 DRX groups comprising drx-onDurationTimer and drx-InactivityTimer. Second DRX parameters that are common to the 2 DRX groups comprising drx-SlotOffset, drx-Retransmission TimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

An Active Time for Serving Cells in a DRX group may comprise a time, for example, if downlink DRX is configured, while:

drx-onDurationTimer or drx-InactivityTimer configured for the DRX group is running;

drx-RetransmissionTimerDL or drx-RetransmissionTimerUL is running on any Serving Cell in the DRX group;

ra-ContentionResolutionTimer or msgB-Response Window is running; or a Scheduling Request is sent on PUCCH and is pending; or a PDCCH indicating a new transmission addressed to the C-RNTI of the wireless device (e.g., a MAC entity of the wireless device) has not been received after successful reception of a Random Access Response for the Random Access Preamble not selected by the Wireless device (e.g., a MAC entity of the wireless device) of among the contention-based Random Access Preamble.

A Wireless device (e.g., a MAC entity of a wireless device) shall, for example, if downlink DRX is configured:

1> if a MAC PDU is received in a configured downlink assignment:

2> start the drx-HARQ-RTT-TimerDL for the corresponding HARQ process in the first symbol after the end of the corresponding transmission carrying the DL HARQ feedback;

2> stop the drx-RetransmissionTimerDL for the corresponding HARQ process.

1> If a MAC PDU is sent (e.g., transmitted) in a configured uplink grant and LBT (Listen Before Talk) failure indication is not received from lower layers:

2> start the drx-HARQ-RTT-TimerUL for the corresponding HARQ process in the first symbol after the end of the first transmission (within a bundle) of the corresponding PUSCH transmission;

2> stop the drx-RetransmissionTimerUL for the corresponding HARQ process at the first transmission (within a bundle) of the corresponding PUSCH transmission.

1> if a drx-HARQ-RTT-TimerDL expires:

2> if the data of the corresponding HARQ process was not successfully decoded:

3> start the drx-RetransmissionTimerDL for the corresponding HARQ process in the first symbol after the expiry of drx-HARQ-RTT-TimerDL.

1> if a drx-HARQ-RTT-TimerUL expires:

2> start the drx-RetransmissionTimerUL for the corresponding HARQ process in the first symbol after the expiry of drx-HARQ-RTT-TimerUL.

1> if a DRX Command MAC CE or a Long DRX Command MAC CE is received:

2> stop drx-onDurationTimer for each DRX group;

2> stop drx-InactivityTimer for each DRX group.

1> if drx-InactivityTimer for a DRX group expires:

2> if the Short DRX cycle is configured:

3> start or restart drx-ShortCycleTimer for this DRX group in the first symbol after the expiry of drx-Inactivity Timer;

3> use the Short DRX cycle for this DRX group.

2> else:

3> use the Long DRX cycle for this DRX group.

1> if a DRX Command MAC CE is received:

2> if the Short DRX cycle is configured:

3> start or restart drx-ShortCycleTimer for each DRX group in the first symbol after the end of DRX Command MAC CE reception;

3> use the Short DRX cycle for each DRX group.

2> else:

3> use the Long DRX cycle for each DRX group.

1> if drx-ShortCycleTimer for a DRX group expires:

2> use the Long DRX cycle for this DRX group.

1> if a Long DRX Command MAC CE is received:

2> stop drx-ShortCycleTimer for each DRX group;

2> use the Long DRX cycle for each DRX group.

1> if the Short DRX cycle is used for a DRX group, and [(SFN×10)+subframe number] modulo(drx–Short-Cycle)=(drx–StartOffset)modulo(drx–ShortCycle):

2> start drx-onDurationTimer for this DRX group after drx-SlotOffset from the beginning of the subframe.

1> if the Long DRX cycle is used for a DRX group, and [(SFN×10)+sub frame number] modulo (drx–Long Cycle)=drx–StartOffset:

2> if DCP monitoring is configured for the active DL BWP:

3> if DCP indication associated with the current DRX cycle received from lower layer indicated to start drx-onDurationTimer; or 3> if all DCP occasion(s) in time domain associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the Wireless device (e.g., a MAC entity of a wireless device) monitors for a PDCCH transmission on the search space indicated by recoverySearchSpaceId of the SpCell identified by the C-RNTI while the ra-Response-Window is running; or 3> if ps-Wakeup is configured with value true and DCP indication associated with the current DRX cycle has not been received from lower layers:

4> start drx-onDurationTimer after drx-SlotOffset from the beginning of the subframe.

2> else:

3> start drx-onDurationTimer for this DRX group after drx-SlotOffset from the beginning of the subframe.

1> if a DRX group is in Active Time:

2> monitor the PDCCH on the Serving Cells in this DRX group;

2> if the PDCCH indicates a DL transmission:

3> start the drx-HARQ-RTT-TimerDL for the corresponding HARQ process in the first symbol after the end of the corresponding transmission carrying the DL HARQ feedback;

3> stop the drx-RetransmissionTimerDL for the corresponding HARQ process.

3> if the PDSCH-to-HARQ_feedback timing indicates a non-numerical kl value:

4> start the drx-RetransmissionTimerDL in the first symbol after the (end of the last) PDSCH transmission (within a bundle) for the corresponding HARQ process.

2> if the PDCCH indicates a UL transmission:

3> start the drx-HARQ-RTT-TimerUL for the corresponding HARQ process in the first symbol after the end of the first transmission (within a bundle) of the corresponding PUSCH transmission;

3> stop the drx-RetransmissionTimerUL for the corresponding HARQ process.

2> if the PDCCH indicates a new transmission (DL or UL) on a Serving Cell in this DRX group:

3> start or restart drx-InactivityTimer for this DRX group in the first symbol after the end of the PDCCH reception.

2> if a HARQ process receives downlink feedback information and acknowledgement is indicated:

3> stop the drx-RetransmissionTimerUL for the corresponding HARQ process.

1> if DCP monitoring is configured for the active DL BWP; and

1> if the current symbol n occurs within drx-onDuration-Timer duration; and

1> if drx-onDurationTimer associated with the current DRX cycle is not started:

2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:

3> not send (e.g., transmit) periodic SRS and semi-persistent SRS;

3> not report semi-persistent CSI configured on PUSCH;

3> if ps-TransmitPeriodicL1-RSRP is not configured with value true:

4> not report periodic CSI that is L1-RSRP on PUCCH.

3> if ps-TransmitOtherPeriodicCSI is not configured with value true:

4> not report periodic CSI that is not L1-RSRP on PUCCH.

1> else:

2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:

3> not send (e.g., transmit) periodic SRS and semi-persistent SRS in this DRX group;

3> not report CSI on PUCCH and semi-persistent CSI configured on PUSCH in this DRX group.

2> if CSI masking (csi-Mask) is setup by upper layers:

3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions; and 4> not report CSI on PUCCH in this DRX group.

Regardless of whether a wireless device (e.g., a MAC entity of a wireless device) may be monitoring a PDCCH or not on Serving Cells in a DRX group, the wireless device (e.g., a MAC entity of the wireless device) may send (e.g., transmit) HARQ feedback, aperiodic CSI on PUSCH, and aperiodic SRS on the Serving Cells in the DRX group, for example, if such response is expected.

A wireless device (e.g., a MAC entity of a wireless device) may not need to monitor a PDCCH, if it is not a complete PDCCH occasion (e.g. the Active Time starts or ends in the middle of a PDCCH occasion).

In a sidelink DRX operation, a wireless device (e.g., a MAC entity of a wireless device) may be configured by RRC with a sidelink DRX functionality that may control PSCCH monitoring activity of a wireless device. The wireless device (e.g., a MAC entity of a wireless device) may monitor PSCCH discontinuously, for example, based on or in response to the sidelink DRX operation and the sidelink DRX being configured to the wireless device.

RRC may control the sidelink DRX operation by configuring the following parameters:

sl-drx-onDurationTimer: a duration at the beginning of a DRX cycle (e.g., DRX duration on of a DRX cycle as described herein in FIG. 30);

sl-drx-SlotOffset: a delay before starting the sl-drx-onDurationTimer;

sl-drx-InactivityTimer (except for the broadcast transmission): a duration after the first slot of SCI (i.e., 1st stage SCI and 2nd stage SCI) reception in which the SCI indicates a new sidelink transmission for the wireless device (e.g., a MAC entity of the wireless device);

sl-drx-Retransmission Timer (per sidelink process except for the broadcast transmission): a maximum duration until a sidelink retransmission is received;

sl-drx-StartOffset: sl-drx-StartOffset which defines the in terms of symbols and/or slots where the sidelink DRX cycle starts; the sl-drx-StartOffset may be set based on destination Layer-2 ID for sidelink groupcast and broadcast.

sl-drx-Cycle: a sidelink DRX cycle;

sl-drx-HARQ-RTT-Timer (per Sidelink process except for the broadcast transmission): a minimum duration before a sidelink HARQ retransmission is expected by the wireless device (e.g., a MAC entity of the wireless device).

An Active Time may comprise a time, for an example, if sidelink DRX is configured, while:

sl-drx-onDurationTimer or sl-drx-InactivityTimer is running; or sl-drx-Retransmission Timer is running.

A wireless device (e.g., a MAC entity of a wireless device) shall, for example, if one or more sidelink DRX is configured:

1> if a sl-drx-HARQ-RI I-Timer expires:

2> if the data of the corresponding Sidelink process was not successfully decoded:

3> start the sl-drx-RetransmissionTimer for the corresponding Sidelink process in the first slot and/or symbol after the expiry of sl-drx-HARQ-RTT-Timer.

1> if the sidelink DRX cycle is used:

2> start sl-drx-onDurationTimer after sl-drx-SlotOffset from the beginning of the subframe.

1> if a sidelink DRX is in Active Time:

2> monitor the SCI (i.e., 1st stage SCI and 2nd stage SCI) in this sidelink DRX.

2> if the SCI indicates a new sidelink transmission:

3> if Source Layer-1 ID and Destination Layer-1 ID of the SCI is equal to the intended Destination Layer-1 ID and Source Layer-1 ID pair and the cast type indicator in the SCI is set to unicast:

4> start or restart sl-drx-InactivityTimer for the corresponding Source Layer-1 ID and Destination Layer-1 ID pair after the first slot of SCI reception.

3> if Destination Layer-1 ID of the SCI (i.e., 2nd stage SCI) is equal to the intended Destination Layer-1 ID and the cast type indicator in the SCI is set to groupcast:

4> start or restart sl-drx-InactivityTimer for the corresponding Destination Layer-1 ID after the first slot of SCI reception.

2> if the SCI indicates a sidelink transmission:

3> if HARQ feedback has been enabled for the MAC PDU:

4> start the sl-drx-HARQ-RTT-Timer for the corresponding Sidelink process in the first slot/symbol after the end of the corresponding transmission carrying the sidelink HARQ feedback; or 4> start the sl-drx-HARQ-RTT-Timer for the corresponding Sidelink process in the first slot/symbol after the end of the corresponding resource carrying the sidelink HARQ feedback when the sidelink HARQ feedback is not sent (e.g., transmitted) due to UL/SL prioritization;

3> if HARQ feedback has been disabled for the MAC PDU:

4> start the sl-drx-HARQ-RTT-Timer for the corresponding Sidelink process.

3> stop the sl-drx-RetransmissionTimer for the corresponding Sidelink process.

1> if a SL DRX Command MAC CE is received for Source Layer-1 ID and Destination Layer-1 ID pair of a unicast:

2> stop sl-drx-onDurationTimer for Source Layer-1 ID and Destination Layer-1 ID pair of a unicast;

2> stop sl-drx-InactivityTimer for Source Layer-1 ID and Destination Layer-1 ID pair of a unicast.

Sidelink DRX Command MAC CE may be supported in sidelink unicast.

Figure 32:
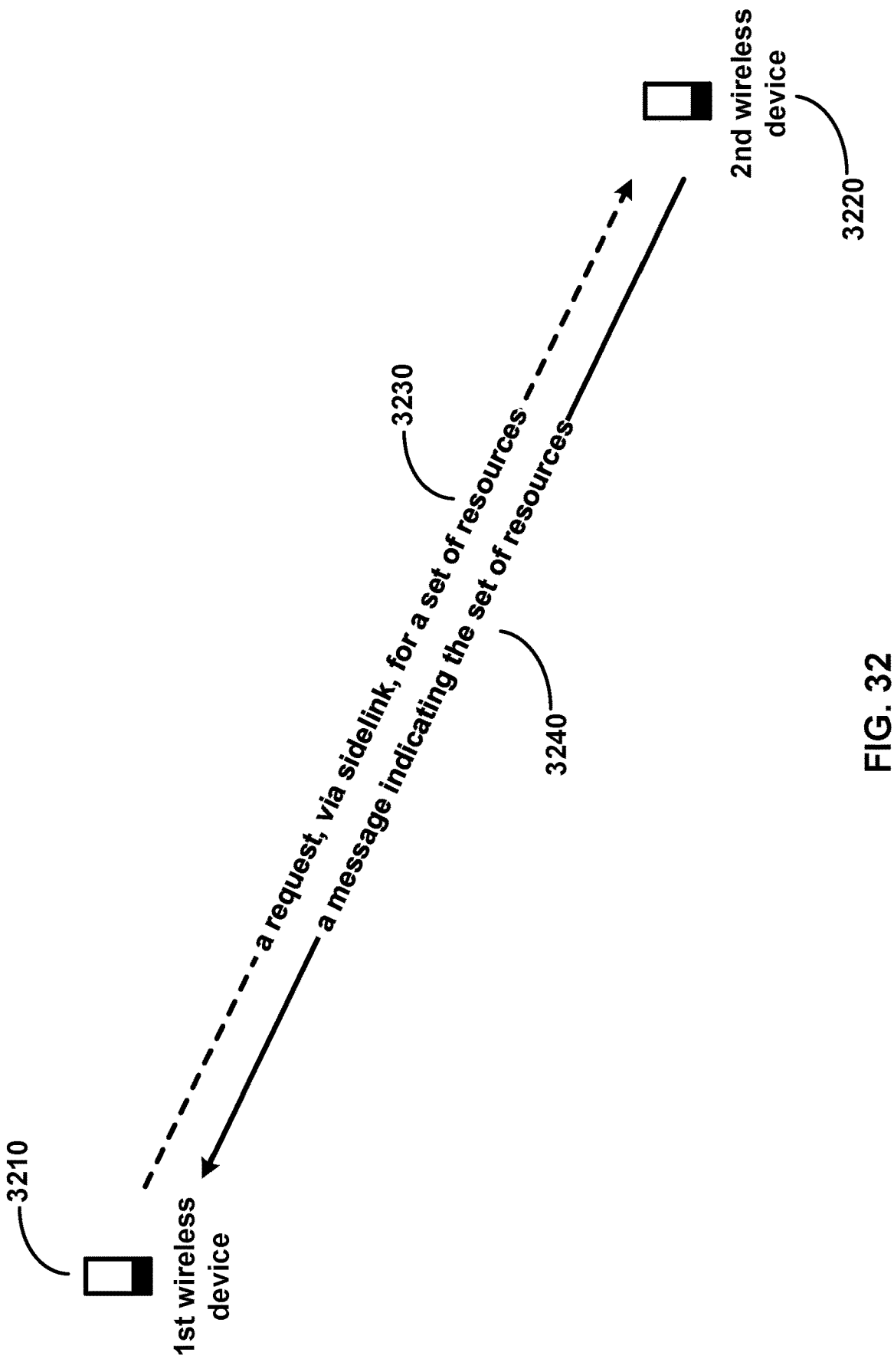
FIG. 32 shows an example of a sidelink inter-wireless-device coordination (e.g., an inter-UE coordination scheme 1).

FIG. 32 shows an example of a sidelink inter-wireless-device coordination (e.g., an inter-UE coordination scheme 1). A first wireless device (e.g., 1st wireless device) 3210 and a second wireless device (e.g., 2nd wireless device) 3220 may perform an inter-wireless-device coordination. The first wireless device (e.g., 1st wireless device) 3210 may be a requesting wireless device of the inter-wireless-device coordination (e.g., an inter-UE coordination) between the first wireless device (e.g., 1st wireless device) 3210 and the second wireless device (e.g., 2nd wireless device) 3220. The first wireless device (e.g., 1st wireless device) 3210 may be a sender (e.g., a transmitter) of one or more sidelink transmissions. The second wireless device (e.g., 2nd wireless device) 3220 may be a coordinating wireless device of an inter-wireless-device coordination. The second wireless device (e.g., 2nd wireless device) 3220 may or may not be an intended receiver of one or more sidelink transmissions by the first wireless device (e.g., 1st wireless device) 3210.

A sidelink transmission may comprise a PSCCH, a PSSCH, and/or a PSFCH. SCI of a sidelink transmission may comprise a destination ID of the sidelink transmission (e.g., as described herein in FIG. 19). A wireless device may be an intended receiver of a sidelink transmission if the wireless device has an identical ID as the destination ID in the SCI.

A first wireless device (e.g., 1st wireless device) 3210 may request, from a second wireless device (e.g., 2nd wireless device) 3220, coordination (assistance) information (e.g., a set of resources) for one or more sidelink transmissions, for example, before sending (e.g., transmitting) the one or more sidelink transmissions. Coordination information may comprise a first set of resources for sending (e.g., transmitting) one or more sidelink transmissions. A first wireless device (e.g., 1st wireless device) 3210 may send (e.g., transmit), to a second wireless device (e.g., 2nd wireless device) 3220 via a sidelink, a request message requesting coordination information (e.g., a set of resources) 3230 to trigger an inter-wireless-device coordination. The second wireless device (e.g., 2nd wireless device) 3220 may trigger inter-wireless-device coordination, for example, based on or in response to receiving a request message from a first wireless device (e.g., 1st wireless device) 3210. A first wireless device (e.g., 1st wireless device) 3210 may not send (e.g., transmit) a request message to trigger an inter-wireless-device coordination. A second wireless device (e.g., 2nd wireless device) 3220 may trigger an inter-wireless-device coordination based on an event and/or a condition.

A second wireless device (e.g., 2nd wireless device) 3220 may select a first set of resources for an inter-wireless-device coordination, for example, based on or in response to a trigger for the coordination. A second wireless device (e.g., 2nd wireless device) 3220 may or may not trigger a first resource selection procedure for selecting a first set of resources. A second wireless device (e.g., 2nd wireless device) 3220 may select a first set of resources based on resource reservation and/or allocation information available at the second wireless device (e.g., 2nd wireless device) 3220. The second wireless device (e.g., 2nd wireless device) 3220 may select a first set of resources based on the first set of resources that may be reserved for uplink transmissions to an intended receiver of one or more sidelink transmissions. The second wireless device (e.g., 2nd wireless device) 3220 may select a first set of resources based on an intended receiver of one or more sidelink transmissions that may receive other sidelink transmissions via the first set of resources. The first set of resources may be a set of preferred resources of a first wireless device (e.g., 1st wireless device) 3210 for one or more sidelink transmissions. The first set of resources may be a set of preferred resources of an intended receiver of the one or more sidelink transmissions. The first set of resources may be a set of non-preferred resources of a first wireless device (e.g., 1st wireless device) 3210 for one or more sidelink transmissions. The first set of resources may be a set of non-preferred resources of an intended receiver of the one or more sidelink transmissions.

A second wireless device (e.g., 2nd wireless device) 3220 may send (e.g., transmit) to a first wireless device (e.g., 1st wireless device) 3210, and via sidelink, a message (e.g., coordination information) comprising and/or indicating a first set of resources 3240. The message may comprise a RRC, a MAC CE, and/or SCI. The SCI may comprise a first stage and a second stage. The first stage of the SCI may comprise and/or indicate a first set of resources. The second stage of the SCI may comprise and/or indicate a first set of resources.

A first wireless device (e.g., 1st wireless device) 3210 may select a second set of resources, for example, based on a first set of resources and/or in response to receiving a message. A first wireless device (e.g., 1st wireless device) 3210 may or may not trigger a second resource selection procedure for selecting a second set of resources. The first wireless device (e.g., 1st wireless device) 3210 may select a second set of resources based on a first set of resources. A first wireless device (e.g., 1st wireless device) 3210 may randomly select resources, from a first set of resources, for a second set of resources. The first wireless device (e.g., 1st wireless device) 3210 may select a resource, from the first set of resources, for the second set of resources, for example, if the resource is in a selection window of the second resource selection procedure. The first wireless device (e.g., 1st wireless device) 3210 may select a resource, from the first set of resources, for the second set of resources, for example, if the resources are before a PDB (e.g., no later than the PDB) of one or more sidelink transmissions.

An inter-wireless-device coordination may be an inter-UE coordination scheme 1. In an inter-UE coordination scheme 1, a coordinating wireless device (e.g., a 2nd wireless device 3220) may select a set of preferred and/or a set of non-preferred resources for a requesting wireless device (e.g., a 1st wireless device 3210). A coordinating wireless device (e.g., a 2nd wireless device 3220) may send (e.g., transmit, provide, indicate) a message indicating a set of preferred and/or a set of non-preferred resources 3250 (e.g., coordination information and/or assistance information) to a requesting wireless device (e.g., a 1st wireless device 3210). A requesting wireless device (e.g., a 1st wireless device 3210) may send (e.g., transmit) one or more sidelink transmissions based on a set of preferred and/or a set of non-preferred resources.

A preferred resource, for sending (e.g., transmitting), by a requesting wireless device (e.g., a 1st wireless device 3210), and/or receiving, by a coordinating wireless device (e.g., a 2nd wireless device 3220), of an inter-wireless-device coordination of a sidelink transmission, may be a resource with a reference signal received power (RSRP), as measured by the coordinating wireless device (e.g., a 2nd wireless device 3220), that may not satisfy (e.g., below, lower than, less than etc.) a RSRP threshold. A preferred resource, for sending (e.g., transmitting), by a requesting wireless device (e.g., a 1st wireless device 3210), and/or receiving, by a coordinating wireless device (e.g., a 2nd wireless device 3220), of the inter-wireless-device coordination of a sidelink transmission, may be a resource with a priority value that satisfies (e.g., above, higher than, greater than, etc.) a priority threshold.

A non-preferred resource, for sending (e.g., transmitting), by a requesting wireless device (e.g., a 1st wireless device 3210), and/or receiving, by a coordinating wireless device (e.g., a 2nd wireless device 3220), of an inter-wireless-device coordination of a sidelink transmission, may be a resource with a RSRP, as measured by the coordinating wireless device (e.g., a second wireless device 3220), that may satisfy (e.g., above, higher than, greater than, etc.) a RSRP threshold (e.g., a hidden node problem with a high interference level). A non-preferred resource, for sending (e.g., transmitting), by a requesting wireless device (e.g., a 1st wireless device 3210), and/or receiving, by a coordinating wireless device (e.g., a second wireless device 3220), of the inter-wireless-device coordination of a sidelink transmission, may be a resource with a priority value that may not satisfy (e.g., below, lower than, less than, etc.) a priority threshold (e.g., a resource collision problem with another sidelink transmission and/or reception which has a higher priority). A non-preferred resource, for sending (e.g., transmitting), by a requesting wireless device (e.g., a first wireless device 3210) and/or receiving, by a coordinating wireless device (e.g., a 2nd wireless device 3220), of the inter-wireless-device coordination of a sidelink transmission, may be a resource that may be reserved for a second sidelink and/or uplink transmission of a coordinating wireless device (e.g., a 2nd wireless device 3220) and/or an intended receiver (e.g., a half-duplex problem). A coordinating wireless device (e.g., a 2nd wireless device 3220) may or may not perform a resource selection procedure for selecting a set of non-preferred resources. A coordinating wireless device (e.g., a 2nd wireless device 3220) may select a set of non-preferred resources based on sensing results of the coordinating wireless device (e.g., a 2nd wireless device 3220).

A higher priority value may indicate a lower priority. A lower priority value may indicate a higher priority. A first sidelink transmission may have a first priority value. A second sidelink transmission may have a second priority value. A first priority of the first sidelink transmission indicated by the first priority value may be lower than a second priority of the second sidelink transmission indicated by the second priority value, for example, if the first priority value is greater than the second priority value.

Figure 33:
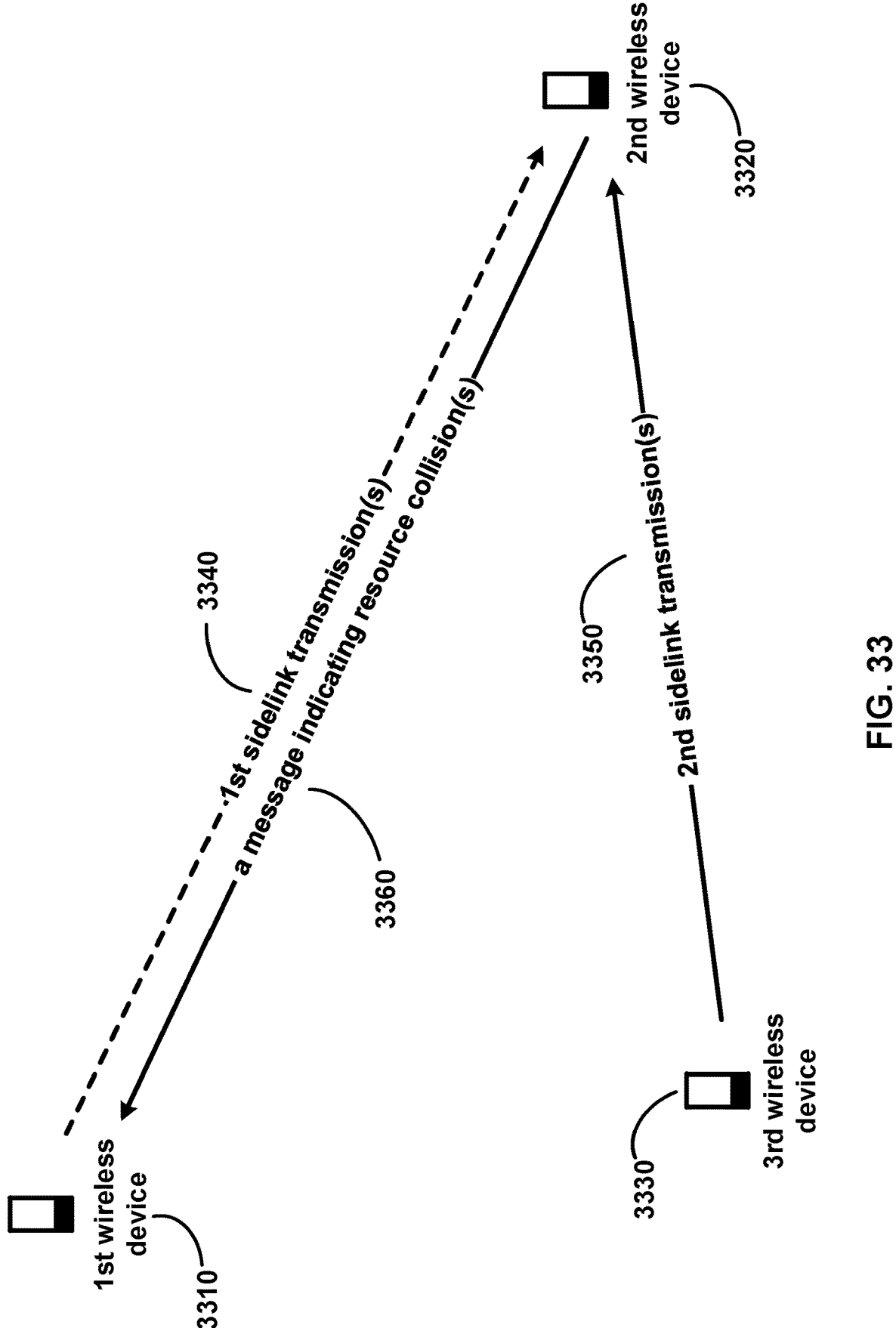
FIG. 33 shows an example of a sidelink inter-wireless-device coordination (e.g., an inter-UE coordination scheme 2).

FIG. 33 shows an example of a sidelink inter-wireless-device coordination (e.g., an inter-UE coordination scheme 2). A first wireless device (e.g., a 1st wireless device) 3310 and a second wireless device (e.g., 2nd wireless device) 3320 may perform an inter-wireless-device coordination. A first wireless device (e.g., a 1st wireless device) 3310 may be a requesting wireless device of an inter-wireless-device coordination between a first wireless device (e.g., a 1st wireless device) 3310 and a second wireless device (e.g., 2nd wireless device) 3320. A first wireless device (e.g., a 1st wireless device) 3310 may be a sender (e.g., transmitter) of one or more first sidelink transmissions (e.g., 1st sidelink transmission(s)) 3340. A second wireless device (e.g., 2nd wireless device) 3320 may be a coordinating wireless device of an inter-wireless-device coordination. A second wireless device (e.g., 2nd wireless device) 3320 may or may not be an intended receiver of one or more first sidelink transmissions (e.g., 1st sidelink transmission(s)) 3340 of a first wireless device (e.g., a 1st wireless device) 3310.

A sidelink transmission may comprise a PSCCH, a PSSCH and/or a PSFCH (e.g., as described herein in FIG. 19). SCI of a sidelink transmission may comprise a destination ID of the sidelink transmission. A wireless device may be an intended receiver of a sidelink transmission, for example, if the wireless device has an identical ID as a destination ID in the SCI.

A first wireless device (e.g., a 1st wireless device) 3310 may request from a second wireless device (e.g., 2nd wireless device) 3320, coordination information (e.g., assistance information) for one or more sidelink transmissions 3340. A first wireless device (e.g., a 1st wireless device) 3310 may trigger an inter-wireless-device coordination by sending (e.g., transmitting), via sidelink, a request message requesting coordination information to a second wireless device (e.g., 2nd wireless device) 3320. A second wireless device (e.g., 2nd wireless device) 3320 may trigger an inter-wireless-device coordination, for example, based on or in response to receiving a request message from a first wireless device (e.g., a 1st wireless device) 3310. Inter-wireless-device coordination may be triggered without the first wireless device (e.g., a first wireless device) 3310 sending (e.g., transmitting) a request message. The second wireless device (e.g., a 2nd wireless device) 3320 may trigger inter-wireless-device coordination, for example, based on or in response to an event and/or a condition.

A second wireless device (e.g., a 2nd wireless device) 3320 may receive first SCI from a first wireless device (e.g., a 1st wireless device) 3310. The first SCI may reserve one or more first resources for one or more first sidelink transmissions (e.g., 1st sidelink transmission(s)) 3340. A request message may comprise the first SCI. One or more first sidelink transmissions (e.g., 1st sidelink transmission(s)) 3340 may comprise the first SCI. A second wireless device (e.g., a 2nd wireless device) 3320 may receive, from a third wireless device (e.g., a 3rd wireless device) 3330, one or more second sidelink transmissions (e.g., 2nd sidelink transmission(s)) 3350. One or more second sidelink transmissions (e.g., 2nd sidelink transmission(s)) 3350 may comprise second SCI. The second SCI may reserve one or more second resources for one or more second sidelink transmissions (e.g., 2nd sidelink transmission(s)) 3350. A second wireless device (e.g., a 2nd wireless device) 3320 may or may not be an intended receiver of one or more second sidelink transmissions (e.g., 2nd sidelink transmission(s)) 3350.

A second wireless device (e.g., a 2nd wireless device) 3320 may determine coordination information for an inter-wireless-device coordination, for example, based on or in response to a triggering of the inter-wireless-device coordination. A second wireless device (e.g., a 2nd wireless device) 3320 may determine coordination information based on first SCI. A second wireless device (e.g., a 2nd wireless device) 3320 may determine one or more first resources comprising resources that the second wireless device (e.g., a 2nd wireless device) 3320 may not use to receive one or more first sidelink transmissions (e.g., 1st sidelink transmission(s)) 3340, for example, if the second wireless device (e.g., a 2nd wireless device) 3320 is an intended receiver of one or more first sidelink transmissions (e.g., 1st sidelink transmission(s)) 3340. A second wireless device (e.g., a 2nd wireless device) 3320 may send (e.g., transmit), via sidelink and/or uplink, a message indicating coordination information 3360. The message indicating coordination information 3360 may include resources that the second wireless device (e.g., a 2nd wireless device) 3320 may not use to receive one or more first sidelink transmissions (e.g., 1st sidelink transmission(s)) 3340. A second wireless device (e.g., a 2nd wireless device) 3320 may experience half-duplex when sending (e.g., transmitting) via resources (e.g., sending (transmitting) via sidelink). Coordination information may comprise and/or indicate resources a second wireless device (e.g., a 2nd wireless device) 3320 may not use to receive one or more first sidelink transmissions (e.g., 1st sidelink transmission(s)) 3340, for example, if the second wireless device (e.g., 2nd wireless device) 3320 is an intended receiver of one or more first sidelink transmissions (e.g., 1st sidelink transmission(s)) 3340. A second wireless device (e.g., a 2nd wireless device) 3320 may determine coordination information based on the first SCI and/or the second SCI. A second wireless device (e.g., a 2nd wireless device) 3320 may determine that one or more first resources partially or fully overlap with one or more second resources. A second wireless device (e.g., a 2nd wireless device) 3320 may determine from coordination information that resources of one or more first resources and of one or more second resources overlap. Overlapping resources may be expected overlapped resources (e.g., potential (future) resources) and/or detected overlapped resources (e.g., past resources). Coordination information may comprise and/or indicate overlapped resources between one or more first resources and one or more second resources. A full overlap between a first set of resources and a second set of resources may indicate that the first set of resources may be identical with the second set of resources or that a subset of the first set of resources may be identical with a subset of the second set of resources. A partial overlap between a first set of resources and a second set of resources may indicate that the first set of resources and the second set of resources comprise one or more overlapped (e.g., identical) first sidelink resource units and/or one or more non-overlapped (e.g., different) second sidelink resource units.

A message comprising and/or indicating coordination (assistance) information 3360 (e.g., comprising an indication of one or more resources described herein) may comprise a RRC, a MAC CE, SCI, and/or a PSFCH (e.g., a PSFCH format 0). A PSFCH format 0 may be a pseudo-random (PN) sequence defined by a length-31 Gold sequence. An index of a PN sequence of a PSFCH format 0 may indicate a resource collision, when a resource is associated with a PSFCH resource conveying the PSFCH format 0. SCI may comprise a first stage and a second stage (e.g., as shown in FIG. 19). A first stage of the SCI may comprise and/or indicate coordination information. A second stage of the SCI may comprise and/or indicate coordination information.

A first wireless device (e.g., a 1st wireless device) 3310 may select and/or update a set of resources for one or more first sidelink transmissions (e.g., 1st sidelink transmission (s)) 3340, for example, based on or in response to receiving a message. The first wireless device (e.g., a 1st wireless device) 3310 may select and/or update a set of resources for one or more first sidelink transmissions (e.g., 1st sidelink transmission(s)) 3340, for example, based on the coordination information. A first wireless device (e.g., a 1st wireless device) 3310 may or may not trigger a resource selection procedure for selecting and/or updating a set of resources. A first wireless device (e.g., a 1st wireless device) 3310 may determine to resend (e.g., retransmit) one or more first sidelink transmissions (e.g., 1st sidelink transmission(s)) 3340 based on coordination information.

FIG. 33 may be an example of an inter-UE coordination scheme 2. A coordinating wireless device (e.g., a 2nd wireless device 3320) may determine coordination information based on an inter-UE coordination scheme 2 and on expected overlapped and/or collided resources (e.g., potential (future) resources) and/or on detected overlapped and/or collided resources (e.g., past resources) between a first set of resources reserved by a requesting wireless device (e.g., a 1st wireless device 3310) and a second set of resources reserved by a third wireless device (e.g., 3rd wireless device) 3330.

Listen-before-talk (LBT) may be implemented for transmission in an unlicensed (shared) cell. An unlicensed (shared) cell may be referred to as a license assisted access (LAA) cell and/or a NR-U cell. An unlicensed (shared) cell may be operated in a licensed band as either a non-stand-alone with an anchor cell or a standalone without an anchor cell. LBT may comprise a clear channel assessment (CCA). Equipment may apply a CCA before using an unlicensed (shared) cell or channel, for example, based on or in response to an LBT procedure. A CCA may comprise energy detection that may determine a presence or absence of other signals on a channel (e.g., a channel may be occupied or may be unoccupied). Regulations of a country may impact a LBT procedure (e.g., European and Japanese regulations mandate the usage of LBT in an unlicensed (shared) band) (e.g., a 5 GHz unlicensed (shard) band). Carrier sensing via LBT may be a way for sharing an unlicensed (shared) spectrum, fairly, among different devices and/or networks attempting to utilize the unlicensed (shared) spectrum.

Discontinuous transmission on an unlicensed (shared) band with a limited maximum transmission duration may be enabled. Some functions may be supported by one or more signals that may be sent (e.g., transmitted) as part of a discontinuous downlink transmission on an unlicensed (shared) band. Channel reservation may be enabled by a transmission of signals by a new radio unlicensed (NR-U) node, for example, based on or in response to gaining channel access from a successful LBT operation. Other nodes may sense that a channel may be occupied based on receiving signals (e.g., signals sent (transmitted) for channel reservation) that have an energy level satisfying (e.g., above, higher than, greater than, etc.) a threshold value. Functions that may require support by one or more signals for operation in an unlicensed (shared) band with discontinuous downlink transmission may comprise one or more of: detection of the downlink transmission in the unlicensed (shared) band (including cell identification) by a wireless devices (e.g., one or more wireless devices described herein), time synchronization, and/or frequency synchronization of wireless devices (e.g., one or more wireless devices described herein).

Downlink transmission and frame structure design for operation in an unlicensed (shared) band may employ a subframe, a (mini-)slot, and/or symbol boundary alignment according to timing relationships across serving cells aggregated by carrier aggregation. Base station transmissions may not start at a subframe, a (mini-)slot, and/or symbol boundary. Unlicensed (shared) cell operations (e.g., LAA and/or NR-U) may support sending (e.g., transmitting) PDSCH, for example, when not all OFDM symbols are available for transmission in a subframe according to LBT. Delivery control information that may be necessary for PDSCH may also be supported.

A LBT procedure may be employed for fair and friendly coexistence of a wireless system (e.g., a 3GPP system, such as LTE, NR, 6G, etc.) with other operators and/or radio access technologies (RATs), (e.g., Wi-Fi, etc.) that may operate in an unlicensed (shared) spectrum. A node attempting to send (e.g., transmit) on a carrier in an unlicensed (shared) spectrum may perform a CCA as a part of an LBT procedure to determine, for example, if a channel is free (idle) for use. A LBT procedure may involve energy detection to determine if the channel is being used (occupied). Regulatory requirements in some regions (e.g., in Europe) may specify an energy detection threshold. A node may determine that a channel may be used (occupied) rather than being free (idle), for example, if the node receives energy satisfying (e.g., above, higher than, greater than, etc.) an energy detection threshold. A node may use an energy detection threshold below (e.g., lower than, less than, etc.) a threshold specified by regulatory requirements. A RAT (e.g., Wi-Fi, LTE, NR, etc.) may employ an adaption mechanism to change an energy detection threshold. An NR-U may lower an energy detection threshold from an upper bound, for example, using an adaption mechanism. An adaptation mechanism may not preclude a static or a semi-static setting of a threshold. A Category 4 LBT (CAT4 LBT) mechanism and/or other types of LBT mechanisms may be implemented.

Various LBT mechanisms may be implemented. An LBT procedure may or may not be performed by a sending (e.g., transmitting) device, for example, for some signals, in some implementation scenarios, based on some situations, and/or over some frequencies. Category 1 (CAT1), without LBT, may be implemented, for example, in one or more cases. A second wireless device may take over a transmission, without performing a CAT1 LBT, on an unlicensed (shared) band that may be held by a first device (e.g., a base station for DL transmission). Category 2 (CAT2), LBT without random back-off and/or one-shot LBT, may be implemented. A duration of time determining that a channel is idle may be deterministic (e.g., by a regulation). A base station may send (e.g., transmit) an uplink grant indicating a type of LBT (e.g., CAT2 LBT) to a wireless device. CAT1 LBT and CAT2 LBT may be employed for Channel occupancy time (COT) sharing. A base station and/or a wireless device (e.g., one or more wireless devices described herein) may send (e.g., transmit) an uplink grant (resp. uplink control information) comprising a type of LBT. CAT1 LBT and/or CAT2 LBT in an uplink grant and/or uplink control information may indicate, to a receiving device (e.g., a base station, and/or a wireless device), a request to trigger COT sharing. Category 3, (CAT3) LBT with random back-off and a contention window of fixed size, may be implemented. A LBT procedure may comprise one of the following: a sending (e.g., transmitting) entity may draw a random number N within a contention window; a size of a contention window may be specified by a minimum and a maximum value of N; a size of a contention window may be fixed; and/or a random number N may be employed in a LBT procedure to determine a time duration that a channel may be sensed to be idle before a sending (e.g., transmitting) entity sends (e.g., transmits) on the channel. Category 4 (CAT4) LBT with random back-off with a contention window of variable size, may be implemented. A sending (e.g., transmitting) device may draw a random number N within a contention window. A size of contention window may be specified by a minimum and a maximum value of N. A sending (e.g., transmitting) entity may vary a size of a contention window when drawing a random number N. A random number N may be used in a LBT procedure to determine a time duration that a channel may be sensed to be idle before a sending (e.g., transmitting) entity sends (e.g., transmits) on the channel.

A wireless device may employ an uplink (UL) LBT and/or a downlink (DL) LBT. An UL LBT may be different from a DL LBT, for example, based on different LBT mechanisms and/or parameters. A NR-U UL may be based on scheduled access which may affect channel contention opportunities of a wireless device. Other considerations motivating a different UL LBT may comprise, but are not limited to, multiplexing of multiple wireless devices in a subframe (e.g., slot and/or mini-slot).

A DL transmission burst may be a continuous (e.g., a unicast, a multicast, a broadcast, and/or a combination thereof) transmission by a base station to one or more wireless devices on a carrier component (CC). An UL transmission burst may be a continuous transmission from one or more wireless devices to a base station on a CC. A DL transmission burst and/or an UL transmission burst on a CC on an unlicensed (shared) spectrum may be scheduled in a TDM manner on the same unlicensed and/or shared carrier. Switching between DL transmission bursts and UL transmission bursts may require an LBT (e.g., a CAT1 LBT, a CAT2 LBT, a CAT3 LBT, and/or a CAT4 LBT). An instant in time may be a part of a DL transmission burst and/or an UL transmission burst.

COT sharing may be employed in NR-U. COT sharing may be a mechanism for one or more wireless devices to share a channel that may be sensed as free (idle) by at least one of the one or more wireless devices. One or more first devices may occupy a channel via an LBT, for example, if the channel is sensed as idle based on CAT4 LBT. One or more second devices may share the channel using an LBT (e.g., a 25 µs LBT) within a maximum COT ((M)COT) limit. A (M)COT limit may be given, per priority class, logical channel priority and/or may be wireless device specific.

COT sharing may allow a concession for an UL in an unlicensed (shared) band. A base station may send (e.g., transmit) an uplink grant to a wireless device for an UL transmission. A base station may occupy a channel and/or send (e.g., transmit), to one or more wireless devices, a control signal to indicate that the one or more wireless devices may use the channel. A control signal may comprise an uplink grant and/or a particular LBT type (e.g., a CAT1 LBT and/or a CAT2 LBT). One or more wireless devices may determine COT sharing based on an uplink grant and/or a particular LBT type. A wireless device may perform an UL transmission with a dynamic grant and/or a configured grant (e.g., a Type 1, a Type2, and/or an autonomous UL) using a particular LBT (e.g., a CAT2 LBT such as 25 µs LBT), for example, if the wireless device is in a configured period and/or if COT sharing is triggered. COT sharing may be triggered by a wireless device. A wireless device performing an UL transmission based on a configured grant (e.g., a Type 1, a Type2, and/or an autonomous UL) may send (e.g., transmit) an uplink control information indicating the COT sharing (e.g., UL-DL switching within a (M)COT). A starting time of a DL transmission in COT sharing triggered by a wireless device may be indicated in one or more ways. One or more parameters in an uplink control information may indicate a starting time. A resource configuration of configured grants configured and/or activated by a base station may indicate a starting time. A base station may be allowed to perform a DL transmission after or in response to an UL transmission on a configured grant (e.g., a Type 1, a Type 2, and/or an autonomous UL). There may be a delay (e.g., at least 4 ms) between an uplink grant and/or an UL transmission, and/or the delay may be predefined. A delay may be semi-statically configured by a base station, for example, via an RRC message. A delay may be dynamically indicated by a base station, for example, via an uplink grant. A delay may not be accounted for in COT duration.

Single and/or multiple DL to UL and/or UL to DL switching within a shared COT may be supported. LBT requirements to support single and/or multiple switching points may comprise: for a gap less than or equal to 16 µs, no-LBT may be used; for a gap between 16 µs and 25 µs, one-shot LBT may be used; for a single switching point and a gap from DL transmission to UL transmission that exceeds 25 µs, a one-shot LBT may be used; for multiple switching points and a gap from DL transmission to UL transmission that exceeds 25 µs, one-shot LBT may be used.

Two main types of channel access procedures (e.g., LBT procedures) may be used and/or defined for NR-U systems (e.g., on an unlicensed (shared) spectrum). A type 1 channel access procedure (e.g., a CAT4 LBT) may be used for a starting uplink and/or a starting downlink data transmission at a beginning of a COT. A type 2 channel access procedures may be used for COT sharing and/or transmission of a discovery burst. A type 2 channel access procedure may comprise a type 2A, a type 2B, and/or a type 2C channel access procedure, for example, based on a duration of a gap in a COT. A type 2A channel access procedure (e.g., a CAT2 LBT) may be used, for example, if a COT gap is 25 µs or more and/or for a transmission of a discovery burst. A type 2B channel access procedure may be used, for example, if a COT gap is between 16 µs and 25 µs. A type 2C channel access procedure (e.g., a CAT1 LBT) may be used, for example, if a COT gap is 16 µs or less.

A LBT failure of a LBT procedure of one or more resources may indicate a channel access failure of the one or more resources. A LBT failure of a LBT procedure of one or more resources may indicate that the one or more resources may not be idle, for example, if the resources are occupied during one or more sensing slot durations before a transmission via the one or more resources and/or immediately before the transmission via the one or more resources. A LBT success of a LBT procedure for one or more resources may indicate a channel access success of the one or more resources. A LBT success of a LBT procedure for one or more resources may indicate that the one or more resources are free (idle) during one or more sensing slot durations before a transmission via the one or more resources and/or immediately before the transmission via the one or more resources.

Figure 34:
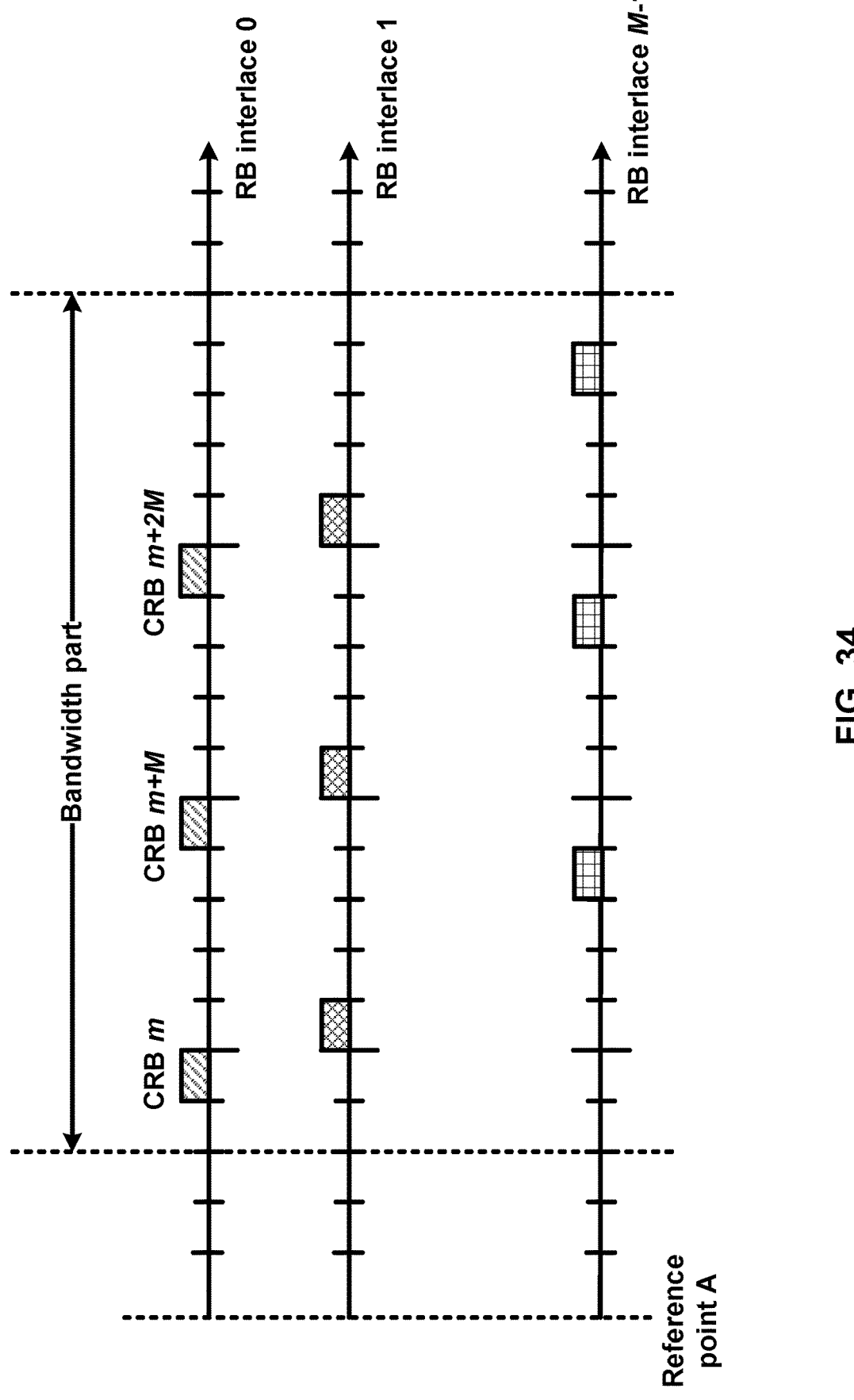
FIG. 34 shows an example of a plurality of resource block (RB) interlaces.

FIG. 34 shows an example of a plurality of resource block (RB) interlaces. The RB interlaces may comprise one or more RB interlaces (e.g., RB interlace 0, RB interlace M−1 in FIG. 34). A wireless device may send (e.g., transmit) a transmission based on mapping resources of the transmission to one or more of the plurality of the RB interlaces. An RB interlace of the plurality of RB interlaces may be defined where RB interlace m∈ {0,1, . . . , M−1} consists of resource blocks {m, M+m, 2M+m, 3M+m, . . . } (e.g., common resource blocks, CRB), with M being a quantity/number of the plurality of RB interlaces. The quantity/number of the plurality of RB interlaces may be determined/configured (e.g., by a base station via sending a message to the wireless device), for example, based on a subcarrier spacing (e.g., numerology) for the transmission using one or more of the plurality of RB interlaces. The quantity/number of the plurality of RB interlaces M may be 10, for example, based on the subcarrier spacing (e.g., or numerology) of the transmission being 15 kHz. The quantity/number of the plurality of RB interlaces M may be 5, for example, based on the subcarrier spacing (e.g., or numerology) of the transmission being 30 kHz. A relation between an interlaced resource block $$n_{IRB,m}^{\mu} \in \{0, 1, \ldots \}$$

in a bandwidth part i and an RB interlace m and a resource block $$n_{CRB}^{\mu}(\text{e.g., a } CRB \ n_{CRB}^{\mu})$$

is given by $$n_{CRB}^{\mu} = Mn_{IRB,m}^{\mu} + N_{BWP,i}^{start,\mu} + \left((m - N_{BWP,i}^{start,\mu}\right) \bmod M),$$

where $$N_{BWP,i}^{start,\mu}$$

is a resource block (e.g., CRB) where bandwidth part starts relative to resource block 0 (e.g., CRB with an index 0, which is a reference point A in FIG. 34). An index μ indicates the subcarrier spacing (e.g., numerology) of the transmission. The value of μ=0, for example, if the subcarrier spacing is 15 kHz. The value of μ=1, for example, if the subcarrier spacing is 30 kHz. The wireless device may expect that a number/quantity of resource blocks (e.g., CRB s) in an interlace contained within the bandwidth part i is no less than 10.

An RB interlace (e.g., each RB interlace) of the plurality of RB interlaces may have an RB interlace index (ID) (e.g., RB interlace 0, RB interlace 1, . . . , RB interlace M−1 in FIG. 34). As described herein, an RB interlace may be interchangeable with and/or may refer to an interlace.

In at least some wireless communications, frequency domain granularity of resource allocation for an uplink transmission is on a resource block (RB) level. The uplink transmission may occupy one or more RBs (e.g., PRBs) in a frequency domain. A transmitting wireless device may send (e.g., transmit) the uplink transmission to a base station based on mapping the one or more RBs (e.g., PRBs) of the uplink transmission to a set of RB interlaces (e.g., such as described with respect to FIG. 34), for example, if performing the uplink transmission on a licensed spectrum/band/ cell/carrier. Because the granularity of the set of RB interlaces is an RB, the one or more RBs of the uplink transmission may map to the set of RB interlaces following a one-on-one mapping rule.

Performing sidelink transmissions on an unlicensed/ shared spectrum/band/cell/carrier may cause a resource mismatching between radio resources of the sidelink transmissions and a set of RB interlaces. Frequency domain granularity of resource allocation for a sidelink transmission may be a subchannel. The subchannel may comprise one or more RBs. Mapping one or more subchannels of a sidelink transmission to a set of RB interlaces may lead to a resource mismatching between the one or more subchannels and the set of RB interlaces. For example, a set of interlaced RBs of an RB interlace may comprise 10 RBs. A sidelink transmission may comprise 2 subchannels, where each subchannel may comprise 12 RBs. The 2 subchannels may map to 3 RB interlaces, where a first and a second set of RBs of the RB interlaces may be fully mapped and a third set of RBs of the RB interlaces may be partially mapped (e.g., 4 RBs of the third set of RBs are mapped to the 2 subchannels), for example, when mapping the 2 subchannels to the set of RB interlaces. In this case, the remaining RB s of the third set of RBs (e.g., 6 remaining RBs) may be wasted for the sidelink transmission. Performing sidelink transmissions on an unlicensed/shared spectrum/band/cell/carrier may increase complexity for a sidelink receiver to blind decode SCI based on the set of RB interlaces. A start location of the SCI may vary based on the set of RB interlaces and/or sidelink RP configuration. Blind decoding complexity of the SCI by the sidelink receiver may be increased. Performing sidelink transmissions on an unlicensed/shared spectrum/ band/cell/carrier may increase resource allocation complexity considering that a sidelink RP may comprise a plurality of RB sets (e.g., LBT subbands) for performing a LBT based channel access procedure. Guard bands of the plurality of RB sets may need to be considered if employing the sets of RB interlaces.

A quantity of RB interlaces may be based on a quantity of subchannels of a sidelink resource pool. For example, the RB interlace may be indicated by a base station in a message to a wireless device. A sidelink transmission (e.g., via a sidelink RP) may use an RB interlace that is based on the quantity of subchannels indicated in the message. As described herein, a wireless device may determine, for a sidelink transmission in a sidelink resource pool (RP) on an unlicensed/shared spectrum/band/cell/carrier, a quantity of RB interlaces based on a quantity of subchannels of the sidelink RP. The quantity of RB interlaces of the sidelink RP may not be related to a subcarrier spacing (e.g., numerology) of the sidelink RP. The quantity of RB interlaces of the sidelink RP may not be related to a number of RB sets for performing LBT based channel access (e.g., LBT subbands) in the sidelink RP. A first wireless device may receive a message comprising one or more field values. The one or more field values may comprise/indicate a first quantity of subchannels of a sidelink RP and/or a quantity of RB interlaces of the sidelink RP. The quantity of RB interlaces may be associated with (e.g., be multiple of/fractional to/equal to) the first quantity of subchannels. The first wireless device may determine/select, from the sidelink RP and for a sidelink transmission, one or more resources (e.g., RBs) based on the quantity of RB interlaces in the sidelink RP and/or a second quantity of subchannels of the sidelink transmission in the sidelink RP. The first wireless device may send (e.g., transmit), to a second wireless device, the sidelink transmission based on the selected one or more resources (e.g., RBs).

Examples described herein may enable flexible configuration of RB interlaces in a sidelink resource pool for sidelink communications, for example, if the sidelink resource pool is in an unlicensed/shared spectrum. Examples described herein may comprise reducing power consumption, processing latency, transmission delay, computational complexity and/or hardware complexity for the sidelink communications on the unlicensed/shared spectrum/carrier/cell/band (e.g., sidelink-U). Examples described herein may increase resource usage for sidelink communications on an unlicensed/shared spectrum. Examples described herein may enable stable subchannel to RB interlaces mapping for reducing SCI blind decoding complexity. As described herein, examples may comprise expending a subchannel through whole frequency domain resources in a sidelink RP and/or reducing resource mapping complexity regardless of a number of RB sets (e.g., LBT subbands) in the sidelink RP.

Figures 35A, 35B:
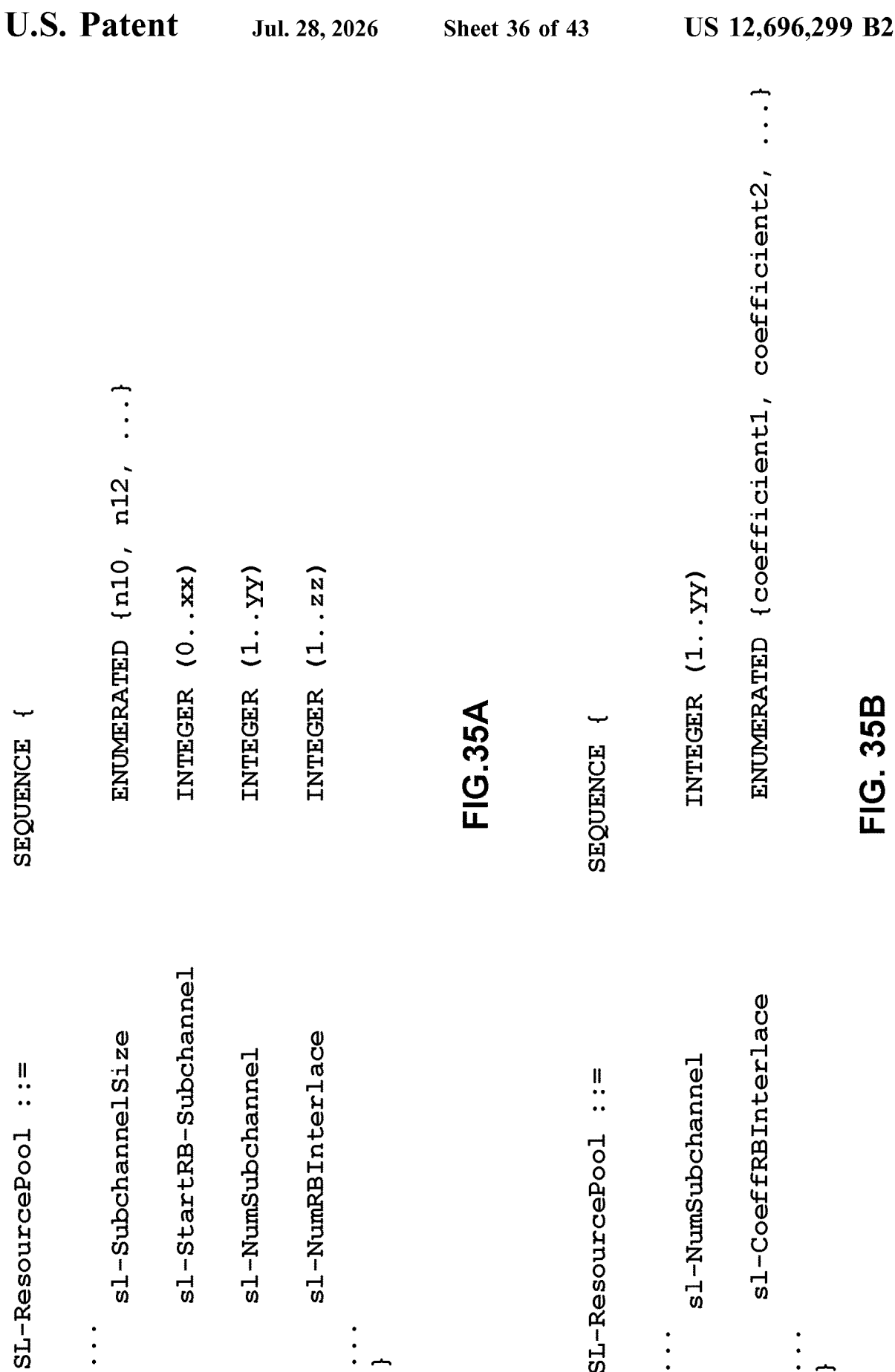
FIG. 35A and FIG. 35B show examples of a resource pool configuration.

FIG. 35A and FIG. 35B show examples of a resource pool configuration. A base station and/or a wireless device may send (e.g., transmit) a message to a first wireless device (e.g., a transmitting wireless device). The message may comprise a field indicating/configuring a resource pool in a sidelink BWP. The sidelink BWP may be in an unlicensed/shared spectrum/band/carrier/cell. The field indicating/configuring the resource pool in the sidelink BWP may be pre-configured to the first wireless device. A memory of the first wireless device may store the field indicating/configuring the resource pool in the sidelink BWP.

The field configuring the resource pool may comprise a first parameter (e.g., sl-SubchannelSize in FIG. 35A) indicating a number of resource blocks (RBs) in a subchannel in the resource pool. The first parameter may indicate a minimum granularity in frequency domain for sensing for PSCCH/PSSCH resource selection in unit of RB. A value n10 may indicate that a subchannel in the resource pool comprises 10 RBs. A value of n12 may indicate that a subchannel in the resource pool comprises 12 RBs, etc.

The field configuring the resource pool may comprise a second parameter (e.g., sl-StartRB-Subchannel in FIG. 35A) indicating an ID/index of a start/lowest RB of a first subchannel in the resource pool (e.g., the RB ID/index is from 0 to xx in FIG. 35A, where xx is a positive integer number). The second parameter may indicate the lowest RB index of the first subchannel (e.g., the first subchannel with the lowest subchannel index in the resource pool) with respect to the lowest RB index of the sidelink BWP.

The field configuring the resource pool may comprise a third parameter (e.g., sl-NumSubchannel in FIG. 35A) indicating a number/quantity of subchannels in the resource pool, which consists of contiguous RBs (e.g., contiguous RBs only). The number/quantity of subchannels in the resource pool is from 0 to yy in FIG. 35A, where yy is a positive integer number.

The field configuring the resource pool may comprise a fourth parameter (e.g., sl-NumRBInterlace in FIG. 35A) indicating a number/quantity of RB interlaces in the resource pool. The number/quantity of RB interlaces in the resource pool is from 0 to zz in FIG. 35A, where zz is a positive integer number.

The field configuring the resource pool may comprise a fifth parameter (e.g., sl-CoeffRBInterlace in FIG. 35B) indicating a number/quantity of RB interlaces in the resource pool. The number/quantity of RB interlaces in the resource pool may be indicated based on one or more coefficient values (e.g., coefficient1, coefficient2, etc. in FIG. 35B). The one or more coefficient values may be applied to the number/quantity of subchannels for indicating the number/quantity of RB interlaces in the resource pool. For example, the number/quantity of RB interlaces in the resource pool may equal to (sl-CoeffRBInterlace×sl-NumSubchannel). The one or more coefficient values indicated by sl-CoeffRBInterlace may indicate the number/quantity of RB interlaces in the resource pool being multiple/fractional/equal to the number/quantity of subchannels indicated by sl-NumSubchannel.

Figure 36:
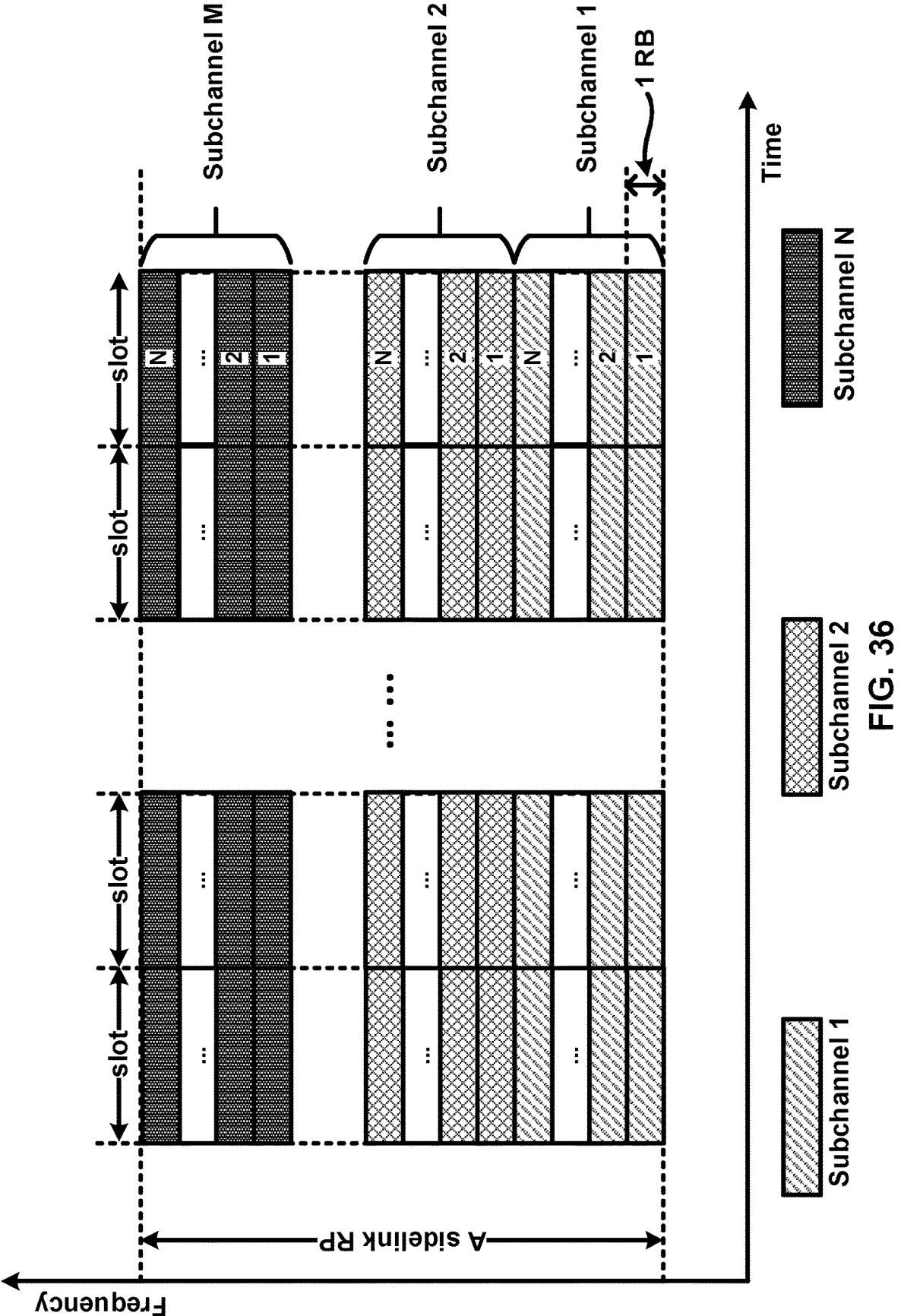
FIG. 36 shows an example of a resource pool comprising a plurality of subchannels.

FIG. 36 shows an example of a resource pool comprising a plurality of subchannels. A sidelink BWP may comprise one or more resource pools. A resource pool of the one or more resource pools may comprise one or more RB sets (e.g., one or more LBT subbands) for performing LBT based channel access. The resource pool may comprise M subchannels in a frequency domain. The M subchannels may comprise consecutive/contiguous RBs in the frequency domain. The resource pool may comprise a plurality of slots in a time domain. The plurality of slots may or may not be consecutive/contiguous in the time domain. The resource pool in FIG. 37 may be configured based on the field in FIG. 35.

A first parameter (e.g., sl-SubchannelSize in FIG. 35) configuring the resource pool may indicate a number/quantity of N RBs (e.g., contiguous RBs) in a subchannel in the resource pool. A second parameter (e.g., sl-StartRB-Subchannel in FIG. 35) may indicate an ID/index of a start/lowest RB of a first subchannel (e.g., subchannel 1 in FIG. 36) in the resource pool. A third parameter (e.g., sl-NumSubchannel in FIG. 35) configuring the resource pool may have a value M indicating that there are M subchannels in the resource pool.

Figure 37:
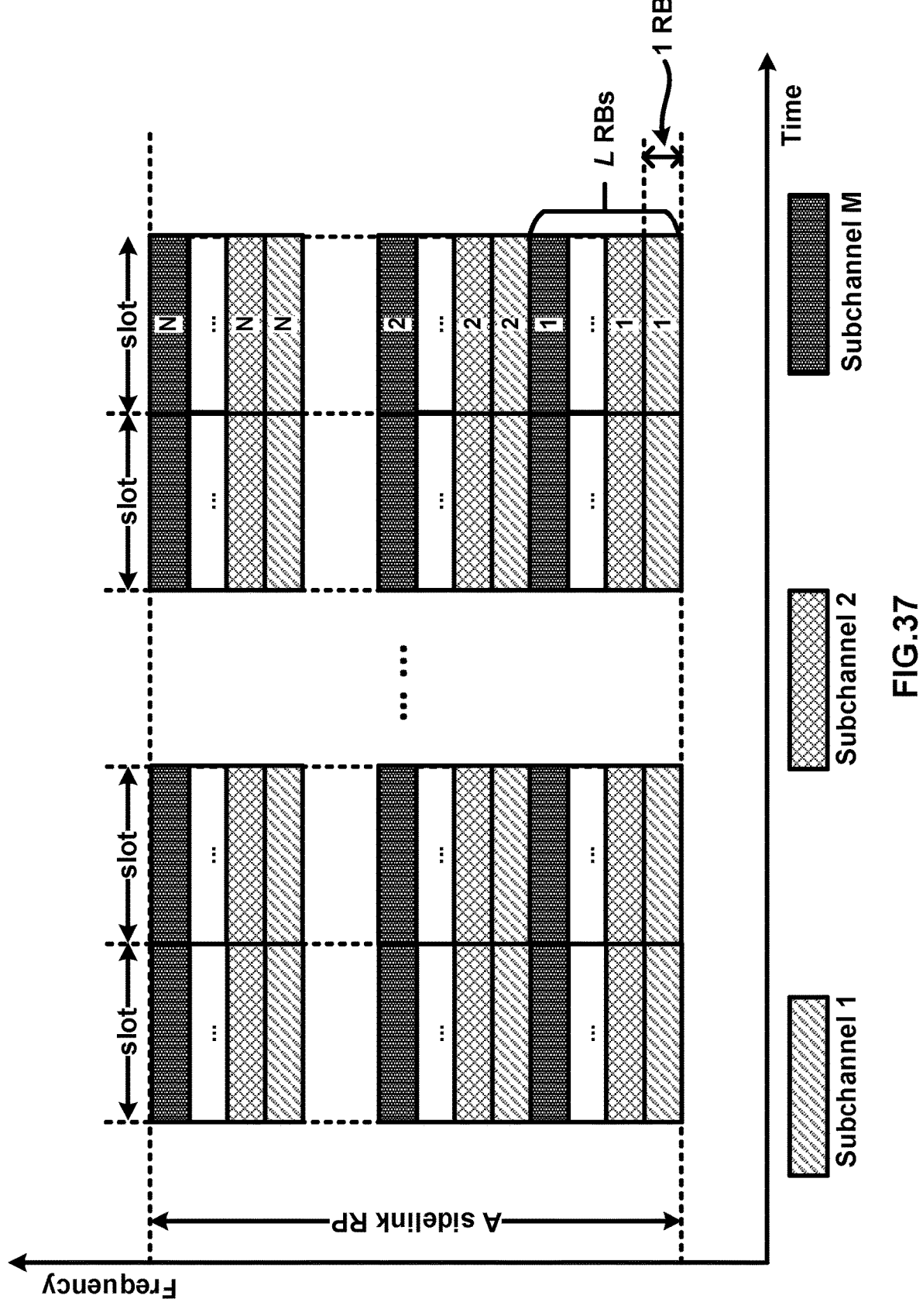
FIG. 37 shows an example of a resource pool comprising a plurality of subchannels employing a set of RBs interlaces on a shared spectrum.

FIG. 37 shows an example of a resource pool comprising a plurality of subchannels employing a set of RB interlaces on a shared spectrum. For example, the RB interlaces may be on an unlicensed/shared spectrum/band/carrier/cell. A sidelink BWP may comprise one or more resource pools. A resource pool of the one or more resource pools may comprise one or more RB sets for performing LBT based channel access (e.g., one or more LBT subband). The resource pool may comprise M subchannels in a frequency domain. The resource pool (e.g., the M subchannels) may comprise consecutive/contiguous RBs in frequency domain. The resource pool may comprise a plurality of slots in a time domain. The Plurality of slots may or may not be consecutive/contiguous in the time domain. The resource pool in FIG. 37 may be configured based on the field in FIG. 35.

A first parameter (e.g., sl-SubchannelSize in FIG. 35) configuring the resource pool may indicate a number/quantity of N RBs (e.g., contiguous RBs) in a subchannel in the resource pool. A second parameter (e.g., sl-StartRB-Sub-channel in FIG. 35) may indicate an ID/index of a start/lowest RB of a first subchannel (e.g., subchannel 1 in FIG. 37) in the resource pool. A third parameter (e.g., sl-Num-Subchannel in FIG. 35) configuring the resource pool may have a value M indicating that there are M subchannels in the resource pool. A fourth parameter (e.g., sl-NumRBIn-terlace in FIG. 35A) configuring the resource pool may have a value L indicating that there is a set of L RB interlaces in the resource pool. A fifth parameter (e.g., sl-CoeffRBInter-lace in FIG. 35B) may indicate a number/quantity of RB interlaces in the resource pool. The number/quantity of RB interlaces in the resource pool may be indicated based on one or more coefficient values (e.g., coefficient1, coeffi-cient2, etc. in FIG. 35B). The one or more coefficient values may be used for the number/quantity of subchannels for indicating the number/quantity of RB interlaces in the resource pool. The number/quantity of RB interlaces in the resource pool may equal to (sl-CoeffRBInterlace×sl-Num-Subchannel), where a coefficient value indicated by sl-CoeffRBInterlace may be 1 indicating that the number/quantity of RB interlaces in the resource pool being equal to the number/quantity of subchannels indicated by sl-NumRBInterlace. The M subchannels may be mapped to the L RB interlaces based on M=L. A subchannel (e.g., each subchannel) of the M subchannels may be mapped to an RB interlace of the set of L RB interlaces, when M=L.

Figure 38:
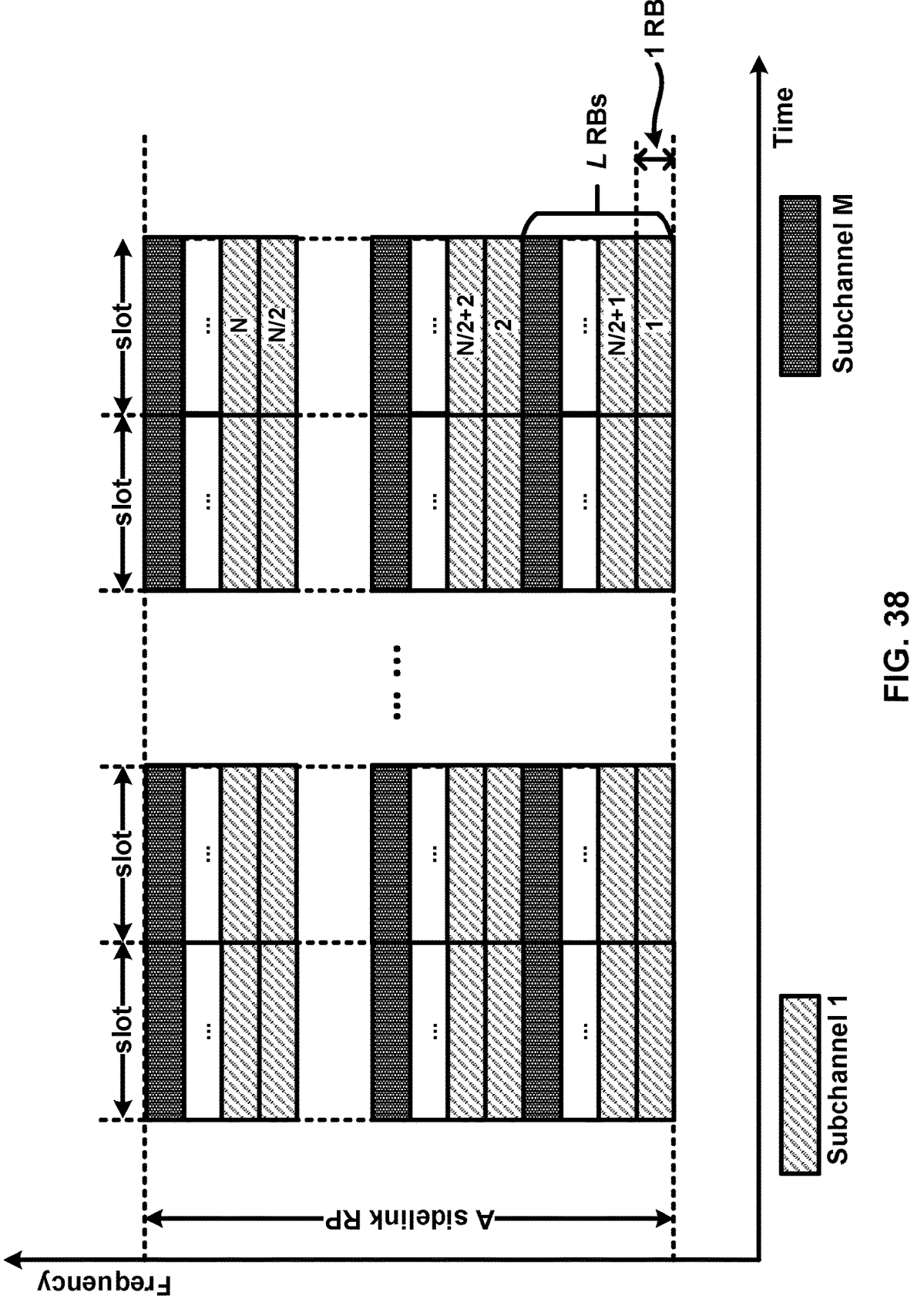
FIG. 38 shows an example of a resource pool comprising a plurality of subchannels employing a set of RBs interlaces on a shared spectrum.

FIG. 38 illustrates an example of a resource pool com-prising a plurality of subchannels employing a set of RB interlaces on a shared spectrum. For example, the RB interlaces may be on an unlicensed/shared spectrum/band/carrier/cell. The M subchannels may be mapped to the L RB interlaces based on L=2M (e.g., a coefficient indicated by sl-CoeffRBInterlace is 2). A subchannel (e.g., each subchan-nel) of the M subchannels may be mapped to 2 RB interlaces of the set of L RB interlaces, when L=2M.

Figure 39A:
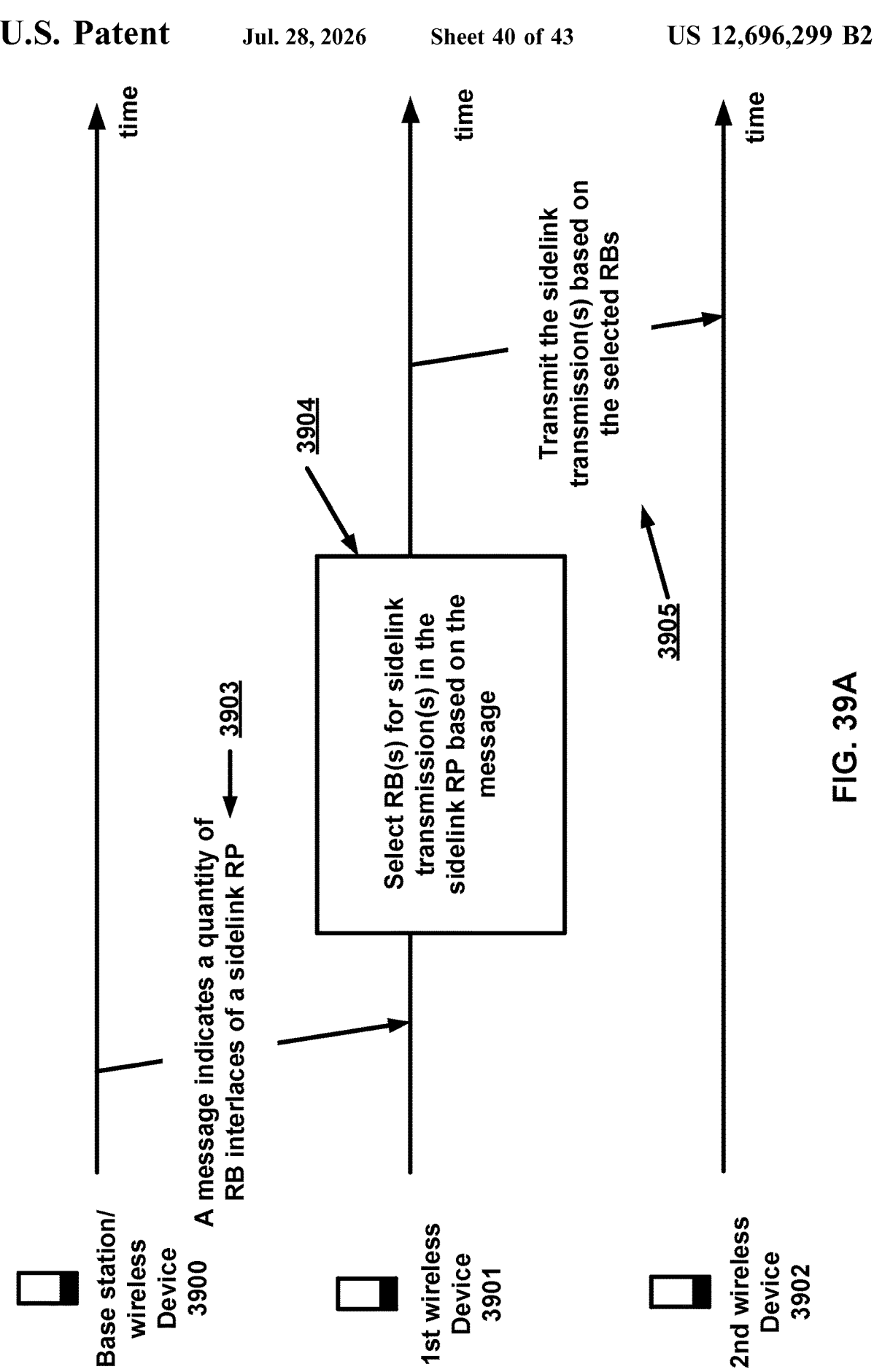
FIG. 39A shows an example of sidelink communications based on RB interlaces on a shared spectrum.

FIG. 39A shows an example of sidelink communications based on RB interlaces on a shared spectrum. For example, the RB interlaces may be on an unlicensed/shared spectrum/band/carrier/cell. A sidelink transmission may be imple-mented based on FIG. 17. A first wireless device 3901 may be a transmitting wireless device of one or more sidelink transmissions. A second wireless device 3902 may be a receiving wireless device of the one or more sidelink trans-missions. SCI (e.g., a second-stage SCI) of the one or more sidelink transmissions may comprise/indicate an ID (e.g., destination ID) of the second wireless device 3902 indicat-ing that the second wireless device 3902 is a desired/intended/destination receiver of the one or more sidelink transmissions. The one or more sidelink transmissions may be/comprise PSCCH and/or PSSCH transmissions. The one or more sidelink transmission may be/comprise PSFCH transmissions. The one or more sidelink transmissions may be/comprise one or more unicast transmissions, one or more groupcast transmissions, and/or one or more broadcast trans-missions.

A base station and/or a wireless device 3900 may send (e.g., transmit) a message 3903 to the first wireless device. The message 3903 may be/comprise an RRC/SIB, a MAC CE, DCI, and/or SCI. The message 3903 may comprise a field indicating/configuring a resource pool in a sidelink BWP. The field of the message 3903 (e.g., such as described with respect to FIGS. 35A-35B) configuring the resource pool may comprise one or more parameters indicating a quantity of subchannels of the resource pool (e.g., sl-NumSubchannel) and/or a quantity of RBs of a subchannel of the resource pool (e.g., sl-SubchannelSize). The field configuring the resource pool may comprise one or more parameters indicating a quantity of RB interlaces of the resource pool. The quantity of RB interlaces of the resource pool may be associated with the quantity of the subchannels of the resource pool. For example, the quantity of RB interlaces of the resource pool may equal to the quantity of the subchannels of the resource pool. For example, the quantity of RB interlaces of the resource pool may be a multiple of the quantity of the subchannels of the resource pool. For example, the quantity of RB interlaces of the resource pool may be fractional to the quantity of the subchannels of the resource pool. For example, a first number A being fractional to a second number B may indicate that the A=B/M, where M is a positive integer number. The resource pool may have a subcarrier spacing (e.g., a single numerology) for subcarriers in the resource pool. The field of the message configuring the resource pool may indicate that the quantity of RB interlaces of the resource pool with the subcarrier spacing. The message may further indicate/configure the sidelink BWP.

The sidelink BWP may be on an unlicensed/shared spec-trum/carrier/band/cell with a plurality of RATs (e.g., wifi, etc.). The resource pool in the sidelink BWP may comprise/cross one or more RB sets for performing LBT based channel access (e.g., one or more LBT subbands). An RB set (e.g., a LBT subband) of the one or more RB sets may comprise one or more guard bands at the boundary/edge of the RB set. An RB set of the one or more RB sets may comprise consecutive/contiguous RB s in frequency domain.

The resource pool in the sidelink BWP may comprise one or more PSFCH resources. The one or more PSFCH resources may be used for transmitting/receiving HARQ ACK/NACK message/information. The one or more PSFCH resources may be used for transmitting/receiving resource collision indications in case of inter-wireless-device coor-dination scheme 2 (e.g., inter-UE coordination scheme 2). In an example, the message 3903 indicating/configuring the resource pool and/or the sidelink BWP may configure/indicate the one or more RB sets (e.g., LBT subbands), the one or more guard bands of the each of the one or more RB sets (e.g., LBT subbands), and/or the one or more PSFCH resources. The base station and/or the wireless device 3900 may not send (e.g., transmit) the message to the first wireless device configuring the resource pools and/or the sidelink BWP. Parameters of the resource pools and/or the sidelink BWP (e.g., configuration parameters in the message) may be pre-configured to the first wireless device. A memory of the first wireless device 3901 may store the pre-configured parameters of the resource pools and/or the sidelink BWP.

At 3904, the first wireless device 3901 may select, from the resource pool in the sidelink BWP and based on the message 3903, one or more resources for the one or more sidelink transmissions to the second wireless device 3902. The one or more resources may be time/frequency radio resources. The first wireless device 3901 may select, based on the quantity of subchannels of the resource pool and/or the quantity of RB interlaces of the resource pool in the message, one or more RB s (e.g., one or more RB interlaces of the quantity of RB interlaces of the resource pool) for the one or more resources (e.g., such as described with respect to FIG. 37 and/or FIG. 38). The one or more sidelink transmissions may comprise one or more subchannels. The first wireless 3901 device may map the one or more sub-channels of the one or more sidelink transmissions to the one or more RB interlaces of the quantity of RB interlaces configured to the resource pool. The one or more RB interlaces may have contiguous interlace indices (IDs) (e.g., such as described with respect to FIG. 34). The one or more RB interlaces may not have contiguous interlace IDs (e.g., such as described with respect to FIG. 34).

The first wireless 3901 device may trigger a resource selection procedure for the selecting of the one or more resources from the resource pool in the sidelink BWP, for example, if the one or more sidelink transmissions are/comprise PSCCH/PSSCH transmissions. The resource selection procedure may be based on a full sensing (e.g., such as described with respect to FIG. 24, FIG. 25, FIG. 26 and/or FIG. 27). The resource selection procedure may be based on a partial sensing (e.g., such as described with respect to FIG. 28 and/or FIG. 29). The resource selection procedure may be based on random selection without sensing procedure. The first wireless device 3901 may trigger the resource selection procedure for initially selecting the one or more resources for the one or more sidelink transmissions. The first wireless device 3901 may trigger the resource selection procedure for re-evaluating one or more previously selected resources for the one or more sidelink transmissions (e.g., re-evaluation and/or pre-emption check of the one or more previously selected resources referring to re-evaluation/pre-emption for sidelink communications).

At 3905, the first wireless device 3901 may send (e.g., transmit), to the second wireless device 3902 and/or, for example, based on the one or more resources (e.g., the one or more RBs), the one or more sidelink transmissions. The first wireless device 3901 may send (e.g., transmit) the one or more sidelink transmissions via the one or more resources. Higher layers (e.g., MAC layer and/or RRC layer) of the first wireless device 3901 may provide/indicate the one or more resources to a physical layer (e.g., layer 1) of the first wireless device 3901. The first wireless device 3901 (e.g., layer 1) may perform a LBT procedure for a first resource of the one or more resources before the sending of a first sidelink transmission of the one or more sidelink transmissions via the first resource. The LBT procedure, for example, in LTE systems, may be/comprise a CAT1 LBT, CAT2 LBT, CAT3 LBT, and/or CAT4 LBT procedure. The LBT procedure, for example, in NR systems, may be/comprise shared spectrum channel access procedure type 1 (e.g., type 1 channel access procedure), and/or shared spectrum channel access procedure type 2 (e.g., type 2A, type 2B, and/or type 2C channel access procedure). The first wireless device 3901 may send (e.g., transmit) the first sidelink transmission of the one or more sidelink transmissions via the first resource of the one or more resources based on a LBT success of the LBT procedure for the first resource. The first wireless device 3901 may not send (e.g., transmit) a second sidelink transmission of the one or more sidelink transmissions via a second resource of the one or more resources based on a LBT failure of the LBT procedure for the second resource. SCI of the one or more sidelink transmissions may comprise/indicate IDs of the one or more RB interlaces for the one or more sidelink transmissions. The SCI of the one or more sidelink transmissions may comprise/indicate the one or more RB sets IDs/indexes of the one or more RB sets in the resource pool, for example, if one or more RB sets IDs of the one or more RB sets (e.g., the one or more LBT subbands) in the resource pool are configured/pre-configured to the first wireless device 3901 and/or the second wireless device 3902. The SCI may comprise a field indicating/scheduling the one or more resources in the one or more RB sets in the resource pool. The SCI may be/comprise a first stage SCI on a PSCCH and/or a second stage SCI on a PSSCH.

The second wireless device 3902 may receive the first sidelink transmission of the one or more sidelink transmissions via the first resource of the one or more resources. The second wireless device 3902 may determine the second resource of the one or more resources indicated in SCI of the first resource (e.g., SCI in the first sidelink transmission) based on the one or more RB sets IDs/indexes. The second wireless device 3902 may expect to receive the second sidelink transmission of the one or more sidelink transmissions via the second resource of the one or more resources. The second wireless device 3902 may not receive the second sidelink transmission of the one or more sidelink transmissions via the second resource based on that the first wireless device 3901 does not send (e.g., transmit) the second sidelink transmission via the second resource due to the LBT failure of the second resource.

The first wireless device 3901 may select/determine the one or more resources for the PSFCH transmissions, for example, based on resource pool configuration in the sidelink BWP, for example, if the one or more sidelink transmissions are/comprise PSFCH transmissions. The resource pool configuration (e.g., configured in the message or pre-configured to the first wireless device) may comprise/indicate the one or more PSFCH resources in the resource pool. The first wireless device 3901 may send (e.g., transmit) HARQ information and/or inter-wireless device coordination information (e.g., inter-UE coordination scheme 2) via the second PSFCH resource.

Figure 39B:
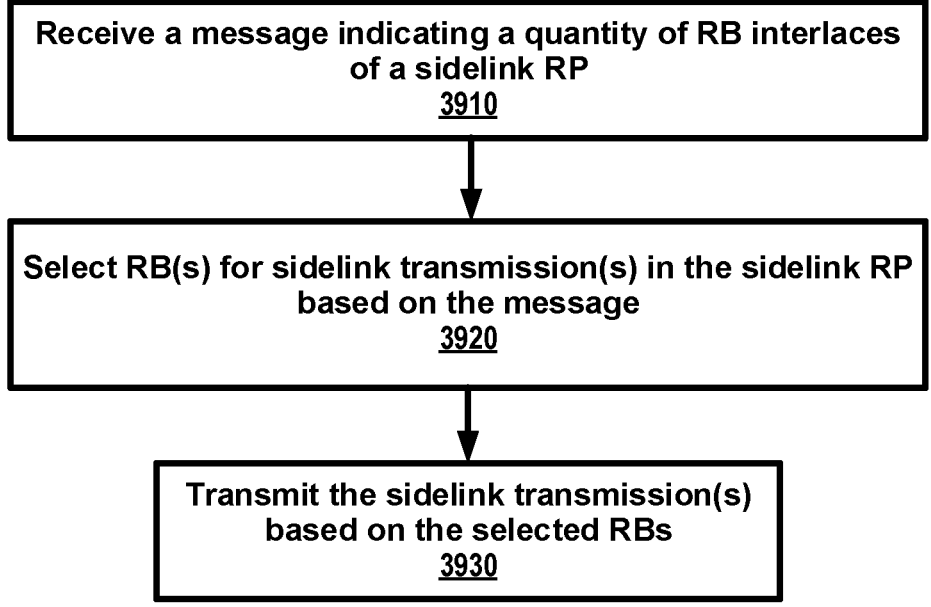
FIG. 39B shows an example of sidelink communications based on RB interlaces on a shared spectrum.

FIG. 39B shows an example of sidelink communications based on RB interlaces on a shared spectrum. For example, the RB interlaces may be on an unlicensed/shared spectrum/band/carrier/cell. At 3910, a message may be received, for example by a first wireless device and/or from a base station/wireless device, indicating a quantity of RB interlaces of a sidelink RP. At 3920, RB(s) may be selected, for example, by the first wireless device, for sidelink transmission(s) in the sidelink RP based on the message. At 3930, the sidelink transmissions may be transmitted, for example, by the first wireless device and/or to a second wireless device, based on the selected RBs.

Figure 40A:
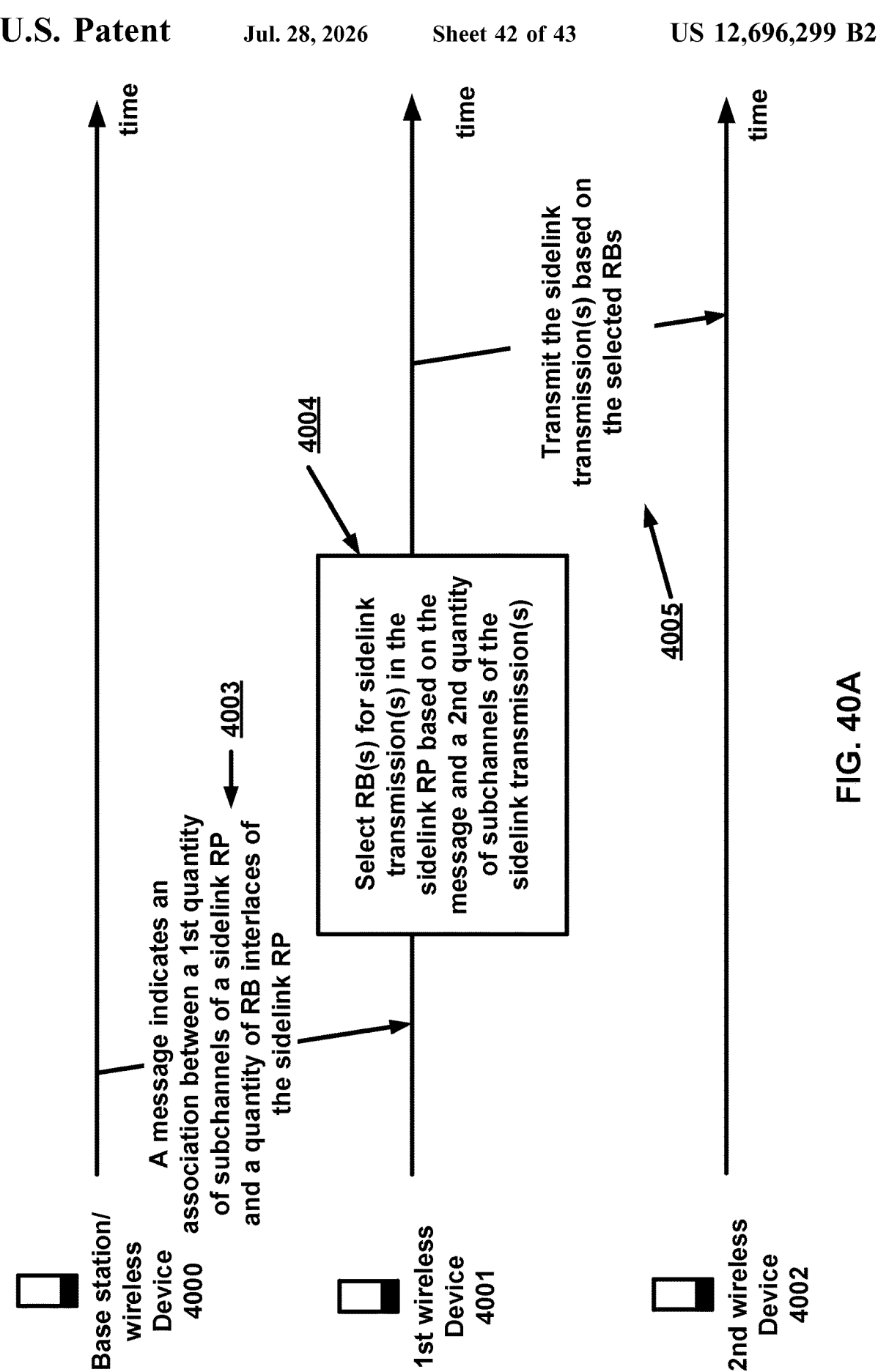
FIG. 40A shows an example of sidelink communications based on RB interlaces on a shared spectrum

FIG. 40A shows an example of sidelink communications based on RB interlaces on a shared spectrum. For example, the RB interlaces may be on an unlicensed/shared spectrum/band/carrier/cell. A sidelink transmission may be implemented based on FIG. 17A first wireless device 4001 may receive a RRC message 4003 comprising one or more field values. The one or more field values may indicate a first quantity of subchannels of a sidelink RP. The one or more field values may indicate a quantity of RB interlaces of the sidelink RP. The quantity of RB interlaces may be associated with (e.g., multiple/fractional/equal to) the first quantity of subchannels. At 4004, the first wireless device 4001 may select, from the sidelink RP and for a sidelink transmission, one or more RBs based on the quantity of RB interlaces in the sidelink RP, and/or a second quantity of subchannels of the sidelink transmission in the sidelink RP. At 4005, the first wireless device 4001 may send (e.g., transmit), to a second wireless device 4002, the sidelink transmission based on the selected one or more RBs.

The first wireless device 4001 may receive the message 4003 indicating a quantity of RB interlaces in a sidelink RP. The first wireless device 4001 may select, from the sidelink RP and for a sidelink transmission, one or more RBs based on the quantity of RB interlaces in the sidelink RP. The first wireless device 4001 may send (e.g., transmit), to the second wireless device 4002, the sidelink transmission based on the selected one or more RBs in the sidelink RP.

The message 4003 may be/comprises a RRC message, a MAC CE, DCI, and/or SCI. The message 4003 may comprise a field indicating a first quantity of subchannels of the sidelink RP. The quantity of RB interlaces may be associated with (e.g., multiple/fractional/equal to) the first quantity of subchannels. The first wireless device 4001 may select the one or more RBs based on a second quantity of subchannels of the sidelink transmission in the sidelink RP.

An RB interlace of the quantities of RB interlaces may indicate a set of RBs equally spaced in a frequency domain, wherein two adjacent RBs, of the set of RBs in the frequency domain, are apart from each other by (the quantity of RB interlaces–1) common RBs. The sidelink RP may be in a sidelink BWP. The sidelink BWP may be on a shared spectrum with a plurality of RATs. The one or more sidelink transmissions may comprise a PSCCH, a PSSCH, and/or a PSFCH. The one or more sidelink transmissions may comprise a unicast transmission, a groupcast transmission, and/or a broadcast transmission.

The second wireless device 4002 may be a destination receiver of the one or more sidelink transmissions. The first wireless device 4001 may be a coordinating wireless device performing an inter-wireless-device coordination with the second wireless device 4002.

The sidelink RP may comprise one or more sidelink RB sets (e.g., one or more LBT subbands). A sidelink RB set of the one or more sidelink RB sets may indicate a frequency band for a sidelink transmission based on performing a LBT based channel access procedure. A bandwidth of the sidelink RB set may be less than or equal to 20 MHz.

The first wireless device 4001 may receive, from a base station/wireless device 4000, a message 4003. In an example, the first wireless device 4001 may receive, from the wireless device 4000 (e.g., a third wireless device), the message 4003. The first wireless device 4001 may perform a LBT based channel access procedure, on each of one or more sidelink RB sets comprising the selected one or more RBs, before the sending of the sidelink transmission using the selected one or more RBs. The first wireless device 4001 may send (e.g., transmit) the sidelink transmission using the selected one or more RBs based on LBT success of the LBT based channel access procedure on the each of the one or more sidelink RB sets. The LBT based channel access procedure may be a type 1 channel access procedure. The LBT based channel access procedure may be a type 2 channel access procedure.

In an example, each RB interlace of the RB interlaces may have a respective RB interlace index. The sidelink transmission may occur via one or more subchannels in a frequency domain. A subchannel of the one or more subchannels may be mapped to one or more first RB interlaces of the RB interlaces. One or more (e.g., each of the one or more) first RB interlaces may have a respective RB interlace index. The one or more subchannels of the sidelink transmission may be further mapped to one or more second RB interlaces of the RB interlaces. The one or more second RB interlaces may comprise contiguous interlace indices starting from the one or more first RB interlace indices. The one or more second RB interlaces may comprise non-contiguous interlace indices starting from the one or more first RB interlace indices.

The sidelink transmission may comprise SCI indicating one or more interlace indices of the one or more second RB interlaces. The SCI may be/comprise a first stage of the SCI on a PSCCH and/or a second stage of the SCI on a PSSCH. The first stage of the SCI may comprise a field indicating the one or more interlace indices of the one or more second RB interlaces. The second stage of the SCI may comprise a field indicating the one or more interlace indices of the one or more second RB interlaces. Subcarriers of the sidelink resource pool (RP) may have identical subcarrier spacing (e.g., numerology).

Figure 40B:
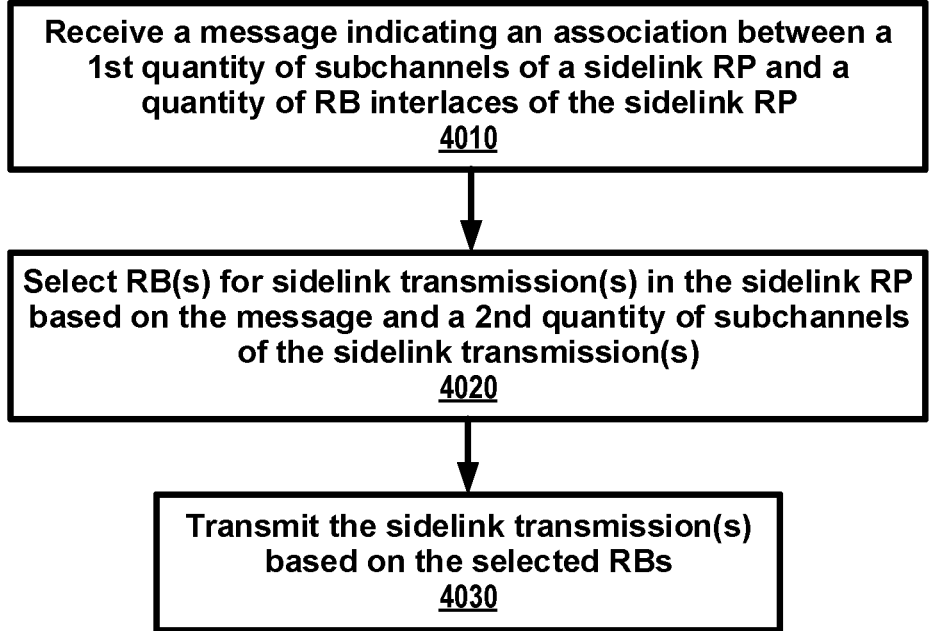
FIG. 40B shows an example of sidelink communications based on RB interlaces on a shared spectrum.

FIG. 40B shows an example of sidelink communications based on RB interlaces on a shared spectrum. For example, the RB interlaces may be on an unlicensed/shared spectrum/band/carrier/cell. At 4010, a message may be received, for example, by a first wireless device and/or from a base station/wireless device, indicating an association between a first quantity of subchannels of a sidelink RP and a quantity of RB interlaces of the sidelink RP. At 4020, RB(s) may be selected, for example, by the first wireless device, for sidelink transmission(s) in the sidelink RP based on the message and a second quantity of subchannels of the sidelink transmission(s). At 4030, the sidelink transmissions may be transmitted, for example, by the first wireless device and/or to a second wireless device, based on the selected RBs.

A wireless device may perform a method comprising multiple operations. A first wireless device may receive, from a base station, at least one message indicating a quantity of resource block (RB) interlaces in a sidelink resource pool (RP). The first wireless device may select, based on the quantity of RB interlaces in the sidelink RP, one or more RBs from the sidelink RP for at least one sidelink transmission. The first wireless device may transmit, to at least one second wireless device, the at least one sidelink transmission based on the selected one or more RBs in the sidelink RP. The at least one message may indicate a first quantity of subchannels of the sidelink RP. The selecting may be based on a second quantity of subchannels, wherein the second quantity is a subquantity of the first quantity of subchannels. The at least one message may comprise at least one of a radio resource control (RRC) message, a medium access control control element (MAC CE), downlink control information (DCI), or sidelink control information (SCI). The first wireless device may receive at least one message indicating an association between the first quantity of subchannels of the sidelink RP and the quantity of RB interlaces of the sidelink RP. The sidelink RP may be in a sidelink bandwidth part (BWP) on a shared spectrum configured for a plurality of radio access technologies (RATs). The at least one sidelink transmission may comprise at least one of a physical sidelink control channel (PSCCH), a physical sidelink shared channel (PSSCH), or a physical sidelink feedback channel (PSFCH). The at least one sidelink transmission may comprise at least one of a unicast transmission, a groupcast transmission, or a broadcast transmission. The first wireless device may be a coordinating wireless device performing an inter-wireless-device coordination with the at least one second wireless device. The sidelink RP may comprise at least one sidelink RB set. The sidelink RB set of the at least one sidelink RB set may indicate a frequency band for a sidelink transmission based on a listen-before-talk (LBT) procedure. The receiving may comprise receiving, from a base station, the at least one RRC message. The receiving may comprise receiving, from a third wireless device, the at least one RRC message. A computing device may comprise one or more processors and memory storing instructions that, when executed by the one or more processors, cause the computing device to perform the described method, additional operations, and/or include additional elements. A system may comprise a wireless device configured to perform the described method, additional operations, and/or include additional elements, a base station configured to send the at least one message to the wireless device, and/or additional elements. A computer-readable medium may store instructions that, when executed, cause performance of the described method and/or additional operations.

A wireless device may perform a method comprising multiple operations. A first wireless device may receive, from a base station, at least one radio resource control (RRC) message comprising one or more parameters indicating a first quantity of subchannels of a sidelink resource pool (RP) and a quantity of resource block (RB) interlaces of the sidelink RP, wherein the quantity of RB interlaces is based on the first quantity of subchannels multiplied by an integer number. The first wireless device may select at least one RB of the sidelink RP for at least one sidelink transmission via a second quantity of subchannels, wherein the selecting is based on the quantity of RB interlaces in the sidelink RP and the second quantity being a subquantity of the first quantity of subchannels. The first wireless device may transmit, to at least one second wireless device, the at least one sidelink transmission comprising the selected at least one RB. The quantity of RB interlaces may be associated with the first quantity of subchannels. The selecting may comprise selecting the one or more RBs based on a second quantity of subchannels of the at least one sidelink transmission in the sidelink RP. An RB interlace of the quantity of RB interlaces may indicate a set of RBs, equally spaced in a frequency domain, and wherein two adjacent RBs, of the set of RBs in the frequency domain, are separated by the difference of the quantity of RB interlaces and one. The sidelink RP may be in a sidelink bandwidth part (BWP) on a shared spectrum configured for a plurality of radio access technologies (RATs). The at least one sidelink transmission may comprise at least one of a physical sidelink control channel (PSCCH), a physical sidelink shared channel (PSSCH), or a physical sidelink feedback channel (PSFCH). The at least one sidelink transmission may comprise at least one of a unicast transmission, a groupcast transmission, or a broadcast transmission. The second wireless device may be a destination receiver of the one or more sidelink transmissions. The first wireless device may be a coordinating wireless device performing an inter-wireless-device coordination with the at least one second wireless device. The sidelink RP may comprise at least one sidelink RB set. A sidelink RB set of the at least one sidelink RB set may indicate a frequency band for a sidelink transmission based on a listen-before-talk (LBT) procedure. The receiving may comprise receiving, from a base station, the at least one RRC message. The receiving may comprise receiving, from at least one third wireless device. The bandwidth of the sidelink RB set may be less than or equal to 20 MHz. The first wireless device may perform the LBT procedure, on each of the at least one sidelink RB sets comprising the selected at least one RB, before the transmitting of the sidelink transmission using the selected at least one RB. The transmitting of the sidelink transmission may comprise transmitting the sidelink transmission using the selected one or more RBs based on LBT success of the LBT based channel access procedure on the each of the one or more sidelink RB sets. The LBT based channel access procedure may be a type 1 channel access procedure. The LBT based channel access procedure may be a type 2 channel access procedure. A RB interlace (e.g., each RB interlace) of the RB interlaces may have a respective RB interlace index. The sidelink transmission may occur via one or more subchannels in a frequency domain. A subchannel of the one or more subchannels may be mapped to one or more first RB interlaces of the RB interlaces. One or more first RB interlaces (e.g., each of the one or more RB interlaces) may have a respective RB interlace index. One or more subchannels of the sidelink transmission may be mapped to one or more second RB interlaces of the RB interlaces. The one or more second RB interlaces may comprise contiguous interlace indices starting from the one or more first RB interlace indices. The one or more second RB interlaces may comprise non-contiguous interlace indices starting from the one or more first RB interlace indices. The sidelink transmission may comprise sidelink control information (SCI) indicating one or more interlace indices of the one or more second RB interlaces. The SCI may comprise at least one of a first stage of the SCI on a physical sidelink control channel (PSCCH) or a second stage of the SCI on a physical sidelink shared channel (PSSCH). The first stage of the SCI may comprise a field indicating the one or more interlace indices of the one or more second RB interlaces. The second stage of the SCI may comprise a field indicating the one or more interlace indices of the one or more second RB interlaces. Subcarriers of the sidelink RP may have identical subcarrier spacing. A computing device may comprise one or more processors and memory storing instructions that, when executed by the one or more processors, cause the computing device to perform the described method, additional operations, and/or include additional elements. A system may comprise a wireless device configured to perform the described method, additional operations, and/or include additional elements, a base station configured to send the at least one message to the wireless device, and/or additional elements. A computer-readable medium may store instructions that, when executed, cause performance of the described method and/or additional operations.

A wireless device may perform a method comprising multiple operations. At least one first wireless device may receive, from a base station, at least one message indicating an association between a first quantity of subchannels of a sidelink resource pool (RP) and a quantity of resource block (RB) interlaces of the sidelink RP. The at least one first wireless device may select at least one RB for at least one sidelink transmission via the sidelink RP, wherein the selecting is based on the at least one message and a second quantity of subchannels, wherein the second quantity is a subquantity of the first quantity of subchannels. The at least one first wireless device may transmit, to at least one second wireless device, the at least one sidelink transmission comprising the at least one selected RB. The at least one message may comprise at least one of a radio resource control (RRC) message, a medium access control control element (MAC CE), downlink control information (DCI), or sidelink control information (SCI). An RB interlace of the quantity of RB interlaces may indicate a set of RBs, equally spaced in a frequency domain, and wherein two adjacent RBs, of the set of RBs in the frequency domain, are separated by the difference of the quantity of RB interlaces and one. The at least one message may comprise a field indicating the first quantity of subchannels of the sidelink RB. A computing device may comprise one or more processors and memory storing instructions that, when executed by the one or more processors, cause the computing device to perform the described method, additional operations, and/or include additional elements. A system may comprise a wireless device configured to perform the described method, additional operations, and/or include additional elements, a base station configured to send the at least one message to the wireless device, and/or additional elements. A computer-readable medium may store instructions that, when executed, cause performance of the described method and/or additional operations.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
receiving, by a first wireless device, at least one message comprising an interlace coefficient associating a quantity of resource block (RB) interlaces in a sidelink resource pool (RP) with a quantity of sub-channels;
selecting, based on the quantity of RB interlaces in the sidelink RP, one or more RBs from the sidelink RP for at least one sidelink transmission; and
transmitting, to at least one second wireless device, the at least one sidelink transmission based on the selected one or more RBs from the sidelink RP.

2. The method of claim 1, wherein the at least one message further indicates a first quantity of subchannels of the sidelink RP.

3. The method of claim 1, wherein the selecting is further based on a second quantity of subchannels, wherein the second quantity is a subquantity of a first quantity of subchannels indicated by the at least one message.

4. The method of claim 1, wherein the at least one message comprises at least one of:
a radio resource control (RRC) message;
a medium access control control element (MAC CE);
downlink control information (DCI); or
sidelink control information (SCI).

5. The method of claim 1, wherein the sidelink RP is in a sidelink bandwidth part (BWP) on a shared spectrum configured for a plurality of radio access technologies (RATs).

6. The method of claim 1, wherein the at least one sidelink transmission comprises at least one of:
a physical sidelink control channel (PSCCH);
a physical sidelink shared channel (PSSCH); or
a physical sidelink feedback channel (PSFCH).

7. The method of claim 1, wherein the at least one sidelink transmission comprises at least one of:
a unicast transmission;
a groupcast transmission; or
a broadcast transmission.

8. The method of claim 1, wherein the first wireless device is a coordinating wireless device performing an inter-wireless-device coordination with the at least one second wireless device.

9. The method of claim 1, wherein the sidelink RP comprises at least one sidelink RB set.

10. The method of claim 9, wherein a sidelink RB set of the at least one sidelink RB set indicates a frequency band for a sidelink transmission based on a listen-before-talk (LBT) procedure.

11. The method of claim 1, wherein the at least one message comprises a radio resource control (RRC) message from a base station.

12. The method of claim 1, wherein the at least one message comprises a radio resource control (RRC) message from at least one third wireless device.

13. A method comprising:
receiving, by a first wireless device, at least one radio resource control (RRC) message comprising one or more parameters indicating:
a first quantity of subchannels of a sidelink resource pool (RP); and
a quantity of resource block (RB) interlaces of the sidelink RP, wherein the quantity of RB interlaces is based on the first quantity of subchannels multiplied by an integer number;
selecting at least one RB of the sidelink RP for at least one sidelink transmission via a second quantity of subchannels, wherein the selecting is based on:
the quantity of RB interlaces in the sidelink RP; and
the second quantity being a subquantity of the first quantity of subchannels; and
transmitting, to at least one second wireless device, the at least one sidelink transmission comprising the selected at least one RB.

14. The method of claim 13, wherein the quantity of RB interlaces is associated with the first quantity of subchannels.

15. The method of claim 14, wherein the selecting further comprises selecting the at least one RB based on a second quantity of subchannels of the at least one sidelink transmission in the sidelink RP.

16. A method comprising:
receiving, by at least one first wireless device, at least one message comprising an interlace coefficient for an association between a first quantity of subchannels of a sidelink resource pool (RP) and a quantity of resource block (RB) interlaces of the sidelink RP;
selecting at least one RB for at least one sidelink transmission via the sidelink RP, wherein the selecting is based on:
the at least one message; and
a second quantity of subchannels, wherein the second quantity is a subquantity of the first quantity of subchannels; and
transmitting, to at least one second wireless device, the at least one sidelink transmission comprising the at least one selected RB.

17. The method of claim 16, wherein the at least one message comprises at least one of:
a radio resource control (RRC) message;
a medium access control control element (MAC CE);
downlink control information (DCI); or
sidelink control information (SCI).

18. The method of claim 16, wherein an RB interlace of the quantity of RB interlaces indicates a set of RBs, equally spaced in a frequency domain, and wherein two adjacent RBs, of the set of RBs in the frequency domain, are separated by a difference of the quantity of RB interlaces and one.

19. The method of claim 16, wherein the at least one message further comprises a field indicating the first quantity of subchannels of the sidelink RP.

* * * * *